(12) United States Patent
Miyata et al.

(10) Patent No.: US 6,605,016 B2
(45) Date of Patent: Aug. 12, 2003

(54) TOROIDAL TYPE CONTINUOUSLY VARIABLE TRANSMISSION AND CONTINUOUSLY VARIABLE TRANSMISSION APPARATUS

(75) Inventors: Shinji Miyata, Kanagawa (JP); Daping Liu, Kanagawa (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 10/067,252

(22) Filed: Feb. 7, 2002

(65) Prior Publication Data

US 2002/0111244 A1 Aug. 15, 2002

(30) Foreign Application Priority Data

Feb. 9, 2001 (JP) .................... P. 2001-033521
Sep. 21, 2001 (JP) .................... P. 2001-289673

(51) Int. Cl.$^7$ .............................. F16H 37/02
(52) U.S. Cl. ................. 475/216; 475/208; 477/37
(58) Field of Search ................. 475/208, 216, 475/217; 477/37

(56) References Cited

U.S. PATENT DOCUMENTS

| 4,756,211 A | | 7/1988 | Fellows | |
| 5,238,460 A | * | 8/1993 | Esaki et al. | 475/216 X |
| 5,318,486 A | * | 6/1994 | Lutz | 475/216 X |
| 5,464,375 A | | 11/1995 | Nakano | |
| 5,888,160 A | | 3/1999 | Miyata et al. | |
| 6,162,144 A | * | 12/2000 | Haka | 475/216 X |
| 6,171,210 B1 | * | 1/2001 | Miyata et al. | 475/216 |
| 6,213,907 B1 | * | 4/2001 | Wooden | 475/216 |
| 6,514,168 B2 | * | 2/2003 | Miyata | 475/216 |

FOREIGN PATENT DOCUMENTS

| JP | 62-71465 | | 5/1987 | |
| JP | 1-169169 | | 7/1989 | |
| JP | 1-173552 | | 12/1989 | |
| JP | 1-312266 | | 12/1989 | |
| JP | 402261950 | * | 10/1990 | 475/216 |

\* cited by examiner

Primary Examiner—Charles A Marmor
Assistant Examiner—Ha Ho
(74) Attorney, Agent, or Firm—Sughrue Mion, PLLC

(57) ABSTRACT

A hydraulic type pressing device secures the contact pressure between the peripheral surfaces of respective power rollers and the inner surfaces of respective input side disks and respective output side disks. When a torque to be transmitted changes abruptly, the pressing force of the pressing device is set to a value corresponding to the maximum torque to be transmitted by a toroidal type continuously variable transmission. According to this configuration, the variation of the transmission ratio based on the variation of the elastic deformation values at the respective portions is suppressed to prevent the uncomfortable feeling of a driver.

8 Claims, 24 Drawing Sheets

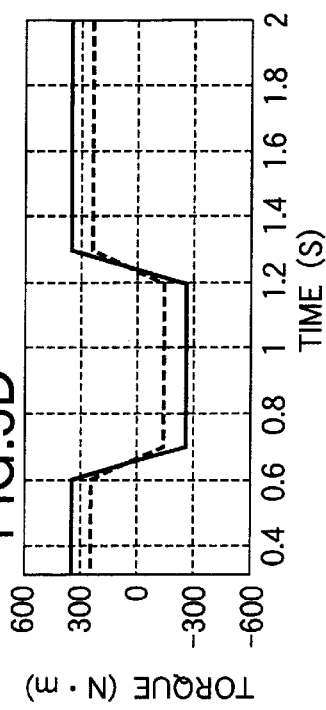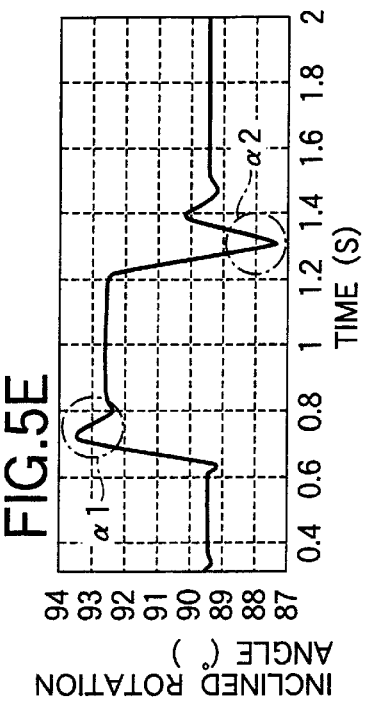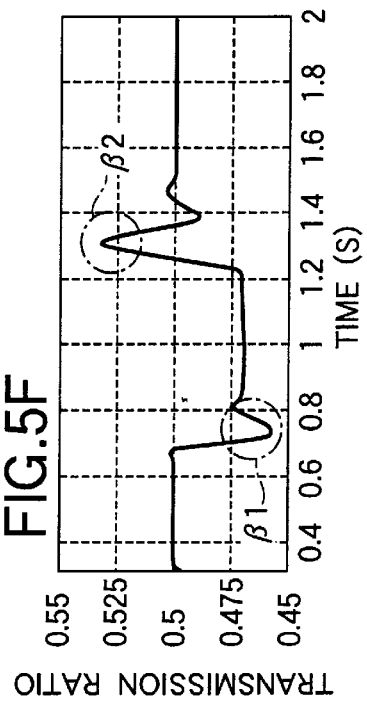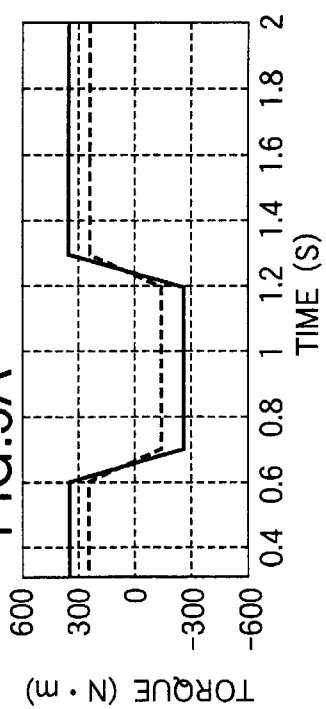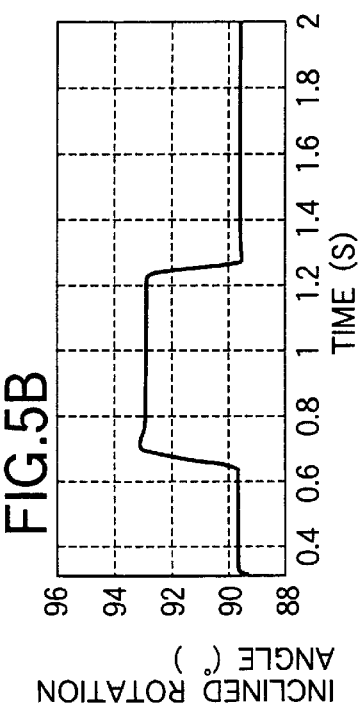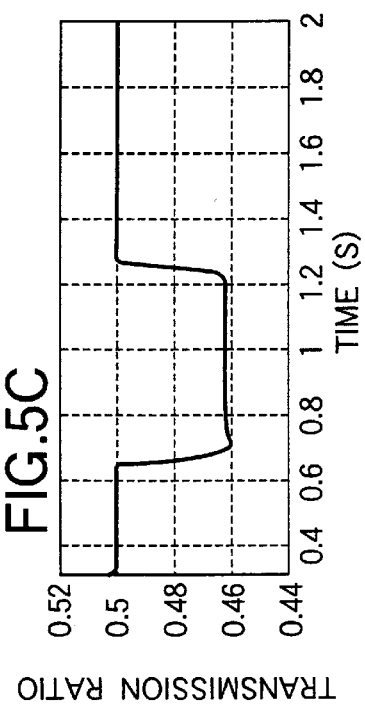

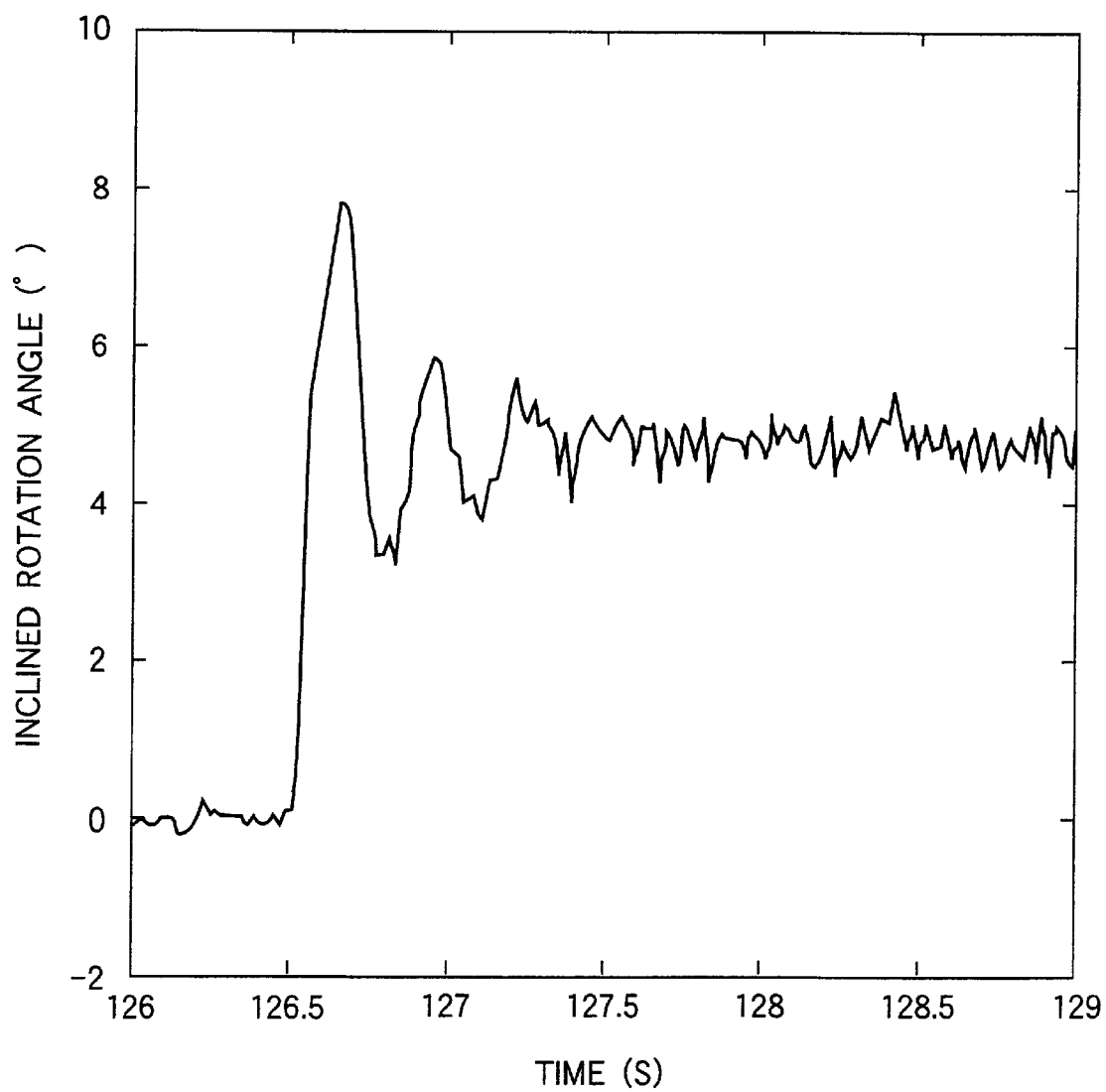

TOROIDAL TYPE CONTINUOUSLY VARIABLE TRANSMISSION AND CONTINUOUSLY VARIABLE TRANSMISSION APPARATUS

BACKGROUND OF THE INVENTION

1. Field of the Invention

A toroidal type continuously variable transmission and A continuously variable transmission apparatus according to the present invention are each utilized as a transmission unit constituting an automatic transmission for an automobile. In particular, the invention intends to suppress the variation of the transmission ratio based on the elastic deformation of a trunnion even under a state that a toque to be transmitted changes abruptly thereby to reduce uncomfortable feeling of a driver.

2. Description of the Related Art

A toroidal type continuously variable transmission as shown schematically in FIGS. 12 to 13 has been partially utilized as an automatic transmission for an automobile. This toroidal type continuously variable transmission is configured in a manner as disclosed in Japanese Patent Laid-Open No. 71465/1988, for example, that an input side disk 2 is supported concentrically with an input shaft 1 and an output side disk 4 is fixed at the end portion of an output shaft 3 disposed concentrically with the input shaft 1. Trunnions 7, 7, which swing around pivot shafts 6, 6 disposed at twisted positions with respect to the input shaft 1 and the output shaft 3, respectively, are provided at the inner side of a casing 5 (see FIGS. 15 to 16 described later) in which the toroidal type continuously variable transmission is housed.

A pair of the pivot shafts 6, 6 are provided concentrically at the outer surfaces of the both ends of each of the trunnions 7, 7. The center axis of each of the pivot shafts 6, 6 exists at the twisted position which does not cross with the center axes of the respective disks 2, 4 but is perpendicular to or almost perpendicular to the direction along the center axes of the respective disks 2, 4. The base half portions of displacement shafts 8, 8 are supported by the center portions of the trunnions 7, 7 so that the slanted angle of each of the displacement shafts 8, 8 is freely adjustable by swinging the trunnions 7, 7 around the pivot shafts 6, 6, respectively. Power rollers 9, 9 are rotatably supported at the peripheries of the tip half portions of the displacement shafts 8, 8 supported by the trunnions 7, 7, respectively. Each of the power rollers 9, 9 is sandwiched between the inner surfaces 2a, 4a of the input and output side disks 2, 4.

Each of the opposing inner surfaces 2a, 4a of the input and output side disks 2, 4 is configured as a concave surface of an arc shape in its section which is obtained by rotating an arc formed around the pivot shaft 6 as a center or by rotating a curve close to such an arc. The peripheral surfaces 9a, 9a of the power rollers 9, 9 each formed in a spherical convex surface contact against the inner surfaces 2a, 4a. A pressing device 10 such as a loading cam device etc. is provided between the input shaft 1 and the input side disk 2. The pressing device 10 elastically pushes the input side disk 2 toward the output side disk 4 thereby to freely rotate and drive the output side disk 4.

At the time of using the toroidal type continuously variable transmission configured in the aforesaid manner, the pressing device 10 rotates the input side disk 2 in accordance with the rotation of the input shaft 1 while pressing the input side disk 2 toward the plurality of the power rollers 9, 9. The rotation of the input side disk 2 is transmitted to the output side disk 4 through the plurality of the power rollers 9, 9, whereby the output shaft 3 fixed to the output side disk 4 rotates.

A description will be given of the case of changing the rotation speed between the input shaft 1 and the output shaft 3. First, at the time of performing the deceleration between the input shaft 1 and the output shaft 3, the trunnions 7, 7 are swung around the pivot shafts 6, 6 thereby to incline the displacement shafts 8, 8 such that the peripheral surfaces 9a, 9a of the power rollers 9, 9 contact against the center side portion of the inner surface 2a of the input side disk 2 and the outer peripheral side portion of the inner surface 4a of the output side disk 4 as shown in FIG. 12, respectively.

In contrast, at the time of increasing the speed, the trunnions 7, 7 are swung thereby to incline the displacement shafts 8, 8 such that the peripheral surfaces 9a, 9a of the power rollers 9, 9 contact against the outer peripheral side portion of the inner surface 2a of the input side disk 2 and the center side portion of the inner surface 4a of the output side disk 4 as shown in FIG. 13, respectively. When the inclined angle of each of the displacement shafts 8, 8 is set at the intermediate angle between those in FIGS. 12 and 13, an intermediate transmission gear ratio can be obtained between the input shaft 1 and the output shaft 3.

Further, FIGS. 14 to 15 show a further specific toroidal type continuously variable transmission described in Japanese Patent Laid-Open No. 173552/1989. An input side disk 2 and an output side disk 4 are rotatably supported at the periphery of a tubular input shaft 11. A pressing device 10 is provided between the end portion of the input shaft 11 and the input side disk 2. An output gear 12 is coupled to the output side disk 4 so that the output side disk 4 and the output gear 12 rotate synchronously.

Pivot shafts 6, 6 provided concentrically at the both end portions of the pair of trunnions 7, 7 are supported by a pair of supporting plates (yokes) 13, 13, respectively, so as to swing and displace freely in the axial direction (the front and rear direction in FIG. 14, the vertical direction in FIG. 15). The base half portions of displacement shafts 8, 8 are supported by the intermediate portions of the trunnions 7, 7, respectively. Each of the displacement shafts 8, 8 is configured in a manner that the base half portion and the tip half portion thereof are made eccentric to each other. The base half portions are rotatably supported by the intermediate portions of the trunnions 7, 7 and power rollers 9, 9 are rotatably supported by the tip half portions, respectively. A synchronous cable 27 is hung over the end portions of the trunnions 7, 7 in a sleeve tied manner so that the inclined angles of the respective trunnions 7, 7 are mechanically synchronized to each other.

The pair of the displacement shafts 8, 8 are provided at opposite side positions with respect to the input shaft 11 so as to form 180 degrees therebetween. The base half portion and the tip half portion of each of the displacement shafts 8, 8 are made eccentric in the same direction (vertically reverse direction in FIG. 15) with respect to the rotation direction of the input and output side disks 2, 4. The eccentric direction is made almost perpendicular to the direction along which the input shaft 11 is disposed. Thus, the power rollers 9, 9 are supported so as to be able to slightly displace freely with respect to the disposing direction of the input shaft 11.

From the outer periphery sides of the power rollers 9, 9, thrust ball bearings 14, 14 and thrust needle roller bearings 15, 15 are sequentially provided between the outer peripheries of the power rollers 9, 9 and the inner side surfaces at the intermediate portions of the trunnions 7, 7. The thrust ball bearings 14, 14 allow the power rollers 9, 9 to rotate while supporting the load in the thrust direction applied to the power rollers 9, 9, respectively. The thrust needle roller bearings 15, 15 allow the tip half portions of the displacement shafts 8, 8 and the outer rings 16, 16 to swing around the base half portions of the displacement shafts 8, 8 while supporting the thrust load applied to the outer rings 16, 16 constituting the thrust ball bearings 14, 14 from the power rollers 9, 9, respectively. Further, the trunnions 7, 7 can be displaced freely in the axial direction of the pivot shafts 6, 6 by hydraulic type actuators (hydraulic cylinder) 17, 17, respectively.

In the toroidal type continuously variable transmission configured in the aforesaid manner, the rotation of the input shaft 11 is transmitted to the input side disk 2 through the pressing device 10. Then, the rotation of the input side disk 2 is transmitted to the output side disk 4 through the pair of the power rollers 9, 9 and the rotation of the output side disk 4 is taken out by an output gear 12.

In the case of changing a rotation speed ratio between the input shaft 11 and the output gear 12, the pair of the trunnions 7, 7 are made swing in opposite directions to each other by the actuators 17, 17, respectively. For example, the power roller 9 on the right side in FIG. 15 is displaced to the lower side in the figure, whilst the power roller 9 on the left side in the figure is displaced to the upper side in the figure. As a result, the directions of forces along the tangential directions acting on the contact portions between the peripheral surfaces 9a, 9a of the power rollers 9, 9 and the inner surfaces 2a, 4a of the input side disk 2 and the output side disk 4 change (that is, sideslip occurs at the contact portions), respectively. Then, due to the change of the direction of the force, the trunnions 7, 7 swing in opposite directions to each other around the pivot shafts 6, 6 pivotally supported by supporting plates 13, 13, respectively. As a result, as shown in FIGS. 12 to 13, the contact positions between the peripheral surfaces 9a, 9a of the power rollers 9, 9 and the inner surfaces 2a, 4a change, and thus the rotation speed ratio between the input shaft 11 and the output gear 12 changes.

The pressure oil is supplied to and discharged from the actuators 17, 17 by means of a single control valve irrespective of the number of the actuators 17, 17. The movement of one of the trunnions 7 is fed back to the control valve. The structure of this portion is conventionally known as disclosed in U.S. Pat. No. 5,464,375 and will be explained briefly with reference to FIG. 18 which shows the second example of the conventional specific structures described later. The control valve 18 includes a sleeve 20 which is displaced in the axial direction thereof (left and right directions in FIG. 18) by a stepping motor 19 and a spool 21 fitted into the inner diameter side of the sleeve 20 so as to displace freely in the axial direction thereof. A precess cam 23 is fixed at the end portion of a rod 22 attached to one of the trunnions 7. A feedback mechanism is configured in a manner that the movement of the rod 22 is transmitted to the spool 21 through the precess cam 23 and a link arm 24.

At the time of switching the transmission state, the sleeve 20 is displaced by a predetermined amount by the stepping motor 19 to open the flow path of the control valve 18. As a result, the pressure oil is supplied in predetermined direction to the actuators 17, 17, whereby the actuators 17, 17 displace the trunnions 7, 7 in a predetermined direction, respectively. That is, in accordance with the supply of the pressure oil, the trunnions 7, 7 swing around the pivot shafts 6, 6 while displacing in the axial direction of the pivot shafts 6, 6, respectively. Then, the movement (the displacement in the axial direction and the swinging movement) of one of the trunnions 7 is transmitted to the spool 21 through the precess cam 23 fixed to the end portion of the rod 22 and the link arm 24 thereby to displace the spool 21 in the axial direction. As a result, the flow path of the control valve 18 is closed in a state that the trunnions 7 are displaced by the predetermined amount, so that the supply and discharge of the pressure oil to and from the actuators 17, 17 is stopped. Thus, the displacement amount of the trunnions 7, 7 in the axial direction and the swinging direction corresponds to an amount merely according to the displacement amount of the sleeve 20 caused by the stepping motor 19.

Incidentally, at the time of power transmission by the toroidal type continuously variable transmission, the power rollers 9, 9 displace in the axial direction of the input shaft 11 (FIGS. 14 to 15) based on the elastic deformation of the respective portions of the transmission. Then, the displacement shafts 8, 8 supporting the power rollers 9, 9 slightly rotate around the base half portions thereof, respectively. As a result of the rotation, the outer surfaces of the outer rings 16, 16 of the thrust ball bearings 14, 14 and the inner surfaces of the trunnions 7, 7 displace relative to each other. A force required for the relative displacement is small since the thrust needle roller bearings 15, 15 exist between the outer surfaces and the inner surfaces.

Further, a so-called double cavity type structure has been known conventionally in which, in order to increase transmissible torque, as shown in FIGS. 16 to 18, two input side disks 2A, 2B and two output side disks 4, 4 are provided at the periphery of an input shaft 11a, and these two input side disks 2A, 2B and the two output side disks 4, 4 are juxtaposed to each other with respect to the power transmission direction. The structure shown in FIGS. 16 to 18 is configured in a manner that an output gear 12a is supported at the periphery of the intermediate portion of the input shaft 11a so as to rotate freely with respect to the input shaft 11a, and the output side disks 4, 4 are spline-engaged at the both end portions of a cylindrical portion provided at the center portion of the output gear 12a. The input side disks 2A, 2B are supported at the both end portions of the input shaft 11a so as to rotate together with the input shaft 11a. The input shaft 11a is driven and rotated by a driving shaft 25 through a loading cam type pressing device 10.

In the double cavity type toroidal type continuously variable transmission configured in the aforesaid manner, the power transmission from the input shaft 11a to the output gear 12a is performed by two ways separately, that is, one way is between the one input side disk 2A and the output side disk 4 and the other way is between the other input side disk 2B and the output side disk 4, so that a large torque can be transmitted. Also, according to such a double cavity type toroidal type continuously variable transmission, at the time of transmission, hydraulic type actuators 17, 17 displace trunnions 7, 7 in the axial direction of the pivot shafts 6, 6, respectively. As described above, in order to control the supply and the discharge of the pressure oil to and from the actuators 17, 17 for performing the transmission, only one control valve 18 is provided for the toroidal type continuously variable transmission. This only one control valve 18 is used to control the supply and the discharge of the pressure oil to and from the plurality of the actuators 17, 17.

It has been proposed conventionally as disclosed in Japanese Patent Laid-Open No. 169169/1989, Japanese Patent Laid-Open No. 312266/1989, U.S. Pat. No. 5,888,160, U.S. Pat. 6,171,210 etc. that, in the case of incorporating the toroidal type continuously variable transmission configured and operated in the aforesaid manner into an actual continuously variable transmission for an automobile, the transmission is combined with a planetary gear mechanism thereby to constitute a continuously variable transmission apparatus. A so-called power split type continuously variable transmission apparatus of such transmission apparatuses is configured in a manner that the driving force of an engine is transmitted only by a toroidal type continuously variable transmission at the time of low speed running, whilst the driving force is transmitted by a planetary gear mechanism at the time of high speed running thereby to reduce torque applied to the toroidal type continuously variable transmission at the time of the high speed running. According to such a configuration, it is possible to improve the durability of the respective constituent members of the toroidal type continuously variable transmission. Alternately, a so-called geared neutral continuously variable transmission has been conventionally known in which it makes possible to stop an output shaft while rotating an input shaft by combining a toroidal type continuously variable transmission and a planetary gear mechanism.

FIG. 19 shows the continuously variable transmission disclosed in U.S. Pat. No. 5,888,160. This continuously variable transmission is provided with a starter clutch 30 between the output side terminal portion (the right end portion in FIG. 19) of a crankshaft 28 of an engine 26 and the input side end portion (the left end portion in FIG. 19) of an input shaft 29. An output shaft 31 for taking out power based on the rotation of the input shaft 29 is disposed in parallel to the input shaft 29. A toroidal type continuously variable transmission 32 is provided at the periphery of the input shaft 29 and a planetary gear mechanism 33 is provided at the periphery of the output shaft 31.

A cam plate 34 constituting the pressing device 10 of the toroidal type continuously variable transmission 32 is fixed at a portion close to the output side end portion (to the right in FIG. 19) of the intermediate portion of the input shaft 29. The input side disk 2 and the output side disk 4 are supported by bearings (not-shown) such as a needle roller bearing etc. at the periphery of the input shaft 29 so as to rotate freely and independently to each other with respect to the input shaft 29. The cam plate 34 and the input side disk 2 constitute the pressing device 10. Thus, the input side disk 2 rotates in accordance with the rotation of the input shaft 29 while being pressed toward the output side disk 4. A plurality of power rollers 9, 9 are sandwiched between the inner surface 2a of the input side disk 2 and the inner surface 4a of the output side disk 4, whereby the toroidal type continuously variable transmission 32 as shown in FIGS. 14 to 15 is constituted. The toroidal type continuously variable transmission 32 is not limited to the single cavity type shown in FIG. 19 and FIGS. 14 to 15 but may be the double cavity type shown in FIGS. 16 to 17. The continuously variable transmission apparatus in which the double cavity type toroidal type continuously variable transmission is incorporated is disclosed in U.S. Pat. No. 6,171,210 etc.

A sun gear 35 constituting the planetary gear mechanism 33 is fixed to the input side end portion (the right end portion in FIG. 19) of the output shaft 31. Thus, the output shaft 31 rotates in accordance with the rotation of the sun gear 35. A ring gear 36 is supported at the periphery of the sun gear 35 so as to be concentric with the sun gear 35 and rotate freely. A plurality of (normally three or four) planetary gear sets 37, 37 are provided between the inner peripheral surface of the ring gear 36 and the outer peripheral surface of the sun gear 35. In the example shown by the figure, each of the planetary gear sets 37, 37 is formed by combining a pair of planetary gears 38a, 38b. The pair of the planetary gears 38a, 38b mesh to each other. Further, the planetary gear 38a disposed on the outer diameter side is meshed with the ring gear 36, and the planetary gear 38b disposed on the inner diameter side is meshed with the sun gear 35. Each of the planetary gear sets 37, 37 is formed by the pair of the planetary gears 38a, 38b in this manner in order to coincide the rotation direction of the ring gear 36 with that of the sun gear 35. Thus, if it is not necessary to coincide the rotation direction of the ring gear 36 with that of the sun gear 35 in relation to other constituent portions, a single planetary gear may be arranged to mesh with both the ring gear 36 and the sun gear 35. The planetary gear sets 37, 37 are supported at the one side surface (the right side surface in FIG. 19) of a carrier 39 so as to rotate freely. The carrier 39 is supported at the intermediate portion of the output shaft 31 so as to rotate freely.

The carrier 39 and the output side disk 4 are coupled in a state of being capable of transmitting rotation force by a first power transmission mechanism 40. The first power transmission mechanism 40 constituting a first power transmission path is formed by first and second gears 41, 42 meshed to each other. Thus, the carrier 39 rotates at a speed according to the numbers of the gear teeth of the first and second gears 41, 42 in accordance with the rotation of the output side disk 4 in the direction opposite to the rotation direction of the output side disk 4.

The input shaft 29 and the ring gear 36 are coupled freely in a state of being capable of transmitting rotation force by a second power transmission mechanism 43. The second power transmission mechanism 43 constituting a second power transmission path is formed by first and second sprockets 44, 45 and a chain 46 hung over the both sprockets 44, 45. That is, the first sprocket 44 is fixed at a portion protruding from the cam plate 34 at the output side end portion (the right end portion in FIG. 19) of the input shaft 29 and the second sprocket 45 is fixed at the input side end portion (the right end portion in FIG. 19) of a transmission shaft 47. Thus, the transmission shaft 47 rotates at a speed according to the numbers of the gear teeth of the first and second sprockets 44, 45 in accordance with the rotation of the input shaft 29 in the same direction as the rotation direction of the input shaft 29.

The continuously variable transmission apparatus includes a clutch mechanism constituting a mode switching device. The clutch mechanism couples only one of the carrier 39 and the transmission shaft 47 that is a constituent member of the second power transmission mechanism 43 to the ring gear 36. In the case of the construction shown in FIG. 19, the clutch mechanism is formed by a low speed clutch 48 and a high speed clutch 49. The low speed clutch 48 is provided between the outer peripheral edge portion of the carrier 39 and the one end portion (the left end portion in FIG. 19) of the ring gear 36 along the axial direction thereof. Such a low speed clutch 48 serves at the time of coupling to prevent the relative displacement among the sun gear 35, the ring gear 36 and the planetary gear sets 37, 37 constituting the planetary gear mechanism 33 to integrally couple the sun gear 35 and the ring gear 36. The high speed clutch 49 is provided between the transmission shaft 47 and a center shaft 51 which is fixed to the ring gear 36 through a supporting plate 50. The low speed clutch 48 and the high speed clutch 49 are arranged in a manner that when one of these clutches is engaged, the other clutch is disengaged.

In the example shown in FIG. 19, a reverse clutch 52 is provided between the ring gear 36 and a fixed portion such as the housing (not shown) of the continuously variable transmission apparatus. The reverse clutch 52 is provided in order to rotate the output shaft 31 in the reverse direction so as to move an automobile backward. The reverse clutch 52 is disengaged in a state where one of the low speed clutch 48 and the high speed clutch 49 is engaged. In a state where the reverse clutch 52 is engaged, each of the low speed clutch 48 and the high speed clutch 49 is disengaged.

Further, in the example shown in the figure, the output shaft 31 and a differential gear 53 are coupled by a third power transmission mechanism 57 constituted by third to fifth gears 54 to 56. Thus, when the output shaft 31 rotates, a pair of left and right driving shafts 58, 58 rotate through the third power transmission mechanism 57 and the differential gear 53 thereby to rotate and drive the driving wheels of an automobile.

At the time of the low speed running, the continuously variable transmission apparatus first engages the low speed clutch 48 and disengages the high speed clutch 49 and the reverse clutch 52. When the starter clutch 30 is engaged to rotate the input shaft 29 in this state, only the toroidal type continuously variable transmission 32 transmits the power from the input shaft 29 to the output shaft 31. The operation for changing the transmission ratio (variable speed ratio) between the input side disk 2 and the output side disk 4 at the time of such a low speed running is same as that in the case of using only the toroidal type continuously variable transmission as shown in FIGS. 14 to 15. Of course, in this state, the transmission ratio between the input shaft 29 and the output shaft 31, that is the transmission ratio of the entirety of the continuously variable transmission apparatus is proportional to the transmission ratio of the toroidal type continuously variable transmission 32. Further, in this state, a torque inputted into the toroidal type continuously variable transmission 32 becomes equal to a torque applied to the input shaft 29.

In contrast, at the time of the high speed running, the high speed clutch 49 is engaged and each of the low speed clutch 48 and the reverse clutch 52 is disengaged. When the starter clutch 30 is engaged to rotate the input shaft 29 in this state, the first and second sprockets 44, 45 and the chain 46 constituting the second power transmission mechanism 43 and the planetary gear mechanism 33 transmit the power from the input shaft 29 to the output shaft 31.

That is, when the input shaft 29 rotates at the time of the high speed running, this rotation is transmitted to the center shaft 51 through the second power transmission mechanism 43 and the high speed clutch 49 thereby to rotate the ring gear 36 to which the center shaft 51 is fixed. Then, the rotation of the ring gear 36 is transmitted to the sun gear 35 through the plurality of the planetary gear sets 37, 37 thereby to rotate the output shaft 31 to which the sun gear 35 is fixed. When the ring gear 36 is disposed on the input side, the planetary gear mechanism 33 increases the speed at the transmission ratio according to the numbers of the gear teeth between the ring gear 36 and the sun gear 35 supposing that the planetary gear sets 37, 37 are stopped (not revolve around the sun gear 35). In this respect, each of the planetary gear sets 37, 37 revolve around the sun gear 35, and the transmission ratio of the entirety of the continuously variable transmission apparatus changes in accordance with the revolution speed of the planetary gear sets 37, 37. Thus, the transmission ratio of the entirety of the continuously variable transmission apparatus can be adjusted by changing the transmission ratio of the toroidal type continuously variable transmission 32 and changing the revolution speed of the planetary gear sets 37, 37.

That is, at the time of the high speed running, the planetary gear sets 37, 37 revolve in the same direction as the ring gear 36. The lower the revolution speed of each of the planetary gear sets 37, 37 become, the higher the rotation speed of the output shaft 31 to which the sun gear 35 is fixed becomes. For example, when the revolution speed becomes same as the rotation speed of the ring gear 36 (each being an angular velocity), the rotation speed of the ring gear 36 becomes same as that of the output shaft 31. When the revolution speed is lower than the rotation speed of the ring gear 36, the rotation speed of the output shaft 31 becomes higher than that of the ring gear 36. On the contrary, when the revolution speed is higher than the rotation speed of the ring gear 36, the rotation speed of the output shaft 31 becomes lower than that of the ring gear 36.

Thus, at the time of the high speed running, as the transmission ratio of the toroidal type continuously variable transmission 32 is changed to the deceleration side, the transmission ratio of the entirety of the continuously variable transmission apparatus changes to the speed increasing side. In such a high speed running state, a torque is applied to the toroidal type continuously variable transmission 32 not from the input side disk 2 but from the output side disk 4 (that is, a minus torque is applied supposing that a torque applied at the time of the low speed running is plus torque). That is, in the state where the high speed clutch 49 is engaged, a torque transmitted to the input shaft 29 from the engine 26 is transmitted to the ring gear 36 of the planetary gear mechanism 33 through the second power transmission mechanism 43 before the pressing device 10 presses the input side disk 2. Therefore, a torque is scarcely transmitted to the input side disk 2 from the input shaft 29 side through the pressing device 10.

A part of a torque transmitted to the ring gear 36 of the planetary gear mechanism 33 through the second power transmission mechanism 43 is transmitted to the output side disk 4 from the planetary gear sets 37, 37 through the carrier 39 and the first power transmission mechanism 40. In this manner, a torque applied to the toroidal type continuously variable transmission 32 from the output side disk 4 becomes smaller as the transmission ratio of the toroidal type continuously variable transmission 32 is changed to the deceleration side in order to change the transmission ratio of the entirety of the continuously variable transmission apparatus to the speed increasing side. As a result, a torque inputted into the toroidal type continuously variable transmission 32 can be made small at the time of the high speed running thereby to improve the durability of the constituent parts of the transmission 32.

Further, at the time of rotating the output shaft 31 reversely so as to move an automobile backward, each of the low speed clutch 48 and the high speed clutch 49 is disengaged and also the reverse clutch 52 is engaged. As a result, the ring gear 36 is fixed, and the planetary gear sets 37, 37 revolve around the sun gear 35 while being meshed with the ring gear 36 and the sun gear 35. Then, the sun gear 35 and the output shaft 31 fixing the sun gear 35 thereto rotate in the direction opposite to the rotation direction thereof at the time of the low speed running and the high speed running.

FIG. 20 shows an example of a state where the transmission ratio (icvt) of the toroidal type continuously variable transmission 32, an input torque (Tin) inputted into the toroidal type continuously variable transmission 32 and an output torque (Ts) taken out from the output shaft of the continuously variable transmission change in the case of continuously changing the transmission ratio (itotal) of the entirety of the continuously variable transmission apparatus as shown in FIG. 19. The relation among the respective transmission ratios (itotal), (icvt) and the respective torques (Tin) (Ts) changes depending on the variable speed width of the toroidal type continuously variable transmission 32, the construction and gear teeth ratio of the planetary gear mechanism 33, the deceleration ratio of the mechanism 43 etc. In order to obtain the respective lines shown in FIG. 20, the following conditions are determined that the variable speed width of the transmission 32 is set to four times (0.5 to 2.0), the planetary gear mechanism 33 includes the planetary gear sets 37, 37 each formed by the pair of the planetary gears 38a, 38b, and the deceleration ratio of the second power transmission mechanism 43 is 2. The switching between the low speed clutch 48 and the high speed clutch 49 is performed when the transmission ratio (itotal) of the entirety of the continuously variable transmission apparatus is 1.

In FIG. 20 showing the result of the provisional calculation based on the aforesaid conditions, an ordinate represents the transmission ratio (icvt) of the toroidal type continuously variable transmission 32 and the ratio (Tin/Te; Ts/Te) between the input torque (Tin) of the toroidal type continuously variable transmission 32 or the output torque (Ts) of the continuously variable transmission apparatus and the torque (Te) transmitted to the input shaft 29 (FIG. 19) from the engine 26, and an abscissa represents the transmission ratio (itotal) of the entirety of the continuously variable transmission apparatus. In this respect, a value representing the transmission ratio (icvt) of the toroidal type continuously variable transmission 32 is minus since the rotation direction of the output side disk 4 (FIG. 19) incorporated into the transmission 32 is in opposite to that of the input shaft 29. A solid line a represents the transmission ratio (icvt) of the toroidal type continuously variable transmission 32, a broken line b represents a ratio (Ts/Te) between the output torque (Ts) and the torque (Te) transmitted to the input shaft 29 from the engine 26, and a chain line c represents a ratio (Tin/Te) between the input torque (Tin) and the torque (Te) transmitted to the input shaft 29 from the engine 26. As clear from such a FIG. 20, according to the continuously variable transmission apparatus shown in FIG. 19, a torque applied to the transmission 32 at the time of the high speed running can be made small. According to the conditions for obtaining the result shown in FIG. 20, the input torque (Tin) can be reduced at the maximum to about 14% of the torque (Te) transmitted to the input shaft 29 from the engine 26.

The inventors of the present invention etc. have found the following matter from the experimentation. That is, according to the toroidal type continuously variable transmission configured in the aforesaid manner which is used in a state of being incorporated into the continuously variable transmission apparatus etc. configured in the aforesaid manner, irrespective of the opening and closing control of the control valve 18 (FIG. 18) by the precess cam 23, the transmission ratio varies unnecessarily in accordance with the variation of the input torque due to the influence of a clearance(s) of the assembled parts and the elastic deformation of the constituent parts of the mechanism 32 and so the rotational speed of the engine varies abruptly, so that a driver may feel uncomfortable feeling. It was found that, in particular, the unnecessary variation of the transmission ratio becomes remarkable when the torque transmitted through the toroidal type continuously variable transmission varies.

That is, according to the experimentation performed by the inventors of the present invention, it was found that when the torque transmitted through the toroidal type continuously variable transmission varies, the transmission ratio of the toroidal type continuously variable transmission changes despite that no command for the transmission is issued. FIG. 21 shows the result of such an experimentation. The experimentation has been performed in a state that the transmission ratio of the toroidal type continuously variable transmission is set to 1 (even speed), the rotation speed of the input shaft is set at 2000min$^{-1}$, and the temperature of the traction oil is increased like the actual running state of an automobile. Under the aforesaid condition, the torque applied to the input shaft was changed between −250N·m and +350N·m. The torque was changed gradually in order to exclude the influence of inertia as much as possible. In this respect, the negative state of the torque applied to the input shaft is a state where a torque is transmitted from the output side disk to the input side disk.

As clear from the result of the experimentation performed under such a condition, the transmission ratio of the toroidal type continuously variable transmission varies in accordance with the change of the torque transmitted by the toroidal type continuously variable transmission. The reason causing such a variation of the transmission ratio is considered as follows.

As shown in FIG. 18, the precess cam 23 is supported by and fixed to the tip end portion (the lower end portion of FIG. 18) of the rod 22 which base end portion (the upper end portion of FIG. 18) is coupled and fixed to one of the trunnions 7. At the time of operating the toroidal type continuously variable transmission, the trunnion 7 is applied with a large force from the power roller 9 which is supported by the inner surface side of the trunnion. This force mainly includes the following two kinds of forces ①, ②.

① Forces applied in accordance with the power transmission from the contact portions (traction portions) between the peripheral surfaces 9a of the power roller 9 and the inner surfaces 2a of the input side disks 2, 2A, 2B, the inner surface 4a of the output side disk 4.

② A thrust load pushing the power roller 9 to the inner surface of the trunnion 7 based on the pushing force by the pressing device 10 (for example, see FIGS. 16 to 17).

Each of these forces ① and ② becomes a cause for deviating the precess cam 23 from the normal position.

First, the explanation will be made with reference to FIGS. 22A to 22C as to the reason why the precess cam 23 deviates from the normal position due to the force ①. FIG. 22 schematically shows the pair of the trunnions 7, 7 disposed between the pair of the input side disk and the output side disk, the displacement shafts 8, 8, the power rollers 9, 9 and the rods 22, 22 respectively attached to the trunnions 7, 7, pistons 59, 59 constituting a hydraulic type actuator, and the precess cam 23. In FIG. 22, the input side disk not shown in FIG. 22 rotates clockwise as shown by an arrow α. Thus, the output side disk also not shown in FIG. 22 rotates counterclockwise.

First, FIG. 22A shows a case where no power is transmitted between the input side disk 2 and the output side disk 4 (see FIG. 14, for example). In this case, a load applied to the power rollers 9, 9 from the inner surfaces 2a, 4a (see FIG. 14, for example) of the input side disk 2 and the output side disk 4 is zero. Thus, a load applied to the displacement shafts 8, 8 and the trunnions 7, 7 supporting the power rollers 9, 9 is also zero, so that each of the displacement shafts 8, 8 does not incline and each of the trunnions 7, 7 does not deform elastically. Therefore, the precess cam 23 fixed at the end portion of the rod 22 attached to one of the trunnions 7 (the right side one in FIG. 22) exists at the normal position shown by a chain line A in FIGS. 22A to 22C.

Next, FIG. 22B shows a case of transmitting a relatively small power between the input side disk 2 and the output side disk 4. In this case, loads along the axial direction (the vertical direction in FIG. 22) of the pivot shafts 6, 6 (see FIG. 18, for example) provided at the both end portions of the trunnions 7, 7 are applied to the trunnions 7, 7 based on the loads applied to the power rollers 9, 9 from the inner surfaces 2a, 4a of the input side disk 2 and the output side disk 4, respectively. Then, in order to support such loads, the oil is supplied to the actuators 17, 17 (see FIG. 18, for example) incorporating the pistons 59, 59, respectively. Simultaneously, as exaggeratingly shown in FIG. 22B, the displacement shafts 8, 8 supporting the power rollers 9, 9 incline in the direction to which the load applied to the power rollers 9, 9 from the input side disk 2 acts, based on the load applied to the power rollers 9, 9 from the both disks 2, 4, respectively. Such an inclination is based on the elastic deformation of the displacement shafts 8, 8 themselves and the presence of the inner clearance of a radial needle roller bearing provided between the both end portions of the displacement shafts 8, 8 and the power rollers 9, 9, the trunnions 7, 7, respectively. Although such an inclination is little, the inclination is caused by a relatively small force based on the presence of the inner clearances of the thrust ball bearing 14 and the thrust needle roller bearing 15 (see FIG. 18, for example) provided between the power rollers 9, 9 and the trunnions 7, 7, respectively.

When the displacement shafts 8, 8 incline in this manner, the power rollers 9, 9 supported by the displacement shafts 8, 8 displace with respect to the input side disk 2 and the output side disk 4, so that the positions of the contact portions (traction portions) between the peripheral surfaces 9a, 9a of the power rollers 9, 9 and the inner surfaces 2a, 4a of these both disks 2, 4 deviate from the center portions of these both disks 2, 4, respectively. When the traction portions deviate from the center portions of the both disks 2, 4, sideslip occurs at the traction portions between the peripheral surfaces 9a, 9a of the power rollers 9, 9 and the inner surfaces 2a, 4a of these both disks 2, 4. The known feedback mechanism operates based on the occurrence of such sideslip thereby to return the traction portions to the center portions of the both disks 2, 4. That is, the trunnions 7, 7 swingably displace around the pivot shafts 6, 6 together with the power rollers 9, 9 based on the sideslip, respectively, whereby the precess cam 23 displaces the spool 21 (see FIG. 18) of the control valve 18 through the link arm 24. Then, the pressure oil is supplied to and discharged from the actuators 17, 17 to displace the trunnions 7, 7 in the axial direction of the pivot shafts 6, 6 thereby to return the traction portions to the center portions of the both disks 2, 4, respectively. In this case, since an instruction signal for transmission is not delivered, the sleeve 20 (see FIG, 18) of the control valve 18 remains at the current position (does not displace in the axial direction). As a result, the power rollers 9, 9 perform the transmission operation despite that the instruction signal for transmission is not delivered. Then, the precess cam 23 exists at the position shown by the chain line B which is shifted by $\delta_1$ in the axial direction from the normal position shown by the chain line A.

Further, FIG. 22C shows a case of transmitting a large power between the input side disk 2 and the output side disk 4. In this case, the force ② as well as the force ① acts to shift the precess cam 23 from the normal position.

That is, in this state shown by FIG. 22C, the slanted angle of the displacement shafts 8, 8 becomes larger than the case shown in FIG. 22B and also the elastic deformation of the trunnions 7, 7 increases to the non-negligible degree. In this case, the intermediate portions of the trunnions 7, 7 elastically deform based on the thrust loads applied from the power rollers 9, 9 in a direction that the inner surface sides of the intermediate portions of the trunnions at which the power rollers 9, 9 are provided form concave surfaces as exaggeratingly shown in FIG. 22C. The entire length of each of the trunnions 7, 7 relating to the axial direction of the pivot shafts 6, 6 becomes shorter based on the elastic deformation. To be more concrete, the both side surfaces of each of the trunnions along the longitudinal direction thereof displace in the direction approaching to the longitudinal center portion of each of the trunnions 7, 7.

As a result of the displacement, the precess cam 23 further shifts by $\delta_2$ from the position shown by the chain line B as compared with the case shown in FIG. 22B. That is, in this state, the displacement amount of the precess cam 23 from the normal position shown by the chain line B becomes $(\delta_1+\delta_2)$. Thus, the contact portions (traction portions) between the peripheral surfaces 9a, 9a of the power rollers 9, 9 and the inner surfaces 2a, 4a of these both disks 2, 4 deviate by the distance $(\delta_1+\delta_2)$ from the center portions of these both disks 2, 4, respectively. As a result, the power rollers 9, 9 perform the transmission operation in accordance with the distance $(\delta_1+\delta_2)$ despite that the instruction signal for transmission is not delivered. In this respect, the displacement $\delta_2$ is sum of the displacement based on the elastic deformation of the trunnion 7 and the displacement based on the increase of the inclined angle of the displacement shaft 8.

In this manner in the cases shown in FIGS. 22B and 22C, the transmission operation is performed despite that the instruction signal for transmission is not delivered. The degree of the transmission in these cases is proportional to the axial displacement $\{\delta_1$ or $(\delta_1+\delta_2)\}$ and the cam lead of the precess cam 23. For example, in the case where the cam lead is 20 mm/360 degrees, when the aforesaid displacement is 0.3 mm, the power rollers 9, 9 rotate by 5.4 degrees (that is, swingably rotate around the pivot shafts 6, 6). Thus, it is important to suppress the displacement of the precess cam 23 to a small value in order to suppress the non-intentional transmission operation based on the aforesaid reason etc.

The non-intentional transmission operation is also generated by the swinging of the rod 22 based on the elastic deformation of the trunnion 7 at which the precess cam 23 is provided. Such a phenomenon will be explained with reference to FIG. 23. At the time of the power transmission, the trunnion 7 elastically deforms based on the thrust load applied from the power roller 9 supported by the inner surface of the trunnion in a direction that the inner surface side of the trunnion forms a concave surface as shown in FIG. 23 in which the center portion of the trunnion is shown by a thick chain line in an exaggeration manner. Then, the rod 22, which base end portion (the upper end portion in FIG. 23) is coupled and fixed to the end portion of the trunnion 7, displaces based on the elastic deformation. The more the thrust load becomes, the more the displacement amount relating the radial direction of the tip end portion (the lower end portion in FIG. 23) of the rod 22 at which the precess cam 23 is mounted becomes. Such displacement also becomes the cause of the aforesaid non-intentional transmission operation.

As clear from the aforesaid explanation, an amount of the displacement of the precess cam 23 from the normal position that is the cause of the non-intentional transmission operation changes in accordance with the magnitude of the force applied to the power roller 9. The magnitude of the force applied to the power roller 9 changes almost in proportional to the magnitude of the torque transmitted by the toroidal type continuously variable transmission. Thus, the transmission ratio of the toroidal type continuously variable transmission changes in accordance with the change of the torque even in a state where the signal for changing the transmission ratio is not delivered.

In any case, when the non-intentional transmission operation is performed, instantaneously the rotation speed of the engine changes abruptly, and so a driver feels uncomfortable feeling. Although it is difficult to completely eliminate such a non-intentional transmission operation, it is important to suppress the non-intentional transmission operation to a minimum degree in an aspect of performing the stable operation thereby not to apply uncomfortable feeling to a driver.

In particular, in the case of the continuously variable transmission apparatus configured by combining the toroidal type continuously variable transmission 32 and the planetary gear mechanism 33 as shown in FIG. 19, as clear from the right end side portion of the chain line c of FIG. 20, the transmission direction of the torque is reversed the moment the clutch is switched between the low speed clutch 48 and the high speed clutch 49. In such a construction, the unnecessary fluctuation of the transmission ratio accompanied by the change of the torque transmitted through the toroidal type continuously variable transmission 32 becomes large, and so uncomfortable feeling applied to a driver becomes likely remarkable. This matter will be explained with reference to FIGS. 24A to 24C.

It is supposed that a torque transmitted through the toroidal type continuously variable transmission is continuously changed from a positive value to a negative value as shown in FIG. 24A, and in this case the instruction signal for the transmission is not delivered as shown in of FIG. 24B (the sleeve 20 of the control valve 18 shown in FIG. 18 is not displaced). In this case, the transmission ratio of the toroidal type continuously variable transmission varies by the aforesaid forces ①, ② in correspondence with the aforesaid change of the torque as shown in FIG. 24C. In this respect, even if the torque changes linearly, the transmission ratio changes non-linearly.

In order to suppress the variation of the transmission ratio shown in FIG. 24C, it is considered to deliver the instruction signal for the transmission in correspondence with the change of the torque passing through the toroidal type continuously variable transmission as shown in FIGS. 25A to 25C (to displace the sleeve 20 of the control valve 18 shown in FIG. 18). That is, the instruction signal for the transmission is delivered as shown in FIG. 25B in correspondence with the change of the torque as shown in FIG. 25A. As a result, the variation of the transmission ratio of the toroidal type continuously variable transmission can be suppressed to a small degree as shown in FIG. 25C.

In this respect, as clear from the comparison between FIGS. 25A and 25C, since the changing direction of the torque does not coincide with the changing direction of the transmission ratio over the entire region of the changing. Thus, even when the instruction signal for the transmission is delivered merely in correspondence with the change of the torque, there is a case where it is difficult to sufficiently eliminate the unnecessary transmission. That is, even in the case where such control operations shown in FIGS. 25A and 25B are performed, the unnecessary change of the transmission ratio is still caused as shown in FIG. 25C based on the difference between the changing direction of the torque and the changing direction of the transmission ratio.

SUMMARY OF THE INVENTION

An object of the invention is performed so as to suppress an unintentional transmission operation to a smaller degree in view of the aforesaid circumstances.

To attain the object, according to a first aspect of the invention, there is provided a toroidal type continuously variable transmission comprising:

first and second disks each having a concave-shaped inner surface with an arc shape in section, the first and second disks being supported concentrically to be rotatable independently in a state that the inner surfaces thereof are opposed to each other;

a plurality of trunnions each swingably rotating around pivot shafts which are disposed at twisted positions with respect to a center shaft of the first and second disks;

displacement shafts each being supported by an intermediate portion of corresponding one of the trunnions in a state of protruding from an inner surface of the corresponding one of the trunnions;

power rollers each having a spherical convex-shaped periphery and disposed on an inner surface side of corresponding one of the trunnions, each of the power rollers being supported around a periphery of corresponding one of the displacement shafts to be rotatable in a state of being sandwiched between the first and second disks;

a pressing device which presses the first disk toward the second disk, the pressing device generating a first pressing force corresponding to a magnitude of a torque transmitted between the first and second disks and a second pressing force independent from the torque; and a controller controlling the pressing device to generate the second pressing force in accordance with a signal, wherein, when a magnitude of a torque transmitted between the first and second disks varies, the controller controls the pressing device to continuously generate a predetermined pressing force equal to or more than a pressing force necessary for transmitting a larger torque before and after the variation during the variation.

Further, according to a second aspect of the invention, in the toroidal type continuously variable transmission according to the first aspect, the pressing device is a hydraulic type actuator which generates a pressing force according to a hydraulic pressure in accordance with supply of pressure oil.

Moreover, according to a third aspect of the invention, there is provided a continuously variable transmission apparatus comprising:

an input shaft coupled to a driving source and driven and rotated by the driving source;

an output shaft for taking out a power based on the rotation of the input shaft;

a toroidal type continuously variable transmission;

a planetary gear mechanism;

a first power transmission path for transmitting a power inputted into the input shaft through the toroidal type continuously variable transmission;

a second power transmission path for transmitting the power inputted into the input shaft without passing through the toroidal type continuously variable transmission; and a mode switching device for switching a state where the power inputted into the input shaft is transmitted to the planetary gear mechanism through the first power transmission path and the second power transmission path, wherein the toroidal type continuously variable transmission includes:

first and second disks each having a concave-shaped inner surface with an arc shape in section, the first and second disks being supported concentrically to be rotatable independently in a state that the inner surfaces thereof are opposed to each other;

a plurality of trunnions each swingably rotating around pivot shafts which are disposed at twisted positions with respect to a center shaft of the first and second disks;

displacement shafts each being supported by an intermediate portion of corresponding one of the trunnions in a state of protruding from an inner surface of the corresponding one of the trunnions;

power rollers each having a spherical convex-shaped periphery and disposed on an inner surface side of corresponding one of the trunnions, each of the power rollers being supported around a periphery of corresponding one of the displacement shafts to be rotatable in a state of being sandwiched between the first and second disks;

a pressing device which presses the first disk toward the second disk, the pressing device generating a first pressing force corresponding to a magnitude of a torque transmitted between the first and second disks and a second pressing force independent from the torque; and a controller controlling the pressing device to generate the second pressing force in accordance with a signal, wherein, when a magnitude of a torque transmitted between the first and second disks varies, the controller controls the pressing device to continuously generate a predetermined pressing force equal to or more than a pressing force necessary for transmitting a larger torque before and after the variation during the variation, wherein the planetary gear mechanism includes:
    a sun gear;
    a ring gear disposed at periphery of the sun gear;
    a planetary gear provided between the sun gear and the ring gear; and
    a carrier for rotatably supporting the planetary gear, wherein a power transmitted through the first power transmission path and a power transmitted through the second power transmission path is freely transmitted to two of the sun gear, the ring gear and the carrier, and remaining one of the sun gear, the ring gear and the carrier is coupled to the output shaft, wherein the mode switching device switches at least between a first mode for transmitting power only through the first power transmission path and a second mode for transmitting power through both the first power transmission path and the second power transmission path, and wherein the controller of the toroidal type continuously variable transmission controls the pressing device, during the switching of the mode switching device between the first mode and the second mode, to continuously generate a predetermined pressing force equal to or more than a pressing force necessary for transmitting a larger torque before and after the switching.

In addition, according to a fourth aspect of the invention, in the continuously variable transmission apparatus according to the third aspect, the first power transmission path is formed by a first power transmission mechanism, the first power transmission mechanism including:

a first transmission shaft in parallel to the input shaft and the output shaft;

a first sprocket fixed to one end portion of the first transmission shaft;

a second sprocket fixed to the second disk being an output side disk;

a chain hung over between the first sprocket and the second sprocket; and first and second gears meshed to each other and fixed to the other end portion of the first transmission shaft and the carrier, respectively.

Further, according to a fifth aspect of the invention, in the continuously variable transmission apparatus according to the third aspect, the second power transmission path is formed by a second transmission shaft disposed concentrically with the input shaft.

Moreover, according to a sixth aspect of the invention, in the continuously variable transmission apparatus according to the third aspect, the mode switching device is formed by a clutch mechanism, the clutch mechanism including:

a high speed clutch; and a low speed clutch provided between an outer peripheral edge portion of the carrier and one end portion of the ring gear in axial direction thereof.

Additionally, according to a seventh aspect of the invention, in the continuously variable transmission apparatus according to the third aspect, the toroidal type continuously variable transmission is a double cavity type having a pair of input side disks and a pair of output side disks, and wherein the first power transmission path is formed by a first power transmission mechanism, the first power transmission mechanism including:
    a first transmission shaft in parallel to the input shaft and the output shaft;
    a third gear fixed to one end potion of the first transmission shaft;
    an output gear provided at an outer peripheral surface of an intermediate potion of an output sleeve engaged with both ends of the pair of output side disks;
    a fourth gear supported by an outer peripheral surface of a sleeve rotatably disposed at periphery of an intermediate portion of the output shaft; and
    a fifth gear fixedly provided at the other end portion of the first transmission shaft and meshed with the fourth gear through an idle gear.

Further, according to an eighth aspect of the invention, there is provided a continuously variable transmission apparatus comprising:

an input shaft coupled to a driving source and driven and rotated by the driving source;

an output shaft for taking out a power based on the rotation of the input shaft;

a toroidal type continuously variable transmission;

a planetary gear mechanism;

a first power transmission path for transmitting a power inputted into the input shaft through the toroidal type continuously variable transmission;

a second power transmission path for transmitting the power inputted into the input shaft without passing through the toroidal type continuously variable transmission; and a mode switching device for switching a state where the power inputted into the input shaft is transmitted to the planetary gear mechanism through the first power transmission path and the second power transmission path, wherein the toroidal type continuously variable transmission includes:

first and second disks each having a concave-shaped inner surface with an arc shape in section, the first and second disks being supported concentrically to be rotatable independently in a state that the inner surfaces thereof are opposed to each other;

a plurality of trunnions each swingably rotating around pivot shafts which are disposed at twisted positions with respect to a center shaft of the first and second disks;

displacement shafts each being supported by an intermediate portion of corresponding one of the trunnions in a state of protruding from an inner surface of the corresponding one of the trunnions;

power rollers each having a spherical convex-shaped periphery and disposed on an inner surface side of corresponding one of the trunnions, each of the power rollers being supported around a periphery of corresponding one of the displacement shafts to be rotatable in a state of being sandwiched between the first and second disks;

a pressing device which presses the first disk toward the second disk, the pressing device generating a first pressing force corresponding to a magnitude of a torque transmitted between the first and second disks and a second pressing force independent from the torque; and a controller controlling the pressing device to generate the second pressing force in accordance with a signal, wherein, when a magnitude of a torque transmitted between the first and second disks varies, the controller controls the pressing device to continuously generate a predetermined pressing force equal to or more than a pressing force necessary for transmitting a larger torque before and after the variation during the variation, wherein the planetary gear mechanism includes:
a sun gear;
a ring gear disposed at periphery of the sun gear;
a planetary gear provided between the sun gear and the ring gear; and
a carrier for rotatably supporting the planetary gear,
wherein a power transmitted through the first power transmission path and a power transmitted through the second power transmission path is freely transmitted to two of the sun gear, the ring gear and the carrier,
wherein the mode switching device switches between a mode for transmitting power at a low speed and a mode for transmitting power at a high speed, and
wherein the controller of the toroidal type continuously variable transmission controls the pressing device, during the switching of the mode switching device between the mode for transmitting power at a low speed and the mode for transmitting power at a high speed, to continuously generate a predetermined pressing force equal to or more than a pressing force necessary for transmitting a larger torque before and after the switching.

In the case of implementing the invention, under such a condition that the variation width of a torque can be predicted when the torque changes abruptly, a pressing force corresponding to a larger torque is generated based on the prediction. For example, in the case of the continuously variable transmission apparatus as described above, at the time of switching the clutch between the first mode and the second mode (low speed high speed), the magnitude of a torque applied to the toroidal type continuously variable transmission before and after the switching of the clutch can be predicted. Thus, in such a case, a suitable pressing force (a pressing force making it possible to transmit a larger torque) is generated from the pressing device based on the prediction according to signals of clutch switching and from an acceleration sensor etc. In contrast, when it is impossible to predict the torque variation in such cases of abrupt acceleration, an abrupt operation of an engine brake etc., it is realistic that the pressing device generates a pressing force (a pressing force capable of obtaining a contact pressure which makes it possible to transmit the maximum torque) corresponding to the maximum value of a torque (the maximum torque of an engine to be coupled) capable of being transmitted by the toroidal type continuously variable transmission. The reason is as follows. When the torque decreases abruptly, it is not necessarily required to generate a pressing force corresponding to the maximum torque so long as a pressing force corresponding to the torque just before the abrupt reduction of the torque. In contrast, when the torque increases abruptly, it cannot necessarily be predicted as to how the torque increases thereafter. When the engine brake is operated abruptly, although the transmission direction of the torque differs from the above case, also it can not necessarily be predicted as to how the torque increases thereafter. In order to effectively prevent the variation of the transmission ratio, it is necessary to increase the pressing force immediately by the controller in a state where the sign or indication of the torque variation is detected by the acceleration sensor etc. Thus, under a condition that the variation width of a torque can not be predicted, if the controller is arranged to have a function of generating a pressing force corresponding to the maximum torque immediately after the detection of the sensor for detecting the sign of the torque variation or the detection of the control resulting in the torque variation such as the switching of the clutch between the first mode and the second mode (low speed high speed) the variation of the transmission ratio can be prevented effectively. Of course, after the variation of the torque is converged, the controller returns to the normal control in which a pressing force corresponding to the torque to be transmitted is generated. The torque variation at the time of returning to the normal operation in this manner is known in the changing direction and the magnitude. Thus, it is easy to perform the control for suppressing the variation of the transmission ratio based on the torque variation at this time.

According to the toroidal type continuously variable transmission of the invention configured in the aforesaid manner, the variation of the transmission ratio at the time of the variation of the torque to be transmitted can be suppressed and the uncomfortable feeling applied to a driver can be reduced or eliminated.

That is, according to the toroidal type continuously variable transmission of the invention, even when the torque to be transmitted varies, the magnitude of a pressing force applied from the pressing device toward the first and second disks does not change. Thus, the variation of the transmission ratio based on the changes of the displacement amounts at the respective constituent portions based on the torque variation can be suppressed and so the unnecessarily change of the transmission ratio at the time of torque variation can be suppressed.

BRIEF DESCRIPTION OF THE DRAWINGS

FIGS. 5A to 5F are diagrams showing the result of computer analysis performed for confirming the effects of the invention;

FIG. 6 is a diagram showing the result of the first experimentation performed for confirming the effects of the invention;

DETAILED DESCRIPTION OF THE PREFERRED EMBODIMENTS

Figure 1:
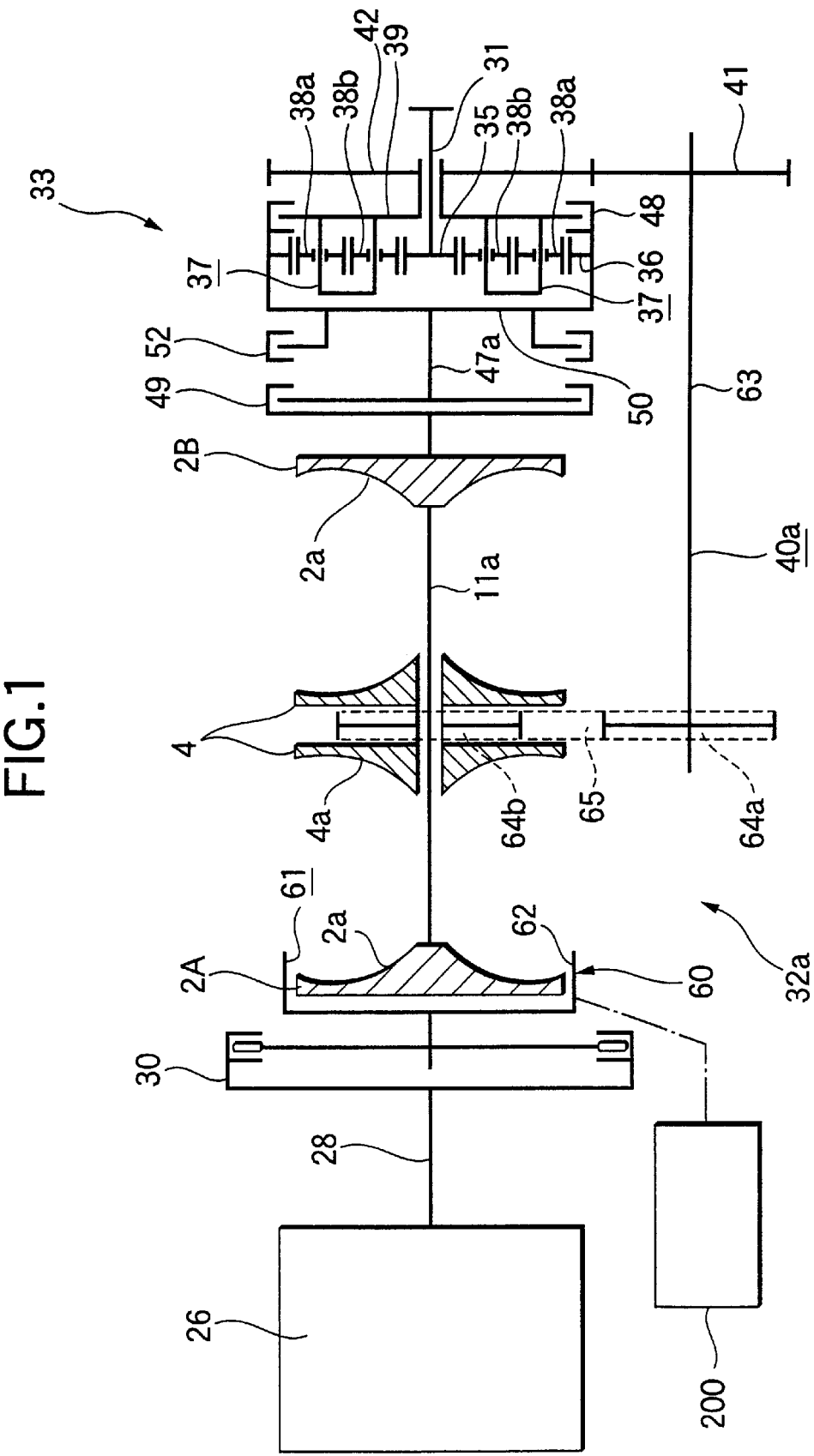
FIG. 1 is a schematic sectional view showing a first example of a structure in which the present invention is implemented.

FIG. 1 shows a first example of the embodiment of the present invention. The feature of the toroidal type continuously variable transmission according to the invention resides in that in order to suppress the variation of the transmission ratio when a torque to be transmitted varies, this torque variation does not lead to the variations of the deformation values of the respective portions. The construction of other portions shown in the drawings and the actions at the time of transmitting the power between an input portion and an output portion and changing a transmission ratio between the input portion and the output portion are similar to those of the conventionally known toroidal type continuously variable transmission. That is, the construction of the continuously variable transmission apparatus shown in FIG. 1 is similar to that disclosed in U.S. Pat. No. 6,171,210. In this respect, in the case of the toroidal type continuously variable transmission incorporated into the continuously variable transmission apparatus described in the publication, it is not performed to maintain the pressing force of the hydraulic type pressing device to a value corresponding to a large value of varying torques.

First, the construction of the continuously variable transmission apparatus shown in FIG. 1 will be explained. The continuously variable transmission apparatus is formed by combining a double cavity type toroidal type continuously variable transmission 32a and a planetary gear mechanism 33. Like the case of the conventional continuously variable transmission apparatus shown in FIG. 19, a power is transmitted only by the toroidal type continuously variable transmission 32 at the time of low speed running, whilst the power is transmitted mainly by the planetary gear mechanism 33 at the time of high speed running. Further, the transmission ratio of the planetary gear mechanism 33 is set to be adjusted freely by changing the transmission ratio of the toroidal type continuously variable transmission 32a.

To this end, the base end portion (the right end portion in FIG. 1) of an input shaft 11a which passes through the center portion of the toroidal type continuously variable transmission 32a and supports a pair of input side disks 2A, 2B at both end portions thereof is coupled through a high speed clutch 49 with a second transmission shaft 47a which is fixed to the center portion of a supporting plate 50 supporting a ring gear 36 constituting the planetary gear mechanism 33. The input side disk 2B on the tip end side (the right side in FIG. 1) of the pair of the input side disks 2A and 2B is supported with respect to the input shaft 11a in a state that, for example, like the conventional structure shown in FIGS. 16 to 17, the input side disk 2B rotates in synchronous with the input shaft 11a and the substantial movement of the input side disk 2B relating to the axial direction of the input shaft 11a is prevented. In contrast, the input side disk 2A on the base end side (the left side in FIG. 1) is supported with respect to the input shaft 11a so as to rotate in synchronous with the input shaft 11a and to move freely in relation to the axial direction of the input shaft 11a, also like the conventional structure shown in FIGS. 16 to 17, for example. In any case, since the configuration of the toroidal type continuously variable transmission 32a is substantially same as the aforesaid conventional structure shown in FIGS. 16 to 17 except for a pressing device 60 described later, the detailed drawings and explanation thereof are omitted.

A starter clutch 30 and the hydraulic type pressing device 60 are provided in series to each other with respect to the transmission direction of the power between the output side end portion (the right end portion in FIG. 1) of the crank shaft 28 of an engine 26 as a driving source and the input side end portion (the base end portion =the left end portion in FIG. 1) of the input shaft 11a. The pressing device 60 is constituted in a manner that the input side disk 2A of the base end side is fitted within a cylinder 61 in an oil-tight manner and so as to freely transmit the rotational power. To this end, for example, the outer peripheral edge portion of the input side disk 2A is made in contact slidably through a sealing (not shown) such as an O-ring etc. on the inner peripheral surface of a peripheral wall portion 62 constituting the cylinder 61 in an oil-tight manner and so as to freely displace in the axial direction. Further, a power transmission mechanism is provided between the input side disk 2A and the cylinder 61. As the power transmission mechanism, a suitable construction may be employed such as a key engagement portion provided at a portion not influencing on a sealing structure for holding the oil-tight state, or a spline engagement portion for a spline shaft (not shown) fixed at the center portion of the cylinder 61 and a spline hole (not shown) formed at the input side disk 2A or the base end center portion of the input shaft 11a. In any case, desired oil pressure can be freely introduced within the cylinder 61 based on the signal of a controller 200. In this manner, since the subject matter of the invention resides in the control of the oil pressure introduced within the cylinder 61, this matter will be described in detail later.

An output shaft 31 for taking out a power based on the rotation of the input shaft 11a is disposed concentrically with the input shaft 11a. The planetary gear mechanism 33 is provided at the periphery of the output shaft 31. A sun gear 35 constituting the planetary gear mechanism 33 is fixed at the input side end portion (the left end portion in FIG. 1) of the output shaft 31. Thus, the output shaft 31 rotates with the rotation of the sun gear 35. The ring gear 36 is supported at the periphery of the sun gear 35 so as to be concentrically with the sun gear 35 and rotate freely. A plurality of planetary gear sets 37, 37 each formed by a pair of planetary gears 38a, 38b are provided between the inner peripheral surface of the ring gear 36 and the outer peripheral surface of the sun gear 35. The pair of the planetary gears 38a, 38b mesh to each other. Further, the planetary gear 38a disposed on the outer diameter side is meshed with the ring gear 36, and the planetary gear 38b disposed on the inner diameter side is meshed with the sun gear 35. The planetary gear sets 37, 37 are supported at the one side surface (the left side surface in FIG. 1) of a carrier 39 so as to rotate freely. The carrier 39 is supported at the intermediate portion of the output shaft 31 so as to rotate freely.

The carrier 39 and the pair of the output side disks 4, 4 constituting the toroidal type continuously variable transmission 32a are coupled in a state of being capable of transmitting rotation force by a first power transmission mechanism 40a. The first power transmission mechanism 40a constituting a first power transmission path is formed by a first transmission shaft 63 in parallel to the input shaft 11a and the output shaft 31, a chain 65 hung over between a first sprocket 64a fixed to the one end portion (the left end portion in FIG. 1) of the first transmission shaft 63 and a second sprocket 64b fixed to the output side disks 4, 4, and first and second gears 41, 42 fixed to the other end (the right end in FIG. 1) of the first transmission shaft 63 and the carrier 39 and meshed to each other. Thus, the carrier 39 rotates at a speed according to the numbers of the gear teeth of the first and second gears 41, 42 in accordance with the rotation of the output side disk 4 in the direction opposite to the rotation direction of the output side disk 4. This is the case where the numbers of the gear teeth of the pair of the sprockets 64a, 64b are same.

The input shaft 11a and the ring gear 36 are coupled freely in a state of being capable of transmitting rotation force through the second transmission shaft 47a disposed concentrically with the input shaft 11a. The high speed clutch 49 is provided in series with the both shafts 47a, 11a between the second transmission shaft 47a and the input shaft 11a. Thus, in this example, a second power transmission path is formed by the second transmission shaft 47a. At the time of engaging the high speed clutch 49, the second transmission shaft 47a rotates in the same direction as the input shaft 11a at the same speed there with in accordance with the rotation of the input shaft 11a.

The continuously variable transmission apparatus includes a clutch mechanism constituting a mode switching device. The clutch mechanism couples only one of the carrier 39 and the input shaft 11a to the ring gear 36. In this example, the clutch mechanism is constituted by the high speed clutch 49 and a low speed clutch 48 provided between the outer peripheral edge portion of the carrier 39 and the one end portion (the right end portion in FIG. 1) of the ring gear 36 in the axial direction thereof. The low speed clutch 48 and the high speed clutch 49 are arranged in a manner that when one of these clutches is engaged, the other clutch is disengaged. In the example shown in FIG. 1, a reverse clutch 52 is provided between the ring gear 36 and a fixed portion such as the housing (not shown) of the continuously variable transmission apparatus. The reverse clutch 52 is disengaged in a state where one of the low speed clutch 48 and the high speed clutch 49 is engaged. In a state where the reverse clutch 52 is engaged, each of the low speed clutch 48 and the high speed clutch 49 is disengaged.

First, at the time of the low speed running, the continuously variable transmission apparatus configured in the aforesaid manner engages the low speed clutch 48 and disengages the high speed clutch 49 and the reverse clutch 52. When the starter clutch 30 is engaged to rotate the input shaft 11a in this state, only the toroidal type continuously variable transmission 32a transmits the power from the input shaft 11a to the output shaft 31. In such a low speed running, the transmission ratio between the pair of the input side disks 2A, 2B and the pair of the output side disks 4, 4 is adjusted like the case employing only the toroidal type continuously variable transmission shown in FIGS. 16 to 18.

In contrast, at the time of the high speed running, the high speed clutch 49 is engaged and each of the low speed clutch 48 and the reverse clutch 52 is disengaged. When the starter clutch 30 is engaged to rotate the input shaft 11a in this state, the second transmission shaft 47a and the planetary gear mechanism 33 transmit the power from the input shaft 11a to the output shaft 31. That is, when the input shaft 11a rotates at the time of the high speed running, this rotation is transmitted to the ring gear 36 through the high speed clutch 49 and the second transmission shaft 47a. Then, the rotation of the ring gear 36 is transmitted to the sun gear 35 through the plurality of the planetary gear sets 37, 37 thereby to rotate the output shaft 31 to which the sun gear 35 is fixed. When the transmission ratio of the transmission 32a is changed in this state to change the revolution speed of the planetary gear sets 37, 37, the transmission ratio of the entirety of the continuously variable transmission apparatus can be adjusted. This point is same as the conventional structure shown in FIG. 19.

Further, at the time of rotating the output shaft 31 reversely so as to move an automobile backward, each of the low speed clutch 48 and the high speed clutch 49 is disengaged and the reverse clutch 52 is engaged. As a result, the ring gear 36 is fixed, and the planetary gear sets 37, 37 revolve around the sun gear 35 while being meshed with the ring gear 36 and the sun gear 35. Then, the sun gear 35 and the output shaft 31 fixing the sun gear 35 thereto rotate in the direction opposite to the rotation direction thereof at the time of the low speed running and the high speed running.

Figure 19:
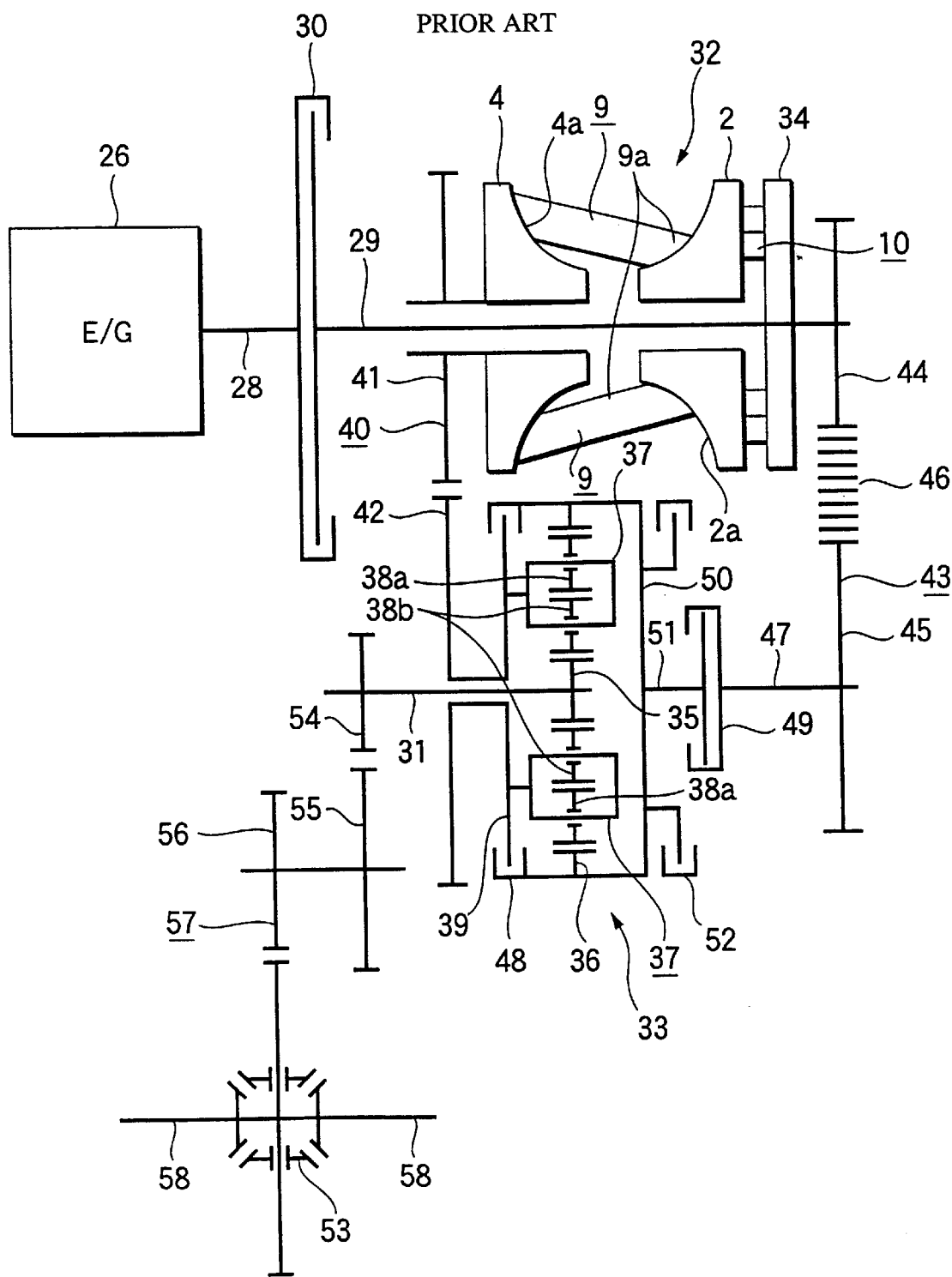
FIG. 19 is a schematic sectional view showing one example of the continuously variable transmission apparatus in which the toroidal type continuously variable transmission is incorporated.
Figure 20:
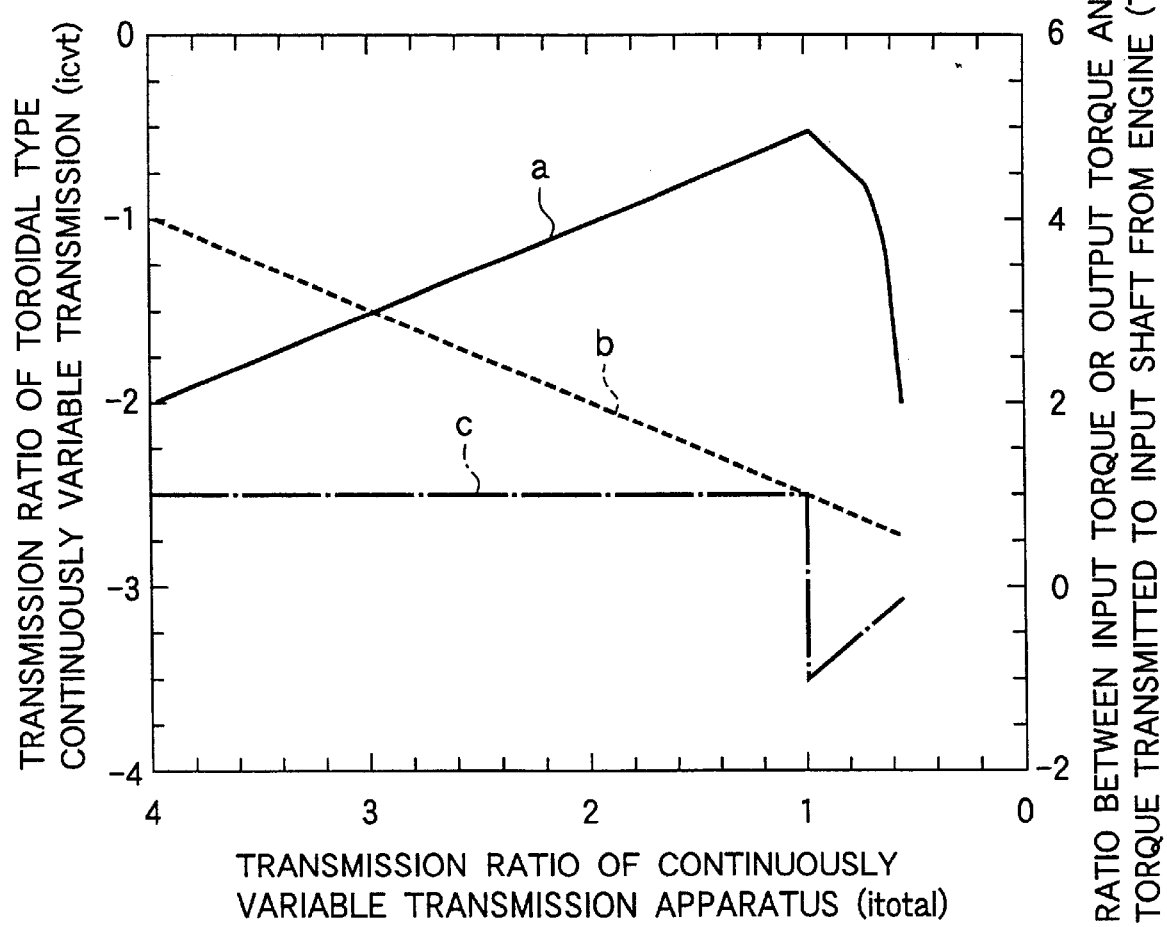
FIG. 20 is a diagram showing a relation among a transmission ratio of the entirety of the continuously variable transmission apparatus, a transmission ratio of only the toroidal type continuously variable transmission, and torques at the respective portions.
Figure 21:
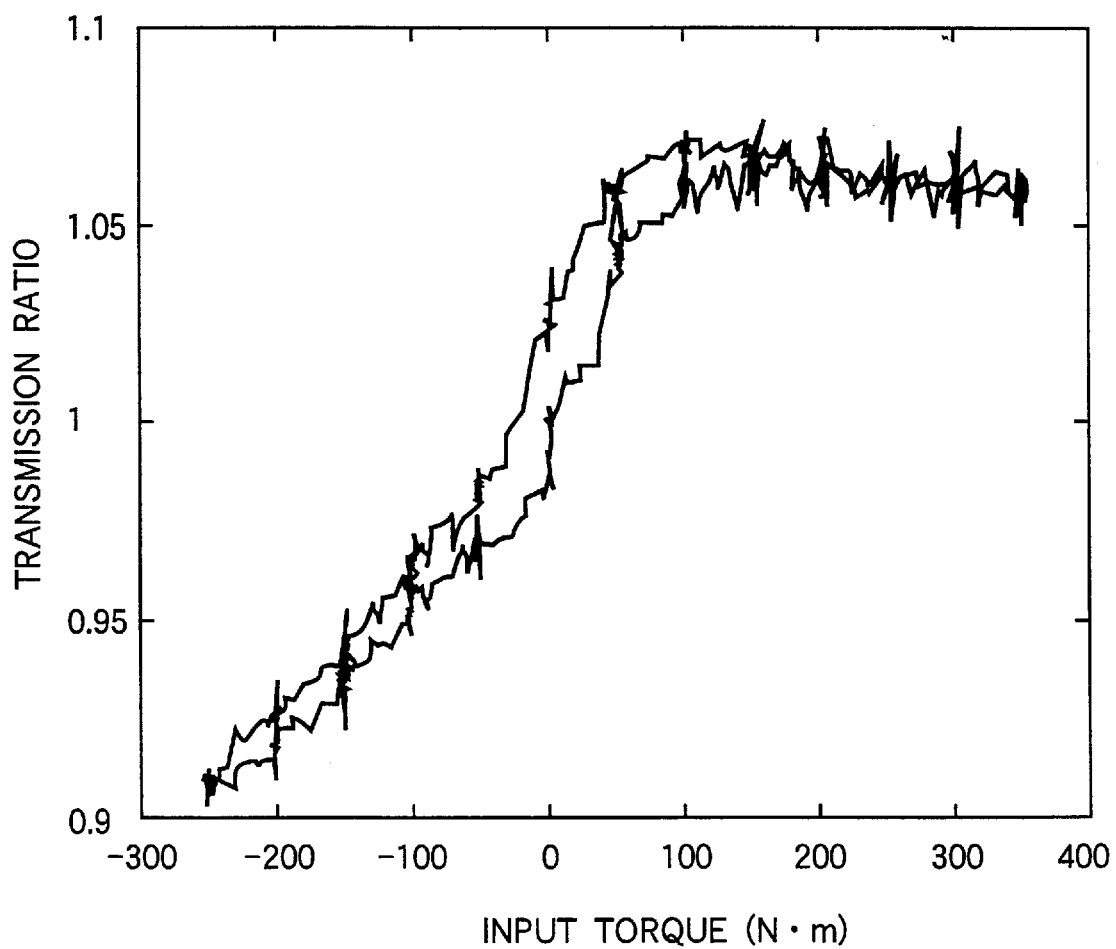
FIG. 21 is a diagram showing a state where the transmission ratio varies in correspondence with the variation of the input torque in the conventional structure.
Figure 22:
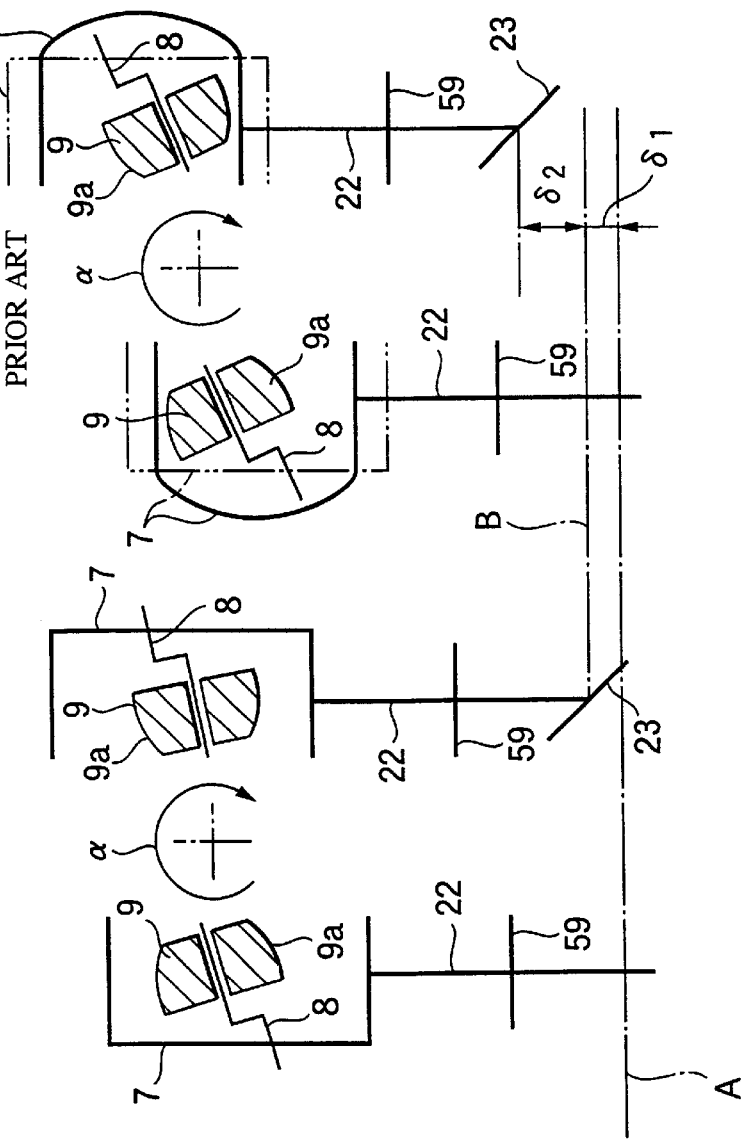
FIGS. 22A to 22C are schematic diagrams for explaining the reason why the transmission ratio varies largely in the conventional structure.
Figure 23:
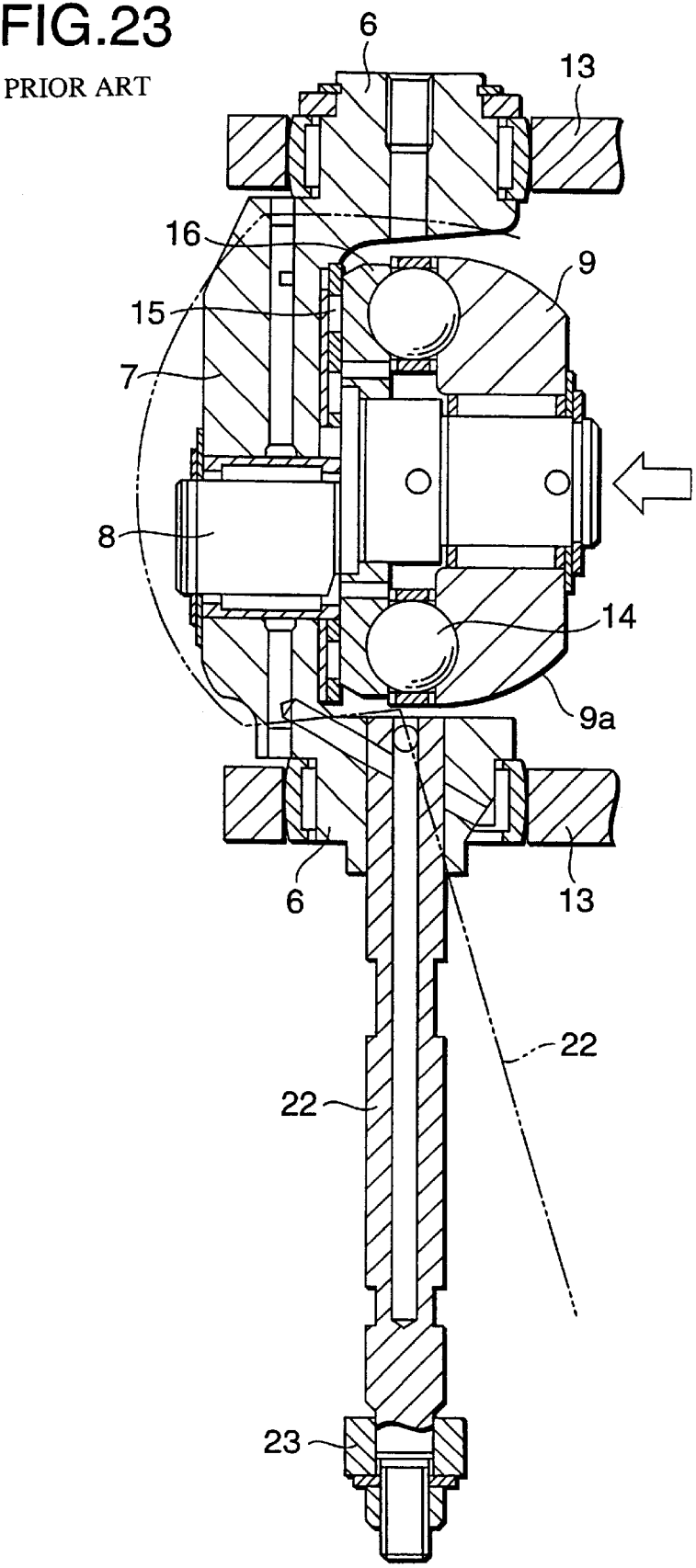
FIG. 23 is a sectional view of a trunnion and a rod for explaining the reason why the elastic deformation of the trunnions results in the variation of the transmission ratio.
Figure 24A:
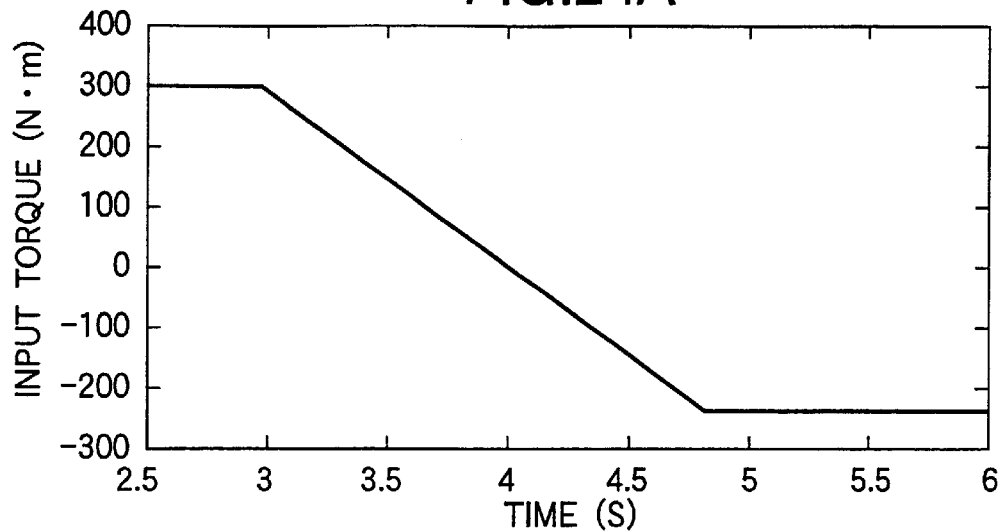
FIGS. 24A to 24C are diagrams for explaining a state where the transmission ratio varies in correspondence with the variation of the torque at the time of performing the conventional control.
Figure 24B:
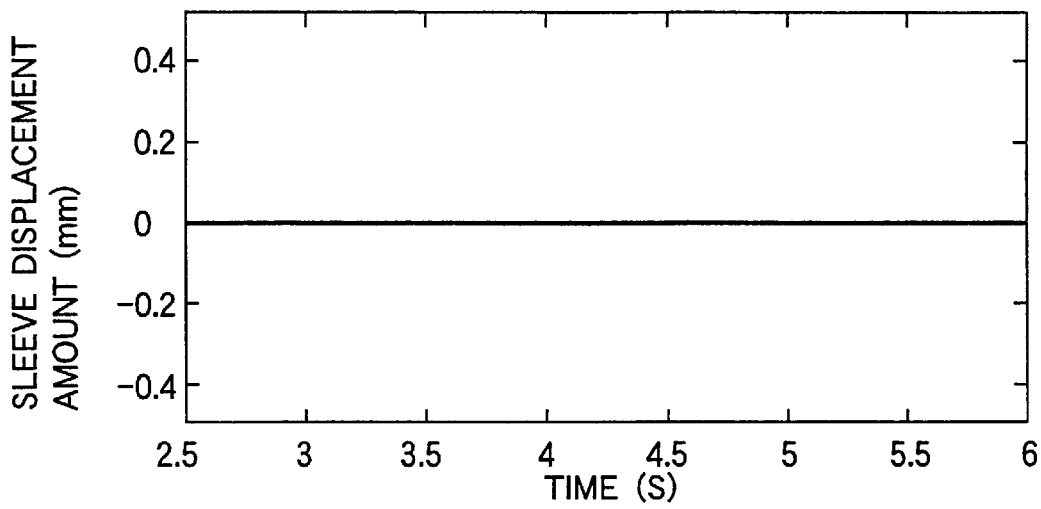
Figure 24C:
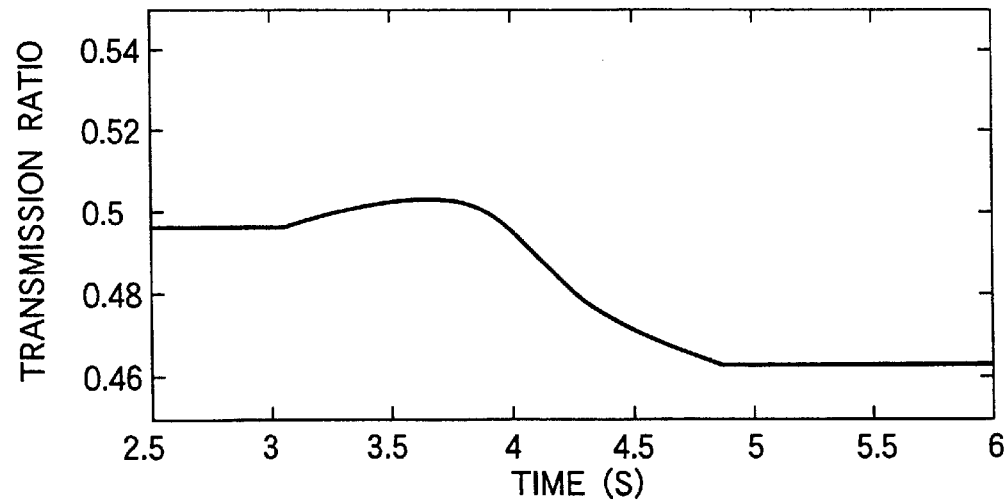
Figure 25A:
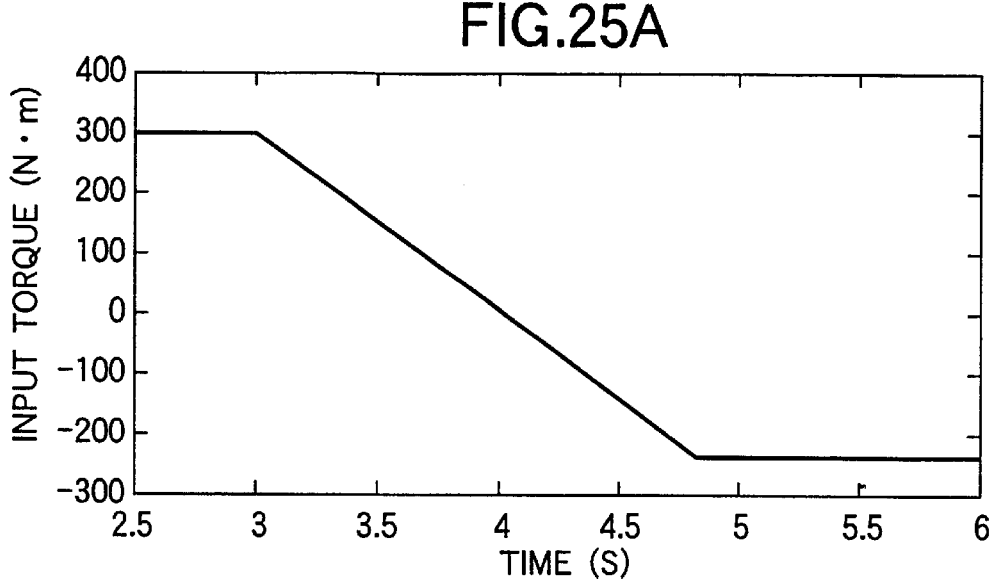
FIGS. 25A to 25C are diagrams for explaining a state where the transmission ratio varies in correspondence with the variation of the torque even when the improved control is performed.
Figure 25B:
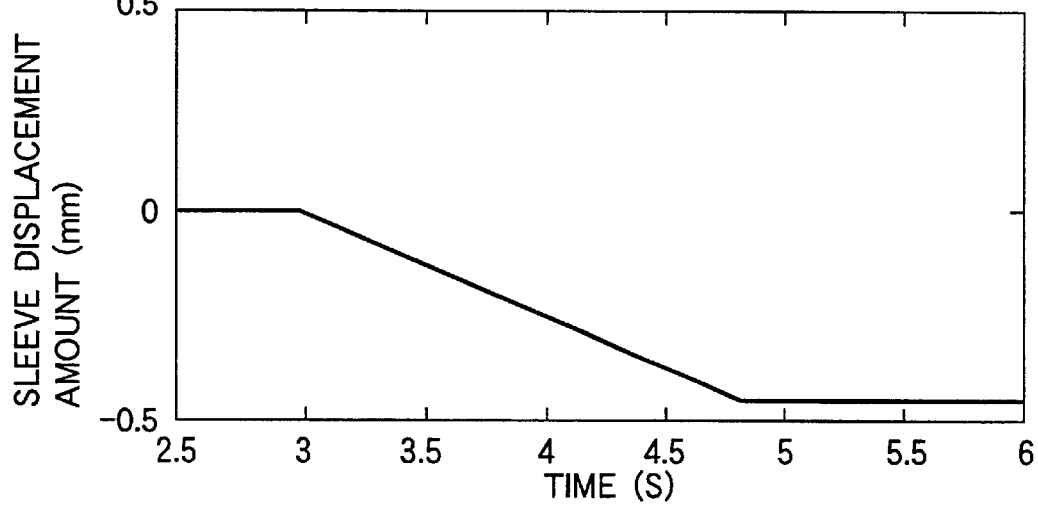
Figure 25C:
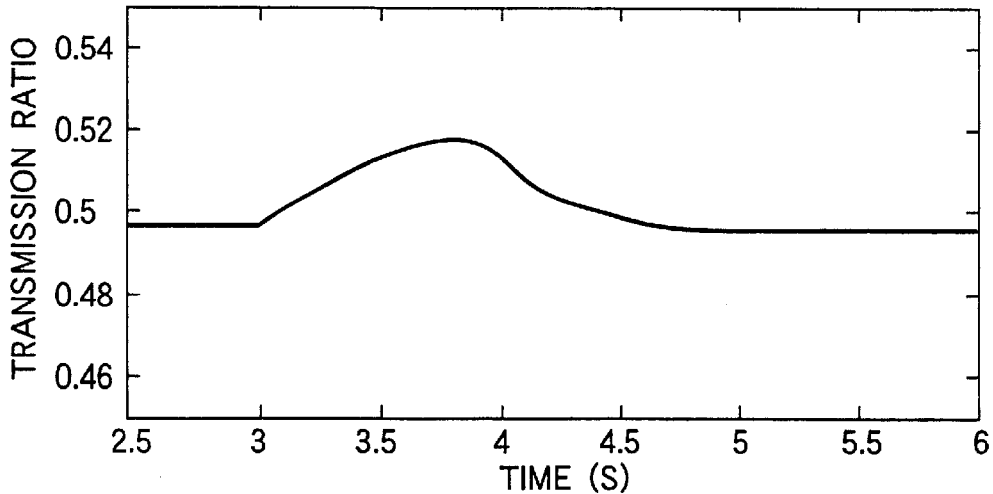

At the time of operating the continuously variable transmission apparatus, like the conventional structure shown in FIG. 19, a torque transmitted through the toroidal type continuously variable transmission 32*a* varies abruptly as shown by the chain line of FIG. 20C upon changing between the low speed running state and the high speed running state. When no countermeasure is taken, as described above, the transmission ratio of the toroidal type continuously variable transmission 32*a* varies inadvertently in accordance with the torque change as described above. In order to suppress such an inadvertent change of the transmission ratio of the toroidal type continuously variable transmission 32*a* at the time of the torque change, the invention employs such a pressing device 60 which is configured in the aforesaid manner, and arranged to generate a first pressing force corresponding to the magnitude of a torque transmitted between the pair of the input side disks 2A, 2B and the pair of the output side disks 4, 4, and to further freely generate a second pressing force independent from the magnitude of the torque based on a signal from the controller 200.

Further, in the case of the toroidal type continuously variable transmission 32*a* of the invention incorporated into the continuously variable transmission apparatus, the controller 200 serves to continuously generate a large pressing force from the pressing device 60 when the magnitude of a torque transmitted between the pair of the input side disks 2A, 2B and the pair of the output side disks 4, 4 changes. That is, at the time of switching between the low speed running state and the high speed running state during the operation of the continuously variable transmission apparatus shown in FIG. 1, the magnitude (direction) of a torque passing through the toroidal type continuously variable transmission 32*a* varies abruptly as shown by the chain line C of FIG. 20C. Such a torque variation is also caused by the abrupt change of the output of the engine not shown in FIG. 20C. When no countermeasure is taken with respect to such a variation, as described above, the transmission ratio of the toroidal type continuously variable transmission 32*a* varies inadvertently In contrast, in the case of the toroidal type continuously variable transmission 32*a* of the invention, during the aforesaid variation of the torque, the pressing device 60 continuously generates a pressing force equal to or more than the pressing force corresponding to the larger torque before and after the torque variation. For example, in such a case where a torque passing through the toroidal type continuously variable transmission 32*a* abruptly increases from 100 N·m to 300 N·m, the controller 200 makes the pressing device 60 generate a pressing force sufficient for securing a contact pressure capable of transmitting the torque of 300 N·m or more before the torque increases actually (that is, from a time point where the torque is still about 100 N·m). On the contrary, in such a case where a torque passing through the toroidal type continuously variable transmission 32*a* abruptly decreases from 300 N·m to 100 N·m, the controller 200 makes the pressing device 60 generate a pressing force sufficient for securing a contact pressure capable of transmitting the torque of 300 N·m or more even after the torque actually decreases sufficiently (that is, the torque decreases to about 100 N·m). In each of these cases, after the torque passing through the toroidal type continuously variable transmission 32*a* becomes stable, the pressing force by the pressing device 60 is set to a value corresponding to a torque actually passing through the toroidal type continuously variable transmission 32*a*.

According to the toroidal type continuously variable transmission of the invention, the vibration of the transmission ratio at the time of the change of the torque to be transmitted can be suppressed and uncomfortable feeling applied to a driver can be reduced or eliminated. That is, in the transmission 32*a* of the invention incorporated into the continuously variable transmission apparatus, the example, even when the torque to be transmitted changes, the magnitude of a force of the pressing device 60 pressing the input side disks 2A, 2B toward the output side disks 4, 4 does not change. Thus, the fluctuation of the transmission ratio based on the displacement changes of the respective constituent portions based on the torque change can be suppressed and so the unnecessary change of the transmission ratio can be suppressed at the time of torque change. This matter will be explained more in detail with reference to FIGS. 2 to 3. In addition, the controller 200 can mechanically control the oil pressure by a hydraulic valve, etc.

Figure 2:
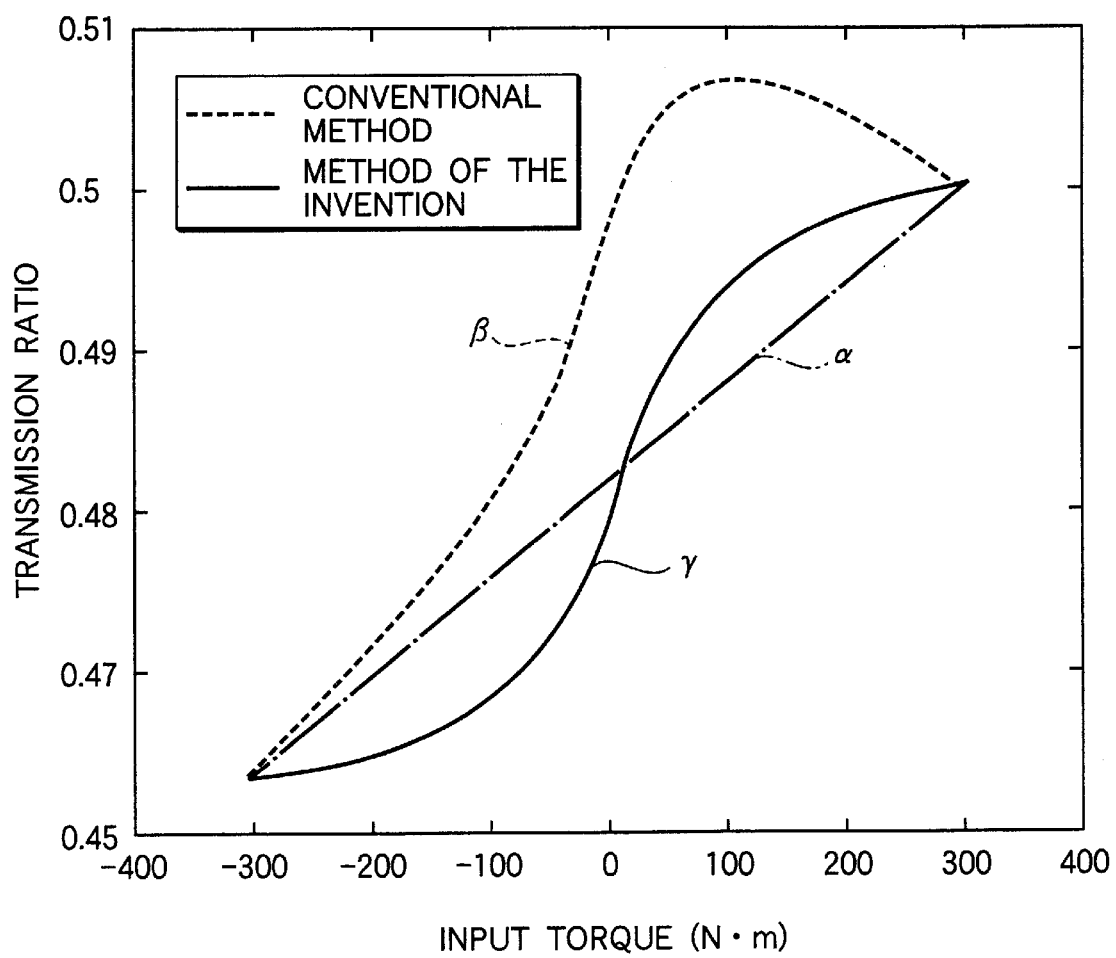
FIG. 2 is a diagram showing the influence of the variation of an input torque on the variation of a transmission ratio.

First, FIG. 2 shows a result where the variation of the transmission ratio between the input side disks 2A, 2B and the output side disks 4, 4 was obtained through computer analysis in the case of changing a torque to be transmitted through the double cavity type toroidal type continuously variable transmission 32*a* incorporated in the continuously variable transmission apparatus as shown in FIG. 1 from −300 N·m to +300 N·m during one second. The variation of the transmission ratio is inevitable since the respective constituent portions elastically deform in accordance with the change of the transmission torque. However, when the transmission ratio changes linearly in accordance with the change of the transmission torque as shown by a chain line α in FIG. 2, it is easy to perform such a control of suppressing the variation (unnecessary variation of the transmission ratio). That is, in this case, the variation of the transmission ratio can be eliminated or reduced by displacing the spool 21 (see FIG. 18) of a control valve 18 based on a signal from a torque sensor for detecting a torque transmitted by the toroidal type continuously variable transmission 32*a*.

In contrast, in the conventional structure incorporating a pressing device for generating a pressing force in accordance with a torque transmitted by the toroidal type continuously variable transmission, the transmission ratio changes in accordance with the change of the transmission torque in a state of largely deviating from the chain line α as shown by a broken line β in FIG. 2 (that is, an extremely non-linear state). On the other hand, in the case of the toroidal type continuously variable transmission 32*a* incorporating the pressing device 60 for performing the control like the invention, the transmission ratio changes in accordance with the change of the transmission torque in a state of slightly deviating from the chain line α as shown by a solid line γ in FIG. 2 (that is, a slightly non-linear state). Thus, the variation of the transmission ratio can be eliminated in a relatively easy manner based on the signal from the torque sensor, as compared with the case of the conventional construction.

The reasons why the variation of the transmission ratio based on the torque change can be suppressed to a small degree by remaining the pressing force of the pressing device 60 to a large value during the torque variation in the aforesaid manner are considered to be the following ① and ②.

① When the constant (large) pressing forces is continuously applied, amounts of the elastic deformation of the respective portions of the toroidal type continuously variable transmission 32a are maintained constant, whereby the variation of the transmission ratio based on the change of the amounts of the elastic deformation can be prevented.

② Since thrust loads applied to thrust ball bearings 14, 14 (see FIGS. 17 to 18, for example) supporting power rollers 9, 9 on the inner side surfaces of trunnions 7, 7 are remained constant, the displacement amounts of the power rollers 9, 9 in the rotational direction of the input side disks 2A, 2B and the output side disks 4, 4 are proportional to the transmission torque.

Figure 3:
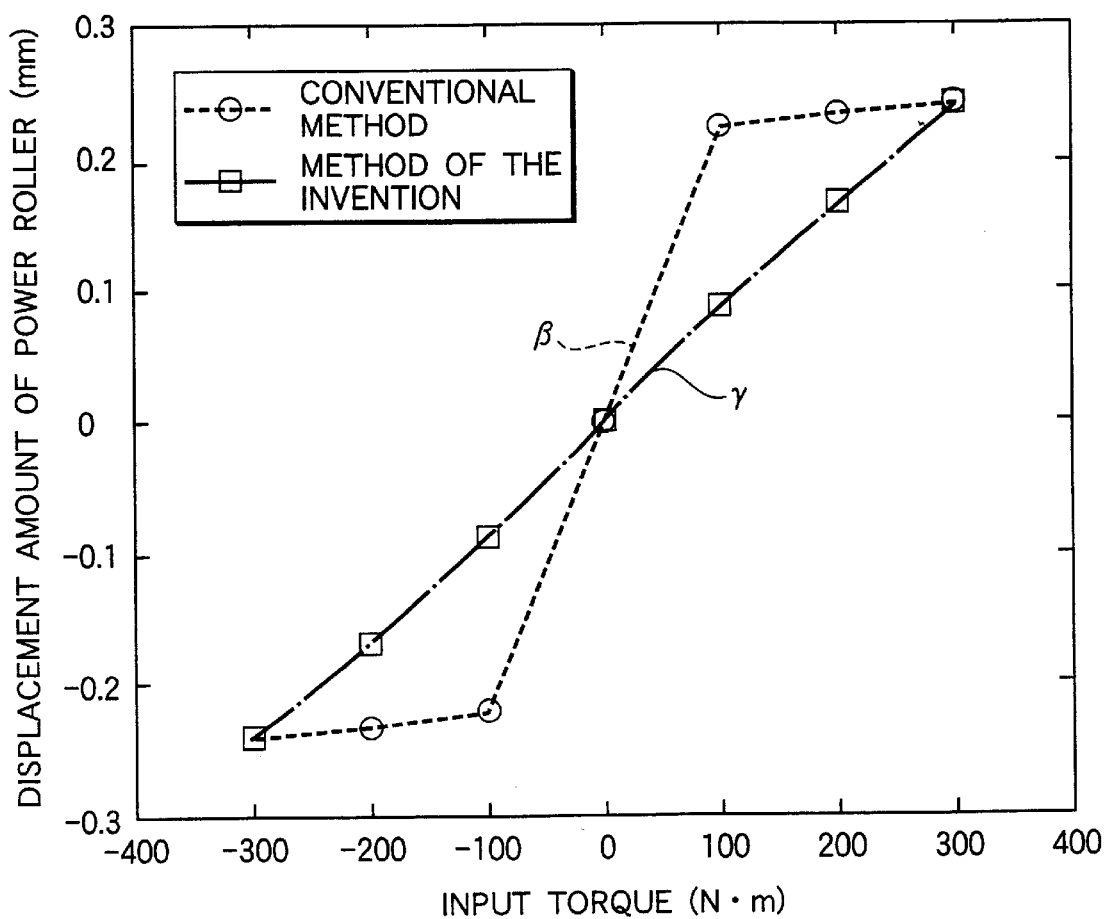
FIG. 3 is a diagram showing the influence of the variation of an input torque on the displacement of a power roller.

Since the detailed explanation of the reason ① is considered to be unnecessary, a description will be given in detail of the reason ② with reference to FIG. 3.

Figure 15:
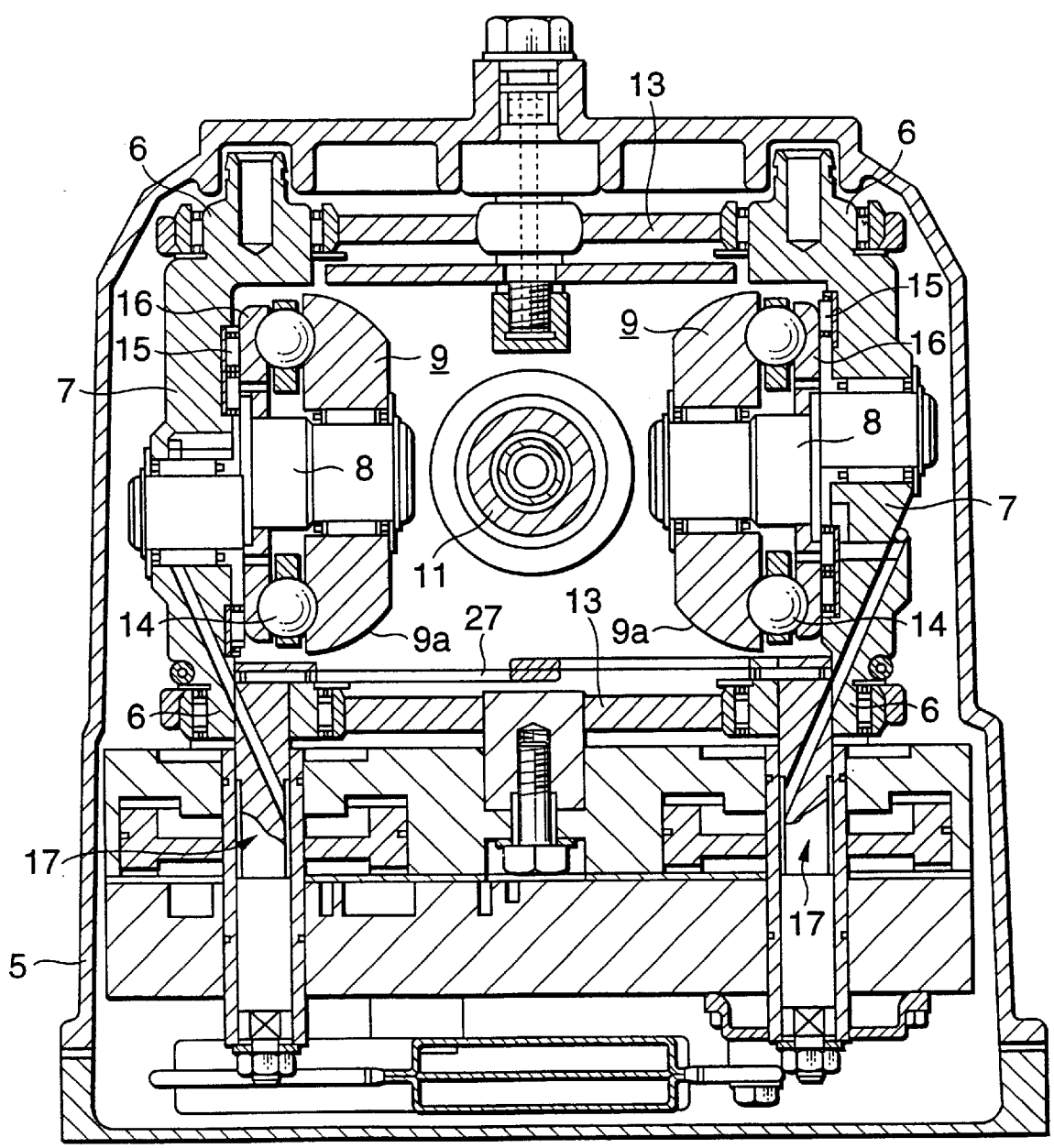
FIG. 15 is a sectional view along a line X—X in FIG. 14.

As described above, at the time of operating the toroidal type continuously variable transmission, the power rollers 9, 9 (see FIG. 15, for example) are applied with large forces (traction forces generally represented by "2Ft") directed to the forward direction along the rotational direction of the input side disks 2A, 2B shown in FIG. 1 (backward direction with respect to the rotational direction of the output side disks 4, 4 shown in FIG. 1), respectively. The traction force "2Ft" is proportional to the transmission torque and causes to displace each of the power rollers 9 in the axial direction of pivot shafts 6, 6 (see FIG. 15, for example) provided at the both end portions of the trunnion 7 supporting the power roller 9, which is a cause changing the transmission ratio. FIG. 3 represents the displacement amount of the power roller based on such a traction force 2Ft. That is, FIG. 3 shows a result where the displacement amount of the power roller was obtained through computer analysis in the case of changing a torque (input torque) transmitted by the double cavity type continuously variable transmission from −300 N·m to +300 N·m. Further, in this figure, a broken line β represents the case of the conventional structure and a solid line γ represents the case of the structure according to the invention.

In the case of the conventional structure where the pressing force is changed in accordance with the input torque, when the input torque is small, the rigidity of the thrust ball bearing 14 (and a thrust needle roller bearing 15 shown in FIGS. 17 and 18) supporting each of the power rollers 9 on the trunnion 7 is low, and so each of the power rollers 9 easily deforms by the traction force 2Ft proportional to the input torque when the changing ratio is constant. Due to such a fact, the inclined angle of the center portion of the broken line β is large and the displacement amount of the power roller 9 due to the torque change is large. In contrast, in the case of the structure of the invention where the pressing force is kept to be large, the displacement amount of each of the power rollers 9 is almost proportional to the input torque and the traction force 2Ft as shown by the solid line γ of FIG. 3. In this manner, since the displacement amount of each of the power rollers 9 is proportional to the traction force 2Ft which is proportional to the input torque of the toroidal type continuously variable transmission 32a, the variation of the transmission ratio based on the torque variation can be suppressed to a small degree as shown by the solid line γ of FIG. 2.

Figure 4:
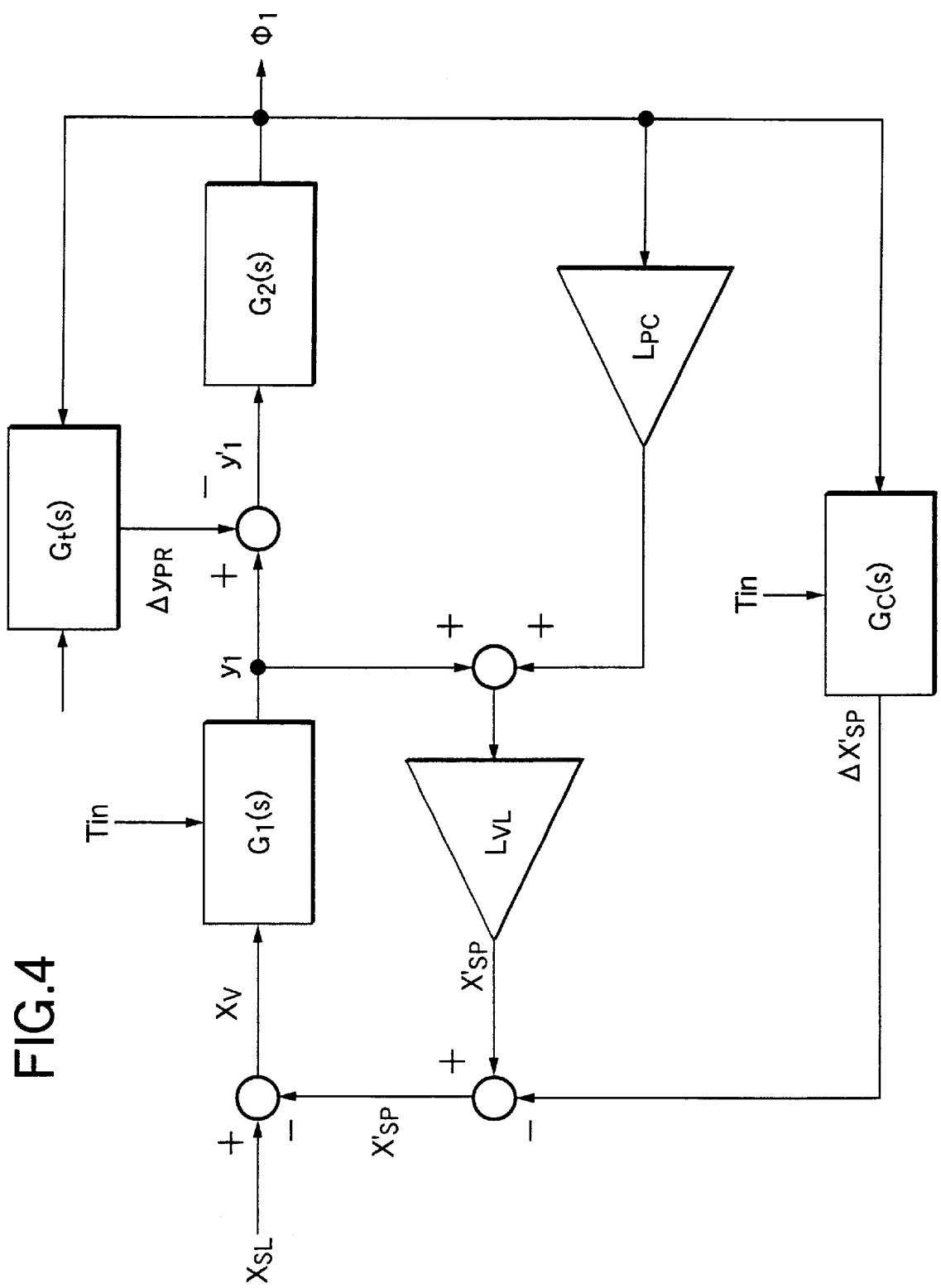
FIG. 4 is a block diagram of a feedback mechanism relating to the adjustment of the transmission ratio, for explaining the action of the invention.

FIG. 4 is a block diagram for explaining the reason why the variation of the transmission ratio based on the torque variation can be suppressed to a small degree by the aforesaid mechanism of the invention. As clear from the aforesaid explanation, the transmission control of the toroidal type continuously variable transmission is obtained by performing the relative displacement in the axial direction between the sleeve 20 and the spool 21 (see FIG. 18) constituting the control valve 18. Thus, when the influence on the torque variation in relation to the relative displacement between the sleeve 20 and the spool 21 is suppressed, the variation of the transmission ratio based on the torque variation can also be suppressed. In the various kinds of symbols shown in FIG. 4, $x_{SL}$ represents a moving amount of the sleeve 20 and $x'_{SP}$ represents an actual moving amount of the spool 21. The actual moving amount $x'_{SP}$ of the spool 21 is the sum ($x'_{SP}=x_{SP}+\Delta x_{SP}$) of a (theoretical) moving amount $x_{SP}$ of the spool 21 in a no-load state and a moving amount $\Delta x_{SP}$ of the spool based on a load. Thus, it will be understood that the variation of the transmission ratio according to the torque variation can be suppressed by suppressing the variation of the actual moving amount $x'_{SP}$ of the spool 21 with respect to the moving amount $x_{SL}$ of the sleeve 20. Then, the explanation will be made with reference to FIG. 4 as to the reason why the invention can suppress the variation.

Figure 18:
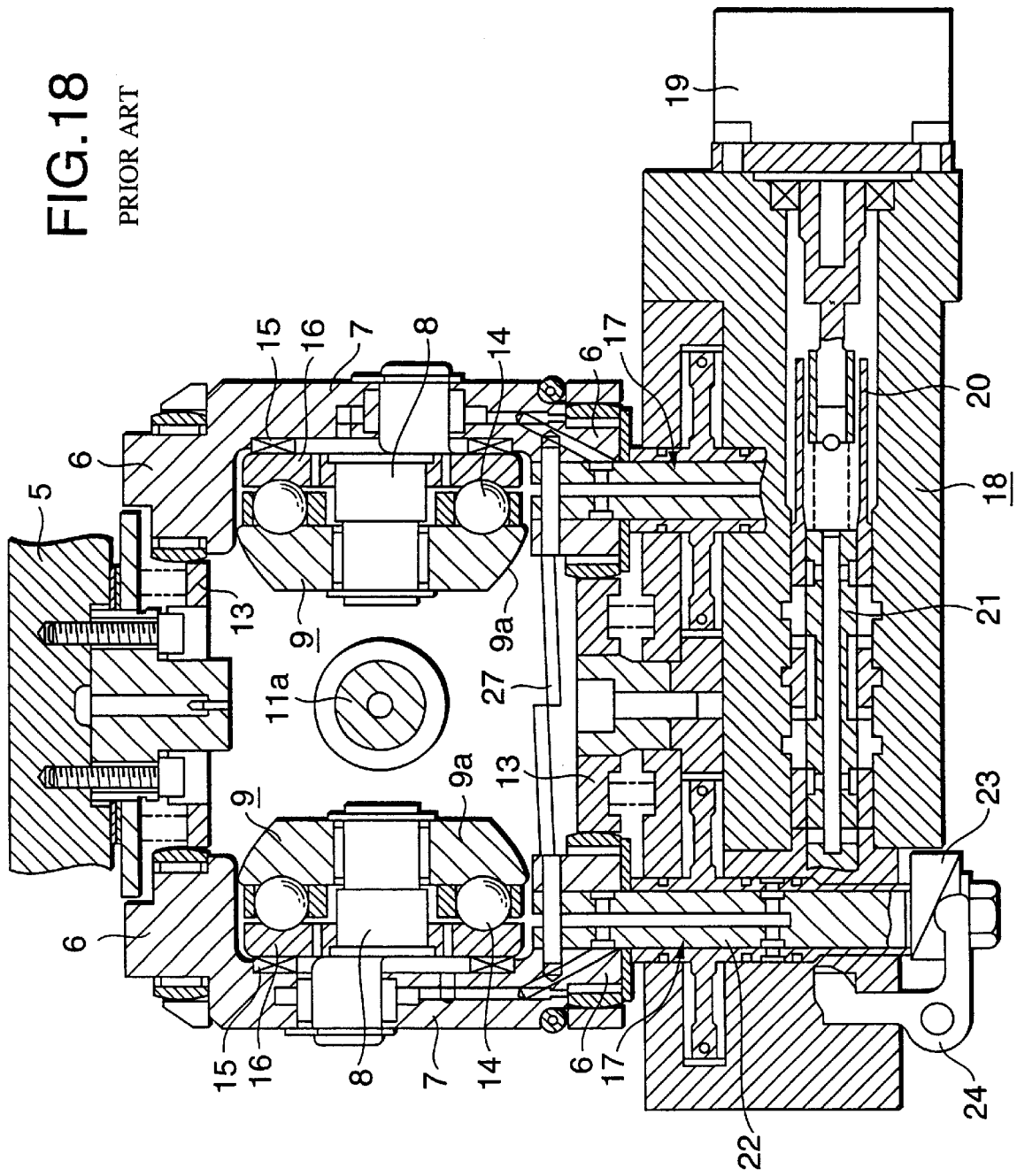
FIG. 18 is a sectional view along a line Z—Z in FIG. 16.

Of the remaining symbols described in FIG. 4, xv represents an opening degree of the control valve 18, Tin represents an input torque, $y_1$ represents a displacement amount of a piston constituting an actuator 17 in the axial direction of the pivot shafts 6, 6 (see FIG. 15), $\Delta y_{PR}$ represents a displacement amount of the power roller 9 in the axial direction of the pivot shafts 6, 6 at the time of torque loading based on play etc. around a radial needle roller bearing, $y'_1$ is a sum ($y'_1=y_1+\Delta y_{PR}$) of the both displacement amounts $y_1$ and $\Delta y_{PR}$ which represents a displacement amount of the power roller 9 in the axial direction of the pivot shafts 6, 6 at the time of torque loading, $\phi_1$ represents an inclined rotation angle of the power roller 9, $G_1(s)$ represents a transfer function showing the relation that the power roller 9 moves in the axial direction of the pivot shafts 6, 6 according to the opening degree of the control valve 18, $G_2(s)$ represents a transfer function showing the relation that the power roller 9 rotationally inclines as the power roller 9 moves in the axial direction of the pivot shafts 6, 6, Gt(s) represents a transfer function which is influenced by the inclined angle $\phi_1$ and also shows the relation that the power roller 9 displaces according to the input torque Tin, Gc(s) represents a transfer function showing the relation that the spool 21 moves according to the input torque Tin, $L_{PC}$ represents a lead of a precess cam 23 (see FIG. 18), and $L_{VL}$ represents a rink ratio of a link arm 24 (see FIG. 18).

As described above, the variation of the transmission ratio according to the torque variation can be suppressed by suppressing the variation of the actual moving amount $x'_{SP}$ of the spool 21 with respect to the moving amount $x_{SL}$ of the sleeve 20. Of the moving amount $x'_{SP}$, the moving amount $\Delta x_{SP}$ of the spool 21 based on a load changes in accordance with the input torque Tin. The reason why the moving amount $\Delta x_{SP}$ changes in accordance with the input torque Tin is that amounts of elastic deformation of the respective constituent portions of the toroidal type continuously variable transmission change in accordance with the variation of the pressing force of the pressing device which changes according to the change of the input torque Tin. Thus, like the aforesaid conventional structure, when the pressing force of the pressing device is changed according to the change of the input torque Tin, the variation of the transmission ratio becomes large as described above. In contrast, in the case of the invention, also as described above, when the magnitude of a torque changes, during the aforesaid variation of the torque, the pressing device continuously generates a pressing force equal to or more than the pressing force corresponding to the larger torque before and after the torque variation. Thus, the moving amount $\Delta x_{SP}$ is kept constant even at the time of torque change. Thus, the variation of the transmission ratio according to the torque change can be suppressed by suppressing the variation of the actual moving amount $x'_{SP}$ of the spool 21.

As described above, the invention can attain excellent action and effects as to the suppression of the variation of the transmission ratio when the torque changes abruptly. FIGS. 2 and 3 show the results of the computer analysis in the case of changing a torque transmitted by the double cavity type toroidal type continuously variable transmission 32a during one second. In this respect, the inventors of the invention etc. found through the investigation that further effective action and effects can be obtained when the torque change is performed in a shorter time. Each of FIGS. 5A to 5C and 5D to 5F shows a result where the operation states of the respective portions were obtained through computer analysis in the case of changing an input torque with respect to the toroidal type continuously variable transmission in a state of transmission ratio of 0.5 (twice of the speed). More particularly, FIG. 5A represents a case where the input torque is made constant during 0.5 second after the input torque is abruptly changed from +350 N·m to −280 N·m during 0.1 second, and thereafter the input torque is abruptly changed from −280 N·m to +350 N·m during 0.1 second. FIG. 5D represents a case where the input torque is made constant during 0.5 second after the input torque is abruptly changed from +350 N·m to −280 N·m during 0.1 second, and thereafter the input torque is abruptly changed from −280 N·m to +350 N·m during 0.1 second.

FIGS. 5A to 5C show a case where the pressing force equal to or more than the pressing force corresponding to 350 N·m was continuously generated during the torque variation by using the hydraulic type pressing device like the invention. In contrast, FIGS. 5D to 5F show a case where the pressing force was changed in accordance with the varying torque by using the mechanical type pressing device (loading cam device) like the conventional structure. FIGS. 5A and 5D show the input torque (solid line) and the output torque (broken line), FIGS. 5B and 5E show an inclined rotation angle of the power roller, and FIGS. 5C and 5F show the transmission ratio.

As clear from such FIGS. 5A to 5F, in the case of the conventional structure using the mechanical type pressing device, the inclined rotation angle of the power roller varies largely at the end of the torque variation (see $\alpha_1$, $\alpha_2$ portions in FIG. 5E), and so the transmission ratio varies largely in accordance therewith to cause a so-called overshoot (see $\beta_1$, $\beta_2$ portions in FIG. 5F). In contrast, like the invention, in the case of continuously applying the large pressing force during the torque variation by using the hydraulic type pressing device, each of the variation of the inclined rotation angle and the variation of the transmission ratio can be suppressed to a small degree as clear from FIGS. 5B and 5C.

The explanation will be made with reference to FIGS. 6 to 8 as to the result of measurement performed by using a CVT box test machine having the structure conforming to the actual toroidal type continuously variable transmission in order to confirm such effects of the invention. First, FIG. 6 shows the change of the inclined rotation angle of the power roller in the case of changing the driving torque of the input shaft of the CVT box test machine incorporating the mechanical type pressing device from −280 N·m to +350 N·m during 0.1 second while rotating the input shaft at 2000 min$^{-1}$. As clear from FIG. 6, in the case of the conventional structure, a large overshoot is generated at the time of changing the driving torque abruptly from a negative (−) value to a positive (+) value. From this fact, the aforesaid result of the computer analysis was proved that the change such as the $\alpha_2$ portion in FIG. 5E occurs.

Figure 7:
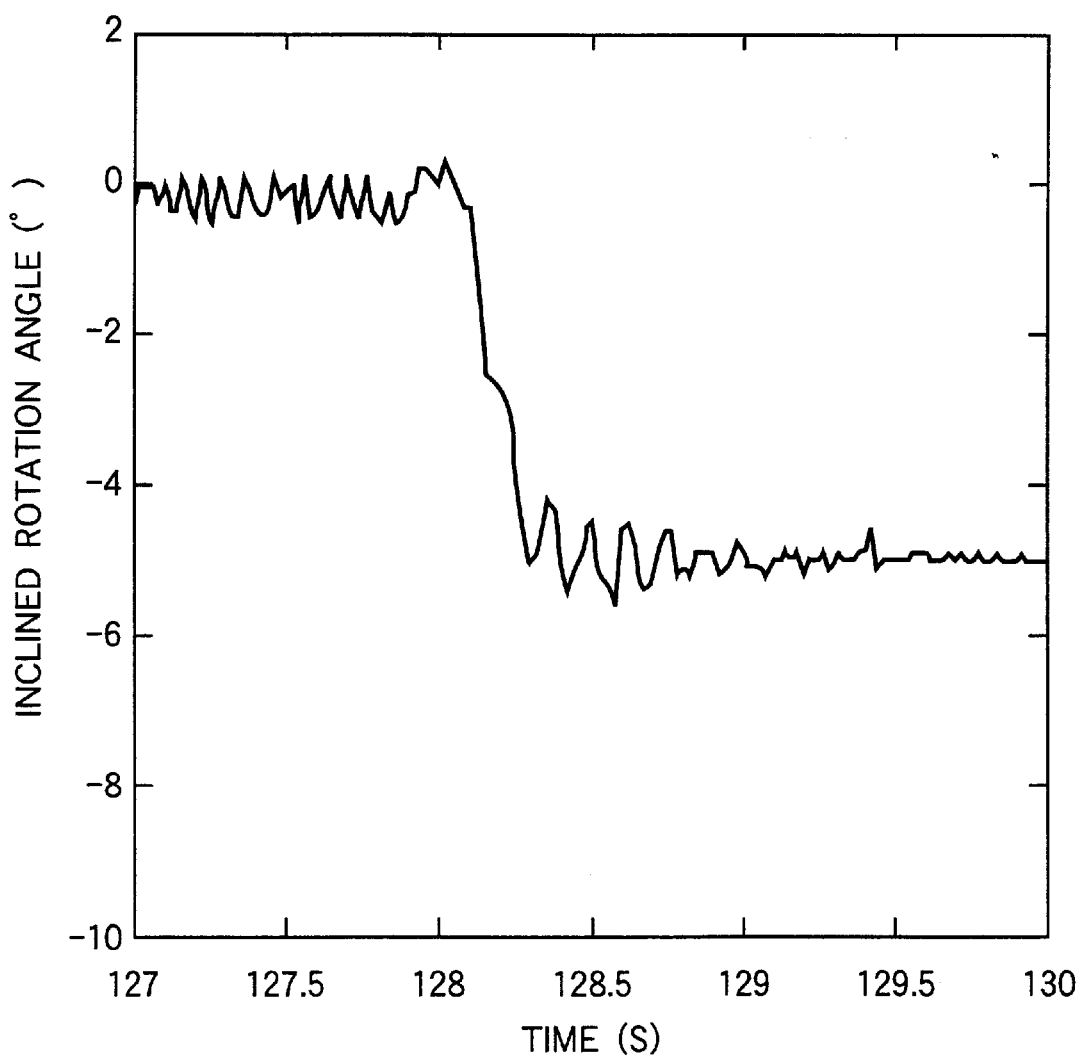
FIG. 7 is a diagram showing the result of the second experimentation performed for confirming the effects of the invention.

Next, FIG. 7 shows the change of the inclined rotation angle of the power roller in the case of changing the driving torque of the input shaft of the same CVT box test machine from +350 N·m to −280 N·m during 0.5 second while rotating the input shaft at 2000 min$^{-1}$. As clear from FIG. 7, in the case of the conventional structure, the variation of the inclined rotation angle including a relatively small but not-preferable overshoot is generated at the time of changing the driving torque abruptly from a positive (+) value to a negative (−) value. From this fact, the aforesaid result of the computer analysis was proved that the change such as the $\alpha_1$ portion in FIG. 5E occurs.

Figure 8:
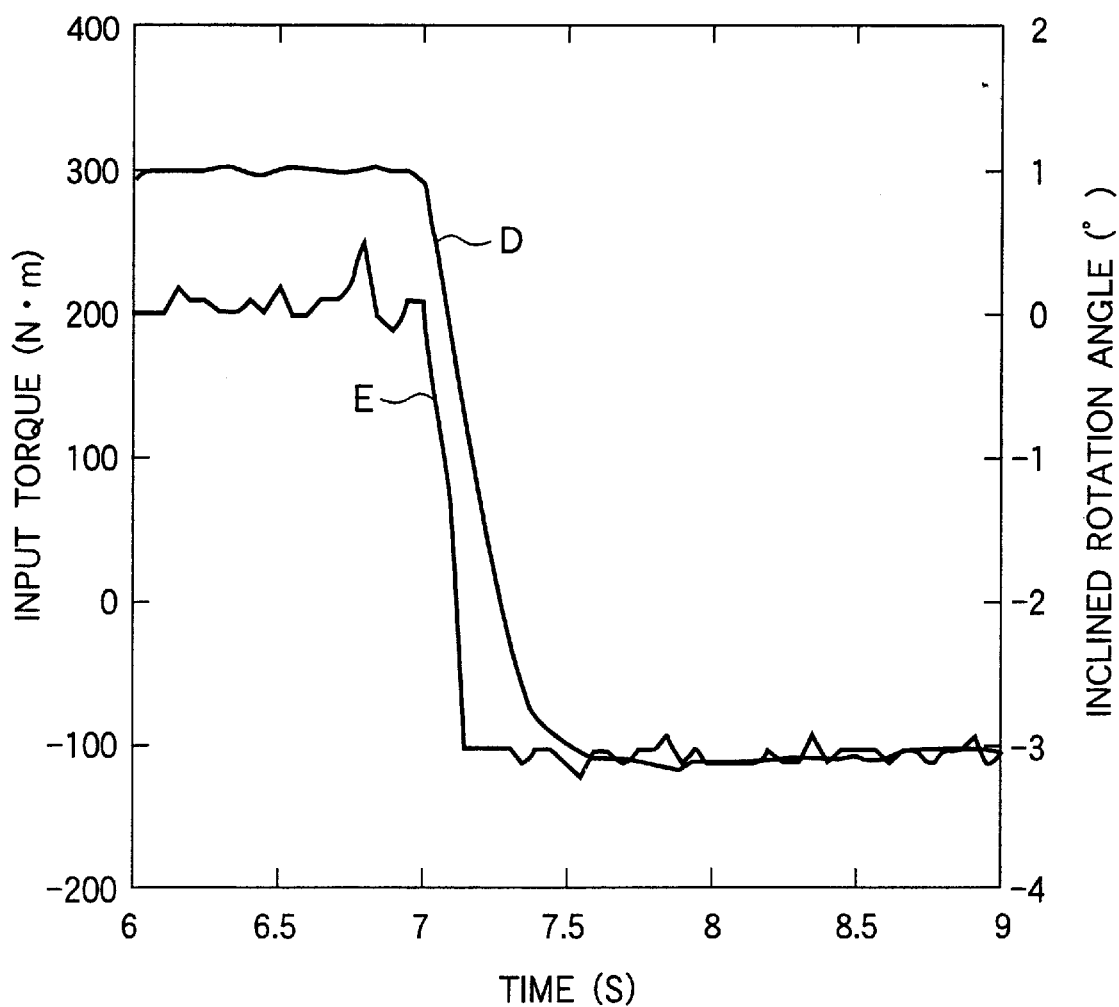
FIG. 8 is a diagram showing the result of the third experimentation performed for confirming the effects of the invention.

Next, FIG. 8 shows the result of an experimentation performed in order to know the influence of the variation of the input torque on the inclined rotation angle by using a CVT box test machine which is different from that used in the experimentation which results is shown in FIGS. 6 and 7. In the case of this experimentation, a hydraulic type pressing device was employed, and the pressing device continuously generated the pressing force equal to or more than the pressing force corresponding to the largest torque (300 N·m) before and after the variation during the torque variation. The inclined rotation angle of the power roller was set to the deceleration side, and the input torque was abruptly changed from +300 N·m to −100 N·m during 0.3 second as shown by a curve D in FIG. 8. As a result, the inclined rotation angle of the power roller is changed as shown by a curve E in FIG. 8. Since the specification differs between the CVT box test machine used in the experimentation which results are shown in FIGS. 6 and 7 and the CVT box test machine used in the experimentation which results are shown in FIG. 8, these experimentation results can not be compared directly therebetween. However, the tendency relating to the variation of the inclined rotation angle according to the torque variation can be understood sufficiently. When seeing FIG. 8 based on this premise, it will be understood that the toroidal type continuously variable transmission according to the invention can suppress the variation of the inclined rotation angle to a small degree and also suppress the variation of the transmission ratio despite of the torque variation.

Figure 9:
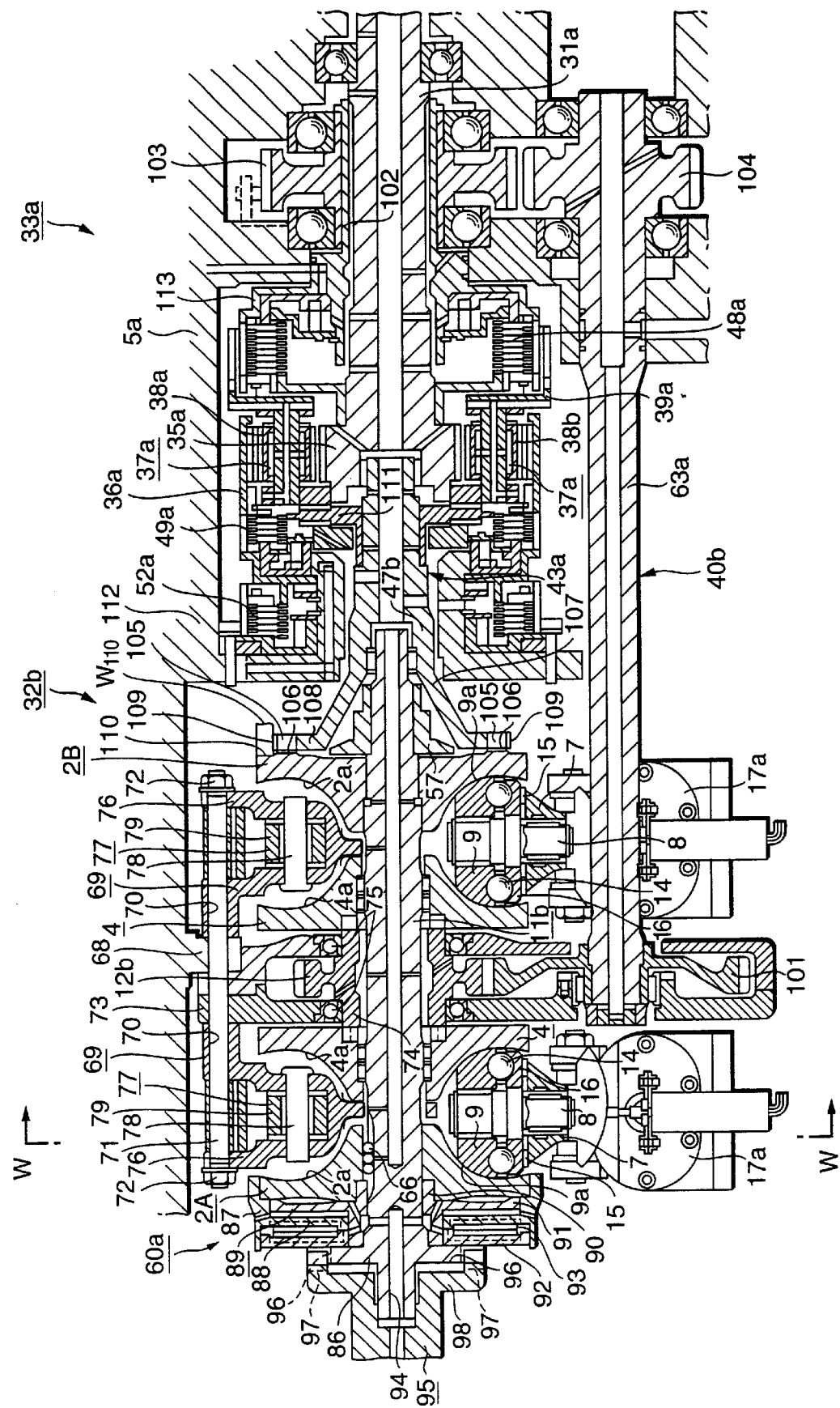
FIG. 9 is a sectional view showing a second example of the structure in which the present invention is implemented.
Figure 10:
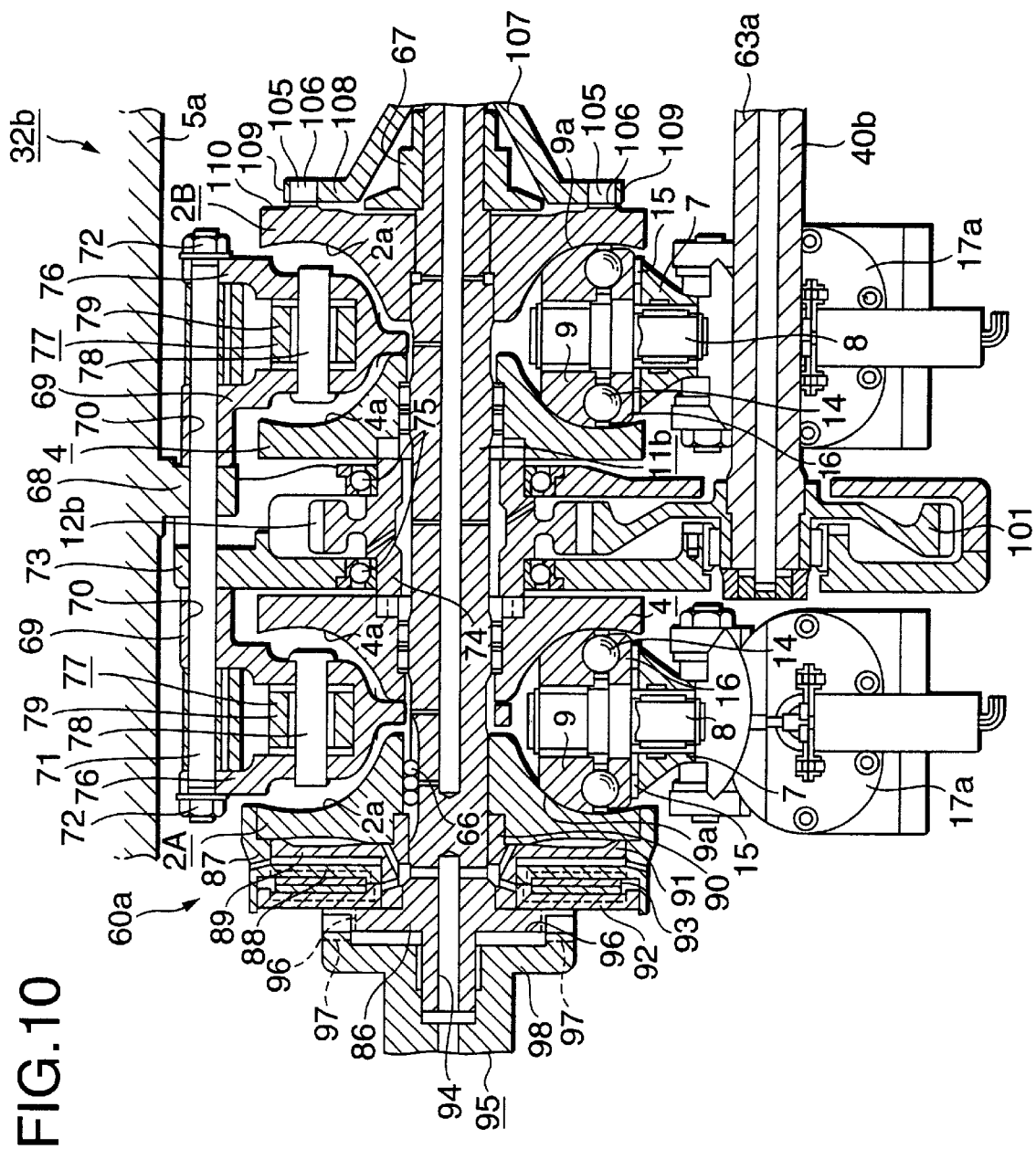
FIG. 10 is an enlarged diagram showing the left portion in FIG. 9.

Next, an example of the structure of the continuously variable transmission apparatus suitable as the embodiment of the invention will be explained with reference to FIGS. 9 to 11. The continuously variable transmission apparatus includes an input shaft 11a, an output shaft 31a, a toroidal type continuously variable transmission 32b, a planetary gear mechanism 33a, a first power transmission mechanism 40b and a second power transmission mechanism 43a. The input shaft 11b is coupled to a driving source such as an engine 26 (see FIG. 1) etc. and driven and rotated by the driving source. The output shaft 31a serves to take out a power based on the rotation of the input shaft 11b, and is coupled to a wheel driving shaft (not shown) through a differential gear etc. (not shown).

Figure 16:
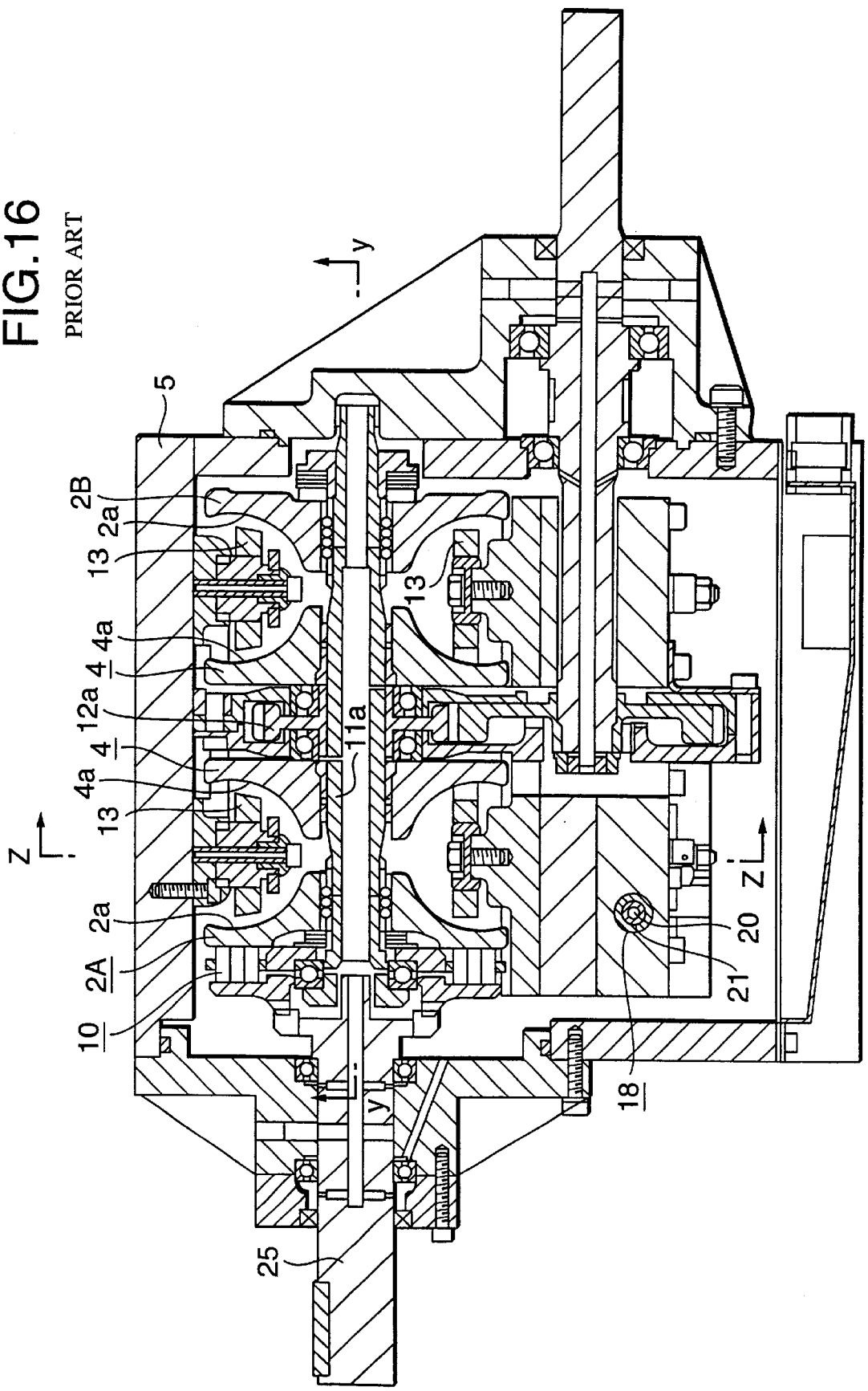
FIG. 16 is a sectional view showing the main portion of a second example of the specific structure of the toroidal type continuously variable transmission.
Figure 17:
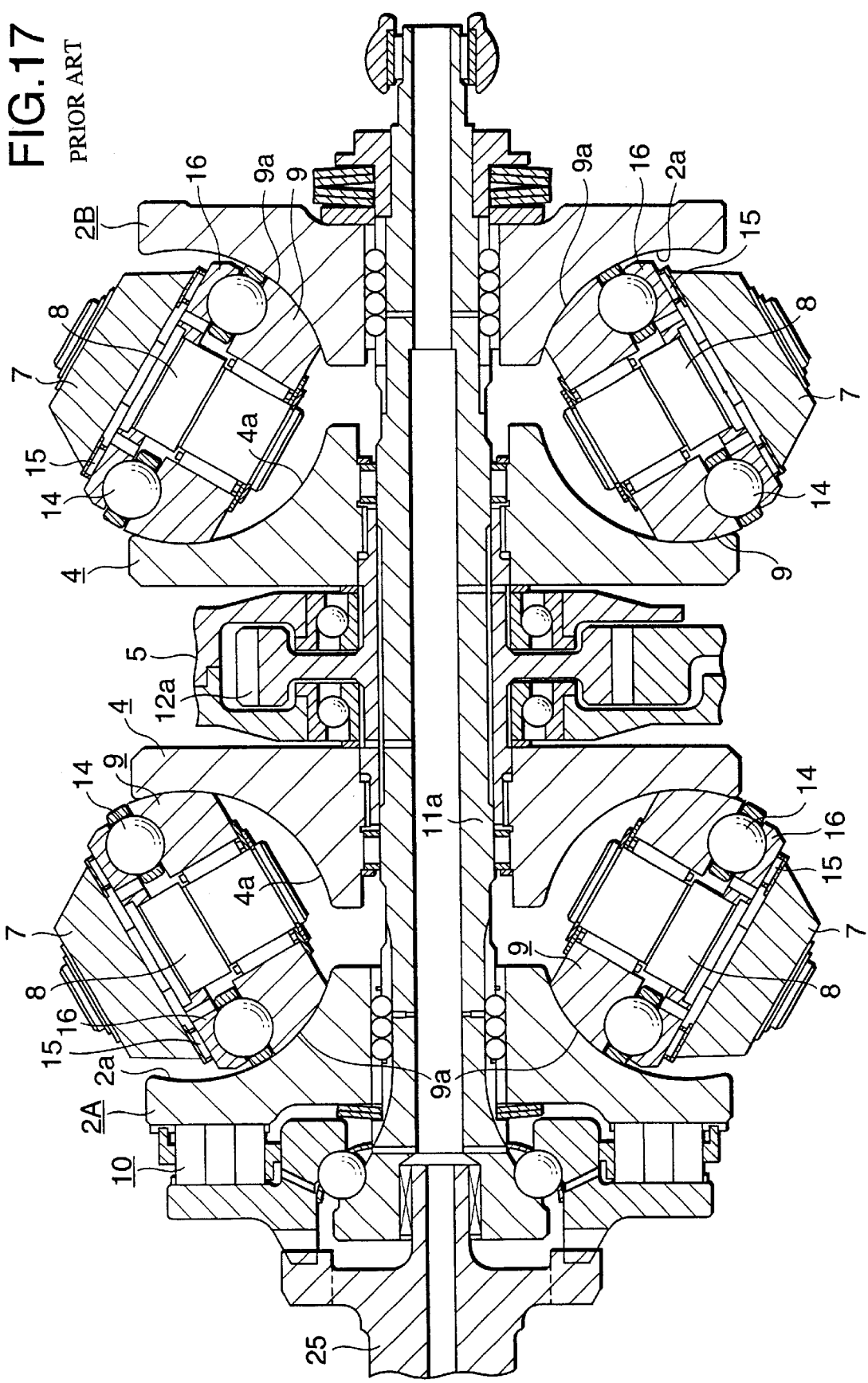
FIG. 17 is a sectional view along a line Y—Y in FIG. 16.

The transmission 32b is a double cavity type as shown in FIGS. 16 to 17 and provided with three trunnions 7, 7 and three power rollers 9, 9 within each cavity, that is, six trunnions and six power rollers in total. In order to constitute such a toroidal type continuously variable transmission 32b, a pair of input side disks 2A, 2B are supported at the both end portions of the input shaft 11b so as to rotate freely in synchronism with the input shaft 11b in a state that the inner surfaces 2a, 2a of the input side disks are opposed to each other. The input side disk 2A on the base end side (the driving source side and the left side in FIGS. 9 and 10) is supported at the input shaft 11b so as to displace freely in the axial direction through a ball spline 66. In contrast, the input side disk 2B on the tip end side (the side away from the driving source and the right side in FIGS. 9 and 10) is fixed at the input shaft 11b by suppressing the back side thereof by a loading nut 67 in a state of being spline-engaged at the tip end portion of the input shaft 11b.

A pair of output side disks 4, 4 are supported at the periphery of the center portion of the input shaft 11b and at the portion between the pair of the input side disks 2A, 2B so as to rotate freely and in synchronism to each other in a state that the inner surfaces 4a, 4a of the output side disks 4, 4 are opposed to the inner surfaces 2a, 2a of the input side disks 2A, 2B, respectively. The power rollers 9, 9 supported on the inner side surfaces of the trunnions 7, 7 so as to rotate freely are sandwiched between the inner surfaces 2a, 4a of the input side disks 2A, 2B and the output side disks 4, 4, respectively.

In order to support the trunnions 7, 7, a frame 69 is coupled and fixed to an attachment portion 68 provided at the inner surface of a casing 5a by means of studs 71, 71 inserted within attachment holes 70, 70 provided at three portions of the outer diameter side end portion of the frame 69 and nuts 72, 72 screwed with the studs 71, 71, respectively. In the example shown in the figure, a gear housing 73 is fixed between the attachment portion 68 and the frame 69 by the studs 71, 71 and the nuts 72, 72. An output sleeve 74 is supported by a pair of rolling bearings 75, 75 so as to rotate freely on the inner diameter 5 side of the gear housing 73. The pair of the output side disks 4, 4 are concave-convex engaged with the both end portions of the output sleeve 74. An output gear 12b provided at the outer peripheral surface of the intermediate portion of the output sleeve 74 is housed within the gear housing 73.

The frame 69 is configured in a star shape entirely. The frame 69 is split in two pieces at an area from the intermediate portion along the radial direction thereof to the outer diameter portion, and three holding portions 76, 76 are formed with a constant interval along the circumferential direction thereof. At the intermediate portions along the radial direction of the holding portions 76, 76, the intermediate portions of supporting pieces 77, 77 are pivotally supported by second pivot shafts 78, 78, respectively. Each of the supporting pieces 77, 77 is configured by a cylindrical attachment portion 79 disposed at the periphery of the second pivot shaft 78 and a pair of supporting plate portions 80, 80 protruding outward in the radial direction form the outer peripheral surface of the attachment portion 79. A crossing angle between the pair of the supporting plate portions 80, 80 is 120 degrees. Thus, the supporting plate portions 80, 80 of the supporting pieces 77, 77 disposed in adjacent in the circumferential direction are in parallel to each other.

Each of such supporting plate portions 80, 80 is provided with a circular hole 81. When each of the supporting pieces 77, 77 is in a neutral state, the circular holes 81, 81 formed at the supporting plate portions 80, 80 of the supporting pieces 77, 77 disposed in adjacent in the circumferential direction are concentric to each other. Pivot shafts 6, 6 provided at the both end portions of each of the trunnions 7, 7 are supported by radial needle roller bearings 82, 82 within the circular holes 81, 81, respectively. The outer peripheral surfaces of outer rings 83, 83 constituting the radial needle roller bearings 82, 82 are each formed in a spherical convex shape. Such outer rings 83, 83 are fit within the circular holes 81, 81 so as to swingably displace freely without being rattling, respectively. Arc-shaped long holes 84, 84 are formed at the portions of the supporting plate portions 80, 80 so as to be concentric with the circular holes 81, 81, respectively. Studs 85, 85 protrusively provided at the end surfaces (shoulder portions) of the trunnions 7, 7 are loosely engaged with the long holes 84, 84 thereby to constitute a stopper mechanism for limiting the inclined angles of the trunnions 7, 7 around the pivot shafts 6, 6, respectively.

In this manner, like the aforesaid conventional structure, the power rollers 9, 9 are supported through displacement shafts 8 at the inner side surfaces of the trunnions 7, 7 which are supported within the casing 5a, respectively. The peripheral surfaces 9a, 9a of the power rollers 9, 9 are made contact against the inner surfaces 2a, 4a of the respective disks 2A, 2B, 4, respectively. A hydraulic type pressing device 60a is assembled between the input side disk 2A on the base end side and the input shaft 11b so that the surface pressures of the contact portions (traction portions) between the respective peripheral surfaces 9a and the inner surfaces 2a, 4a are secured thereby to efficiently transmit the power by the toroidal type continuously variable transmission 32b. Further, when a torque transmitted by the toroidal type continuously variable transmission 32b changes abruptly, the pressing device 60a is arranged to push the input side disk 2A with a pressing force equal to or more than the pressing force corresponding to the larger torque before and after the torque variation.

In order to constitute the pressing device 60a, an outwardly flange-shaped brim portion 86 is fixedly provided at a portion closer to the base end of the outer periphery of the input shaft 11b, and a cylinder tube 87 is fit in and supported by the input side disk 2A on the base end side in an oil-tight manner and in a state where the cylinder tube protrudes in the axial direction from the outer surface (the left surface in FIGS. 9 and 10) of the input side disk 2A. The inner diameter of the cylinder tube 87 is made small at the axially intermediate portion thereof and made large at the both end portions thereof. The input side disk 2A is fit into the large diameter portion of the cylinder tube 87 on the tip end side thereof so as to displace freely in the axial direction in an oil-tight manner. An inwardly flange-shaped partition plate portion 88 is provided at the inner peripheral surface of the intermediate portion of the cylinder tube 87. Further, a first piston member 89 is provided between the inner peripheral surface of the cylinder tube 87 and the outer peripheral surface of the input shaft 11b.

The first piston member 89 is arranged in a manner that an outwardly flange-shaped partition wall plate 91 is formed on the outer peripheral surface of the intermediate portion of a supporting tube portion 90 which is freely fit on the outer surface of the input shaft 11b. The outer peripheral edge of the partition wall plate 91 is made in contact with the small diameter portion of the intermediate portion of the inner peripheral surface of the cylinder tube 87 so as to slide and displace freely in the axial direction and in an oil-tight manner. In this state, the inner peripheral edge of the partition plate portion 88 is made in contact with the outer peripheral surface of the supporting tube portion 90 so as to slide and displace freely in the axial direction and in an oil-tight manner. Further, an annular second piston member 92 is provided between the outer peripheral surface of the base end portion of the supporting tube portion 90 and the inner peripheral surface of the base end portion of the cylinder tube 87. The second piston member 92 is arranged in a manner that the side surface of the base end side thereof is made contact against the brim portion 86 to prevent the axial displacement thereof, and an oil-tight state is held among the inner and outer peripheral edges thereof, the outer peripheral surface of the base end portion of the supporting tube portion 90 and the inner peripheral surface of the base end portion of the cylinder tube 87.

The cylinder tube 87 provided with the partition plate portion 88 pushes toward the input side disk 2A by means of a preload spring such a corned disk spring 93 provided between the partition plate portion 88 and the second piston member 92. Thus, the input side disk 2A is pressed by a pressing force corresponding to an elastic force of the corned disk spring 93 at least even in a state where the pressure oil is not introduced within the pressing device 60*a* thereby to apply a surface pressure corresponding to the elastic force to the contact portions between the peripheral surfaces 9*a* and the inner surfaces 2*a*, 4*a*. Thus, the elastic force is restricted to such a degree that a slipping phenomenon (except for a inevitable spin) does not occur at the contact portions between the peripheral surfaces 9*a* and the inner surfaces 2*a*, 4*a* at the time of transmitting a quite small power by the toroidal type continuously variable transmission 32*b*.

The pressure oil is freely introduced through the center hole 94 of the input shaft 11*b* within hydraulic chambers existing between the second piston member 92 and the partition plate portion 88 and between the partition wall plate 91 and the input side disk 2A, respectively. The center hole 94 is communicated with a hydraulic source (not shown) such as a pressure pump through a hydraulic control valve (not shown). At the time of operating the continuously variable transmission apparatus including the toroidal type continuously variable transmission 32*b*, the oil pressure adjusted by the hydraulic control valve in accordance with the magnitude of a power to be transmitted is introduced within the respective hydraulic chambers to press the input side disk 2A thereby to apply a surface pressure corresponding to the magnitude of the power to the contact portions between the peripheral surfaces 9*a* and the inner surfaces 2*a*, 4*a*. When a torque transmitted by the toroidal type continuously variable transmission 32*b* changes abruptly, a sufficiently high oil pressure is introduced within the hydraulic chambers, whereby the pressing device 60*a* presses the input side disk 2A with a pressing force equal to or more than the pressing force corresponding to the larger torque before and after the torque variation.

In any case, the surface pressure applied to the contact portions is the sum of the surface pressure based on the oil pressure and the surface pressure based on the corned disk spring 93. Thus, the oil pressure required for preventing the slip at the contact portions upon power transmission can be made smaller by a value corresponding to the elastic force of the corned disk spring 93, and so the loss (pump loss) based on the driving of the hydraulic source can be reduced by a degree corresponding to the provision of the corned disk spring 93. Such an effect can also be attained in the case of generating a large pressing force at the time of torque variation. In the example shown in the drawings, the pressing device 60*a* is configured as a double piston type thereby to secure a pressure receiving area without enlarging the diameter and suppress the oil pressure for securing a required pressing force to a low value, whereby the pump loss can also be suppressed to a small degree. As factors for taking into consideration at the time of adjusting the oil pressure, various kinds of factors influencing on the operation of the toroidal type continuously variable transmission 32*b* may be incorporated such as the transmission ratio, the temperature of traction oil etc. as well as a signal linked with the magnitude of a power to be transmitted and the abrupt change of the torque.

The rotation force is transmitted from the driving shaft 95 to the input shaft 11*b* through the brim portion 86. To this end, notches 96, 96 are formed at plural portions of the peripheral edge portion of the brim portion 86, and these notches 96, 96 are engaged with driving convex portions 97, 97 formed at the end portion of the driving shaft 95, respectively. Further, to this end, in this example, an outwardly flange-shaped coupling portion 98 is provided at the end portion of the driving shaft 95, and the driving convex portions 97, 97 are protrusively provided at the outer diameter side end portion of the one side surface of the coupling portion 98.

Each of the trunnions 7, 7 is provided with hydraulic actuators 17*a*, 17*b* so that each of the trunnions 7, 7 is driven and displaced freely in the axial direction of the pivot shafts 6, 6 provided at the both end portions thereof. Of the trunnions, the trunnion 7 at the center portion on the lower side in FIG. 11 is freely driven and displaced in the axial direction of the pivot shafts 6, 6 provided at the both end portions thereof through lever arms 99, 99 by means of the pair of the actuators 17*a*, 17*a* each of which is a single-action type (capable of obtaining only force in the pushing direction) and the pressing directions of which are set to be in opposite to each other. In the case of displacing this trunnion 7, the pressure oil is supplied only to the hydraulic chamber of one of the actuators 17*a* and the hydraulic chamber of the other actuator 17*a* is set in a released state. In contrast, each of the trunnions 7, 7 at the both sides of the upper portion in FIG. 11 is freely driven and displaced in the axial direction of the pivot shafts 6, 6 provided at the both end portions thereof by means of the double-action type actuators 17*b*, 17*b* (capable of obtaining force in the pushing direction or drawing direction based on the switching between the supplying and discharging directions of the pressure oil).

The six trunnions 7, 7 in total provided at the toroidal type continuously variable transmission 32*b* are displaced by the same length in synchronism from one another by supplying and discharging the same amount of the pressure oil to the actuators 17*a*, 17*b* through a control valve 18 (see FIG. 18). To this end, a precess cam 23 is fixed to the end portion of a rod 100 which displaces together with one of the trunnions 7 (the left side trunnion at the upper portion of FIG. 11 in the example shown in the drawings) so that the posture of this trunnion 7 can be transmitted freely to the spool 21 of the control valve 18 through a link arm 24*a*.

The action of the toroidal type continuously variable transmission 32*b* itself configured in the aforesaid manner is as follows. At the time of operation, the input shaft 11*b* is rotated while pressing the input side disk 2A on the base end side by the pressing device 60*a*. As a result, the pair of the input side disks 2A, 2B provided at the both end portions of the input shaft 11*b* rotate while being pressed toward the output side disks 4, 4, respectively. This rotation is transmitted to the output side disks 4, 4 through the power rollers 9, 9, whereby the rotation of these output side disks 4, 4 is taken out through the output sleeve 74 and the output gear 12*b*.

Figure 12:
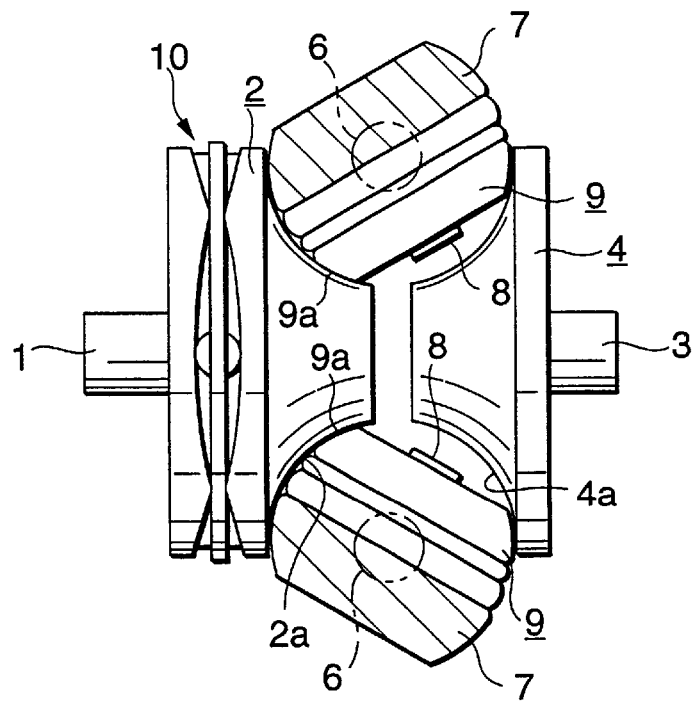
FIG. 12 is a schematic side view showing the basic configuration of the toroidal type continuously variable transmission in a state of the maximum deceleration.
Figure 13:
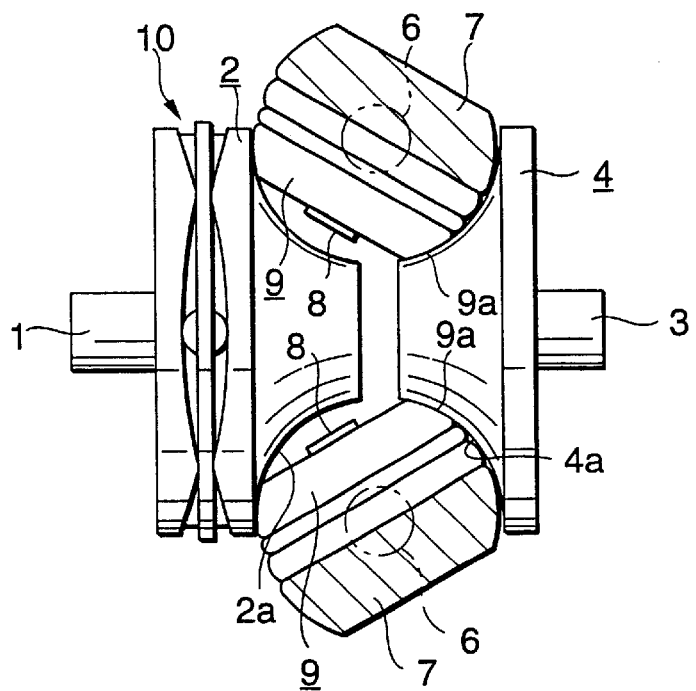
FIG. 13 is a schematic side view showing the basic configuration of the toroidal type continuously variable transmission in a state of the maximum acceleration.
Figure 14:
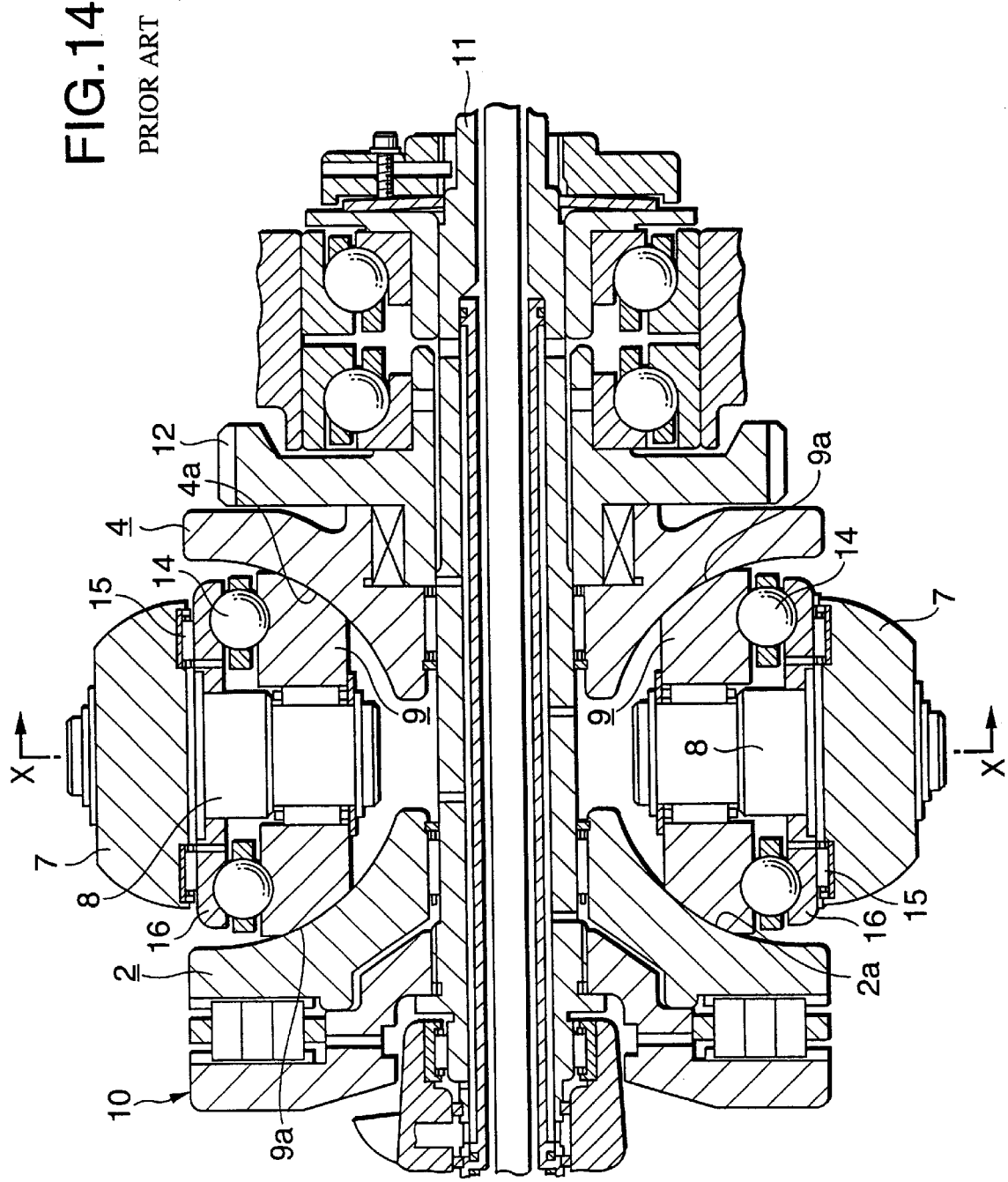
FIG. 14 is a sectional view showing the main portion of a first example of the specific structure of the toroidal type continuously variable transmission.

At the time of swingably displacing the trunnions 7, 7 supporting the power rollers 9, 9 so as to change the transmission ratio between the input side disks 2A, 2B and the output side disks 4, 4, the trunnions 7, 7 are displaced by means of the actuators 17*a*, 17*b* by the same stroke in the same direction with respect to the circumferential direction of the input side disks 2A, 2B and the output side disks 4, 4 in the axial direction of the pivot shafts 6, 6 provided at the both end portions of the trunnions 7, 7, respectively. When the trunnions 7, 7 are displaced in this manner, like the conventional structure described above, the directions of forces along the tangential directions acting on the contact portions between the peripheral surfaces 9a, 9a of the power rollers 9, 9 supported by the trunnions 7, 7 and the inner surfaces 2a, 4a of the input side disks 2A, 2B and the output side disks 4 change, respectively. As a result, as shown in FIGS. 12 to 13, the contact positions between the peripheral surfaces 9a, 9a of the power rollers 9, 9 and the inner surfaces 2a, 4a change and so the transmission ratio changes.

Figure 11:
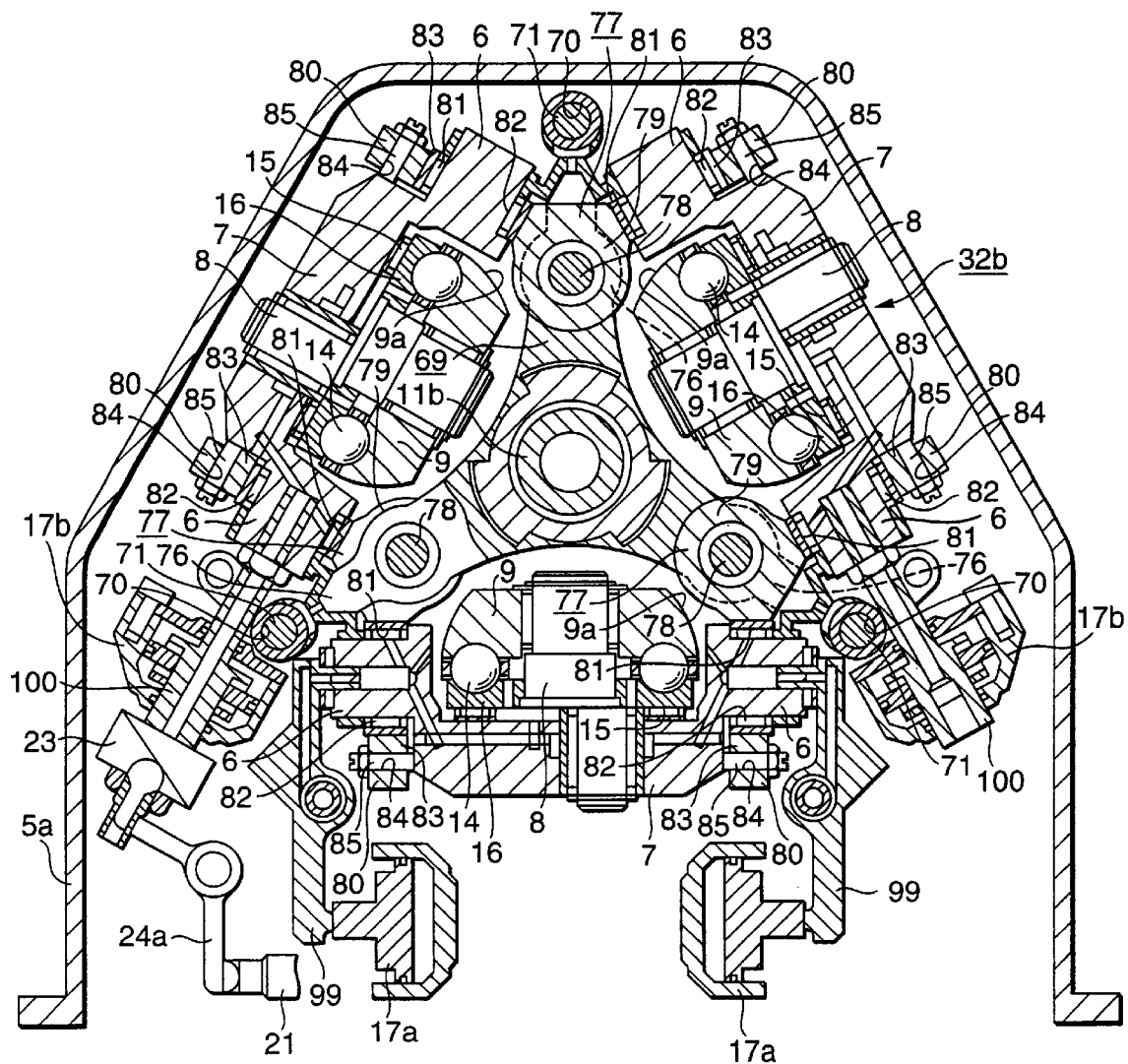
FIG. 11 is a sectional view along a line W—W in FIG. 9.

The displacement of the trunnion 7 on the left side of the upper portion in FIG. 11 according to the supply and discharge of the pressure oil to the actuators 17a, 17b is transmitted to the spool 21 through the precess cam 23 and the link arm 24a thereby to displace the spool 21 in the axial direction. As a result, the flow path of the control valve 18 is closed in a state where the actuators 17a, 17b are stroked by a predetermined amount, so that the supply and discharge of the pressure oil to the actuators 17a, 17b are stopped. Thus, the displacement amount of each of the trunnions 7, 7 in the axial direction of the pivot shafts 6, 6 is only corresponding to the amount of the displacement of the sleeve 20 (see FIG. 18) caused by a stepping motor 19.

The structure and action of the toroidal type continuously variable transmission 32b has been explained above. The planetary gear mechanism 33a to be combined with the toroidal type continuously variable transmission 32b includes a sun gear 35a, a ring gear 36a and planetary gear sets 37a, 37a. The sun gear 35a is fixed at the end portion on the input side (the left end portion in FIG. 9) of the output shaft 31a. Thus, the output shaft 31a rotates in accordance with the rotation of the sun gear 35a. The ring gear 36a is supported at the periphery of the sun gear 35a concentrically with the sun gear 35a so as to rotate freely. A plural sets of the planetary gear sets 37a, 37a each formed by the combination of a pair of planetary gears 38a, 38b are provided between the inner peripheral surface of the ring gear 36a and the outer peripheral surface of the sun gear 35a. The pairs of the planetary gears 38a, 38b mesh from one another. The planetary gear 38a disposed on the outer diameter side meshes with the ring gear 36a and the planetary gear 38b disposed on the inner diameter side meshes with the sun gear 35a. Such planetary gear sets 37a, 37a are supported at the one side surface (the left side surface in FIG. 9) of the carrier 39a so as to rotate freely. Further, the carrier 39a is supported at the periphery of the intermediate portion of the output shaft 31a so as to rotate freely.

The carrier 39a and the pair of the output side disks 4, 4 constituting the toroidal type continuously variable transmission 32b are coupled by the first power transmission mechanism 40b in a state of capable of transmitting rotation force. In order to constitute the first transmission mechanism 40b, a first transmission shaft 63a is provided in parallel to the input shaft 11b and the output shaft 31a, and a third gear 101 fixed at the one end portion (the left end portion in FIG. 9) of the first transmission shaft 63a is meshed with the output gear 12b. A sleeve 102 is disposed at the periphery of the intermediate portion of the output shaft 31a so as to rotate freely. A fourth gear 103 supported at the outer peripheral surface of the sleeve 102 is meshed with a fifth gear 104 fixedly provided at the other end (the right end portion in FIG. 9) of the first transmission shaft 63a, through an idler gear (not shown). Further, the carrier 39 is supported at the periphery of the sleeve 102 through an annular coupling bracket 113 so as to rotate freely in synchronism with the sleeve 102. Thus, the carrier 39a rotates at a speed according to the numbers of the gear teeth of the respective gears 12b, 101, 103, 104 in accordance with the rotation of the output side disks 4, 4 in the direction opposite to the rotation direction of the output side disks 4, 4. A low speed clutch 48a is provided between the carrier 39a and the output shaft 31a.

The input shaft 11b and the ring gear 36a are freely coupled in a state of being capable of transmitting rotation force through the input side disk 2B supported at the tip end portion of the input shaft 11b and a second transmission shaft 47b disposed concentrically with the input shaft 11b. To this end, a plurality of convex portions 105, 105 are protrusively provided at the portions of the outer side surface (the right side surface in FIGS. 9 and 10) of the input side disk 2B, which are also the half portion closer to the outer diameter side as to the center portion of the outer side surface of the input side disk with respect to the radial direction. In this example, the convex portions 105, 105 are each configured in an arc shape and disposed intermittently with a constant interval therebetween on the same circle concentrically with the input side disk 2B around the center shaft of the input side disk. The space between the adjacent end surfaces in the circumferential direction of the convex portions 105, 105 which are adjacent from one another in the circumferential direction thereof are set as engaging notches 106, 106. In other words, the engaging notches 106, 106 are formed by partially removing a short cylindrical portion protrusively provided at the outer side surface of the input side disk 2B, and a part of the short cylindrical portion remained between the engaging notches 106, 106 adjacent in the circumferential direction is set as the convex portion 105.

A transmission flange 108 is provided at the base end portion of the second transmission shaft 47b through a transmission tube portion 107 of a conical tubular shape. The engaging notches 106, 106 and the transmission projection pieces 109, 109 are formed at the outer peripheral edge portion of the transmission flange 108 with the same interval in the circumferential direction. The number of the transmission projection pieces 109, 109 is same as that of the engaging notches 106, 106. The transmission projection pieces 109, 109 are engaged with the engaging notches 106, 106 so that torque can be transmitted between the input side disk 2B and the second transmission shaft 47b. Since the diameter of the engagement portions between the transmission projection pieces 109, 109 and the engaging notches 106, 106 is sufficiently large, a sufficiently large torque can be freely transmitted between the input side disk 2B and the second transmission shaft 47b.

In order to make a torque capable of transmitting between the input side disk 2B and the second transmission shaft 47b larger even by a small value, the convex portions 105, 105 are preferably formed at the outer diameter side end portion (outer peripheral edge portion) of the outer side surface of the input side disk 2B. In this respect, when the convex portions 105, 105 are formed at the outer diameter side end portion of the outer side surface of the input side disk 2B, it becomes difficult to secure finishing accuracy of the inner surface 2a of the input side disk 2B. That is, the inner surface 2a for transmitting a torque based on rolling contact with the peripheral surface 9a of the power roller 9 is required to be finished strictly with respect to the accuracy of the shape and the sizes thereof. The finishing process of the inner surface 2a is performed by strongly pressing a grinding stone to the inner surface 2a while supporting the outer side surface of the input side disk 2B. In this case, it is necessary to support the outer diameter side end portion of the outer side surface in order to suppress the elastic deformation of the input side disk 2B and to finish strictly the accuracy of the shape and the sizes thereof.

To this end, a flat potion 110 which width $W_{110}$ in the radial direction is 10 mm or more, for example, is formed at the outer diameter side end portion of the outer side surface which is positioned at the outer peripheral surface of the convex portions 105, 105. The outer diameter side end portion of the outer side surface of the input side disk 2B is supported at the time of the finishing process by using the flat portion 110. The length in the circumferential direction of each of the transmission projection pieces 109, 109 is made as closer as the width in the circumferential direction of each of the engaging notches 106, 106 so that the transmission projection pieces 109, 109 can engage within the engaging notches 106, 106 without play.

The tip end portion (the right end portion of FIG. 9) of the second transmission shaft 47b is supported by the center portion of the sun gear 35a so as to rotate freely. Further, the ring gear 36a is supported at the periphery of the intermediate portion of the second transmission shaft 47b through an annular coupling bracket 111 and a high speed clutch 49a described later so as to rotate freely in synchronism with the second transmission shaft 47b. Thus, when the high speed clutch 49a is engaged, the ring gear 36a rotates at the same speed and in the same direction as those of the input shaft 11b in accordance with the rotation of the input shaft 11b.

The continuously variable transmission apparatus includes a clutch mechanism constituting a mode switching device. The clutch mechanism is configured by the high speed clutch 49a, the low speed clutch 48a, and a reverse clutch 52a provided between the ring gear 36a and a fixed portion such as a fixed wall 112 etc. provided within the housing of the continuously variable transmission apparatus. Each of the clutches 48a, 49a, 52a is a multiplate wet clutch which is engaged and disengaged based on the supply and discharge of the pressure oil within the hydraulic cylinder attached to the clutch. When one of these clutches is engaged, the remaining two clutches are disengaged.

First, at the time of the low speed running, the continuously variable transmission apparatus configured in the aforesaid manner engages the low speed clutch 48a and disengages the high speed clutch 49a and the reverse clutch 52a. When the input shaft 11b is rotated in this state, only the toroidal type continuously variable transmission 32b transmits the power from the input shaft 11b to the output shaft 31a. That is, in this state, the rotation of the output gear 12b of the toroidal type continuously variable transmission 32b is transmitted to the carrier 39a through the first power transmission mechanism 40b. When the low speed clutch 48a is engaged in the aforesaid manner, the rotation of the carrier 39a is transmitted to the output shaft 31a as it is, and the output shaft 31a at which the sun gear 35a is fixedly provided rotates. In such the low speed running, the transmission ratio between the pair of the input side disks 2A, 2B and the pair of the output side disks 4, 4 is adjusted in the same manner as the case of using only the toroidal type continuously variable transmission as shown in FIGS. 14 to 18. The low speed clutch 48a is sufficient so long as it is configured to prevent the relative displacement among the gears 35a, 36a, 38a, 38b constituting the planetary gear mechanism 33a, and so the low speed clutch is not necessarily required to be provided between the carrier 39a and the output shaft 31a.

In particular, in the case of the continuously variable transmission apparatus of this example, since the respective three power rollers 9, 9, that is, six power rollers in total are provided between the pair of the input side disks 2A, 2B and the pair of the output side disks 4, 4, the power to be transmitted for each of the power rollers 9, 9 can be suppressed. Thus, even with the small surface pressure at the contact portions between the inner surfaces 2a, 4a of the respective disks 2A, 2B, 4 and the peripheral surfaces 9a, 9a of the power rollers 9, 9, the power can be transmitted without causing slip at the contact portions. In this respect, the surface pressures at the respective contact portions can be adjusted easily and surely by adjusting the oil pressure introduced within the hydraulic type pressing device 60a. Since the surface pressures at the respective contact portions can be suppressed to a small value, the rolling contact fatigue lifetime of the respective inner surfaces 2a, 4a, 9a can be improved. On the contrary, when the rolling contact fatigue lifetime is set to be same as the conventional structure, a larger power can be transmitted as compared with the conventional structure.

In contrast, at the time of the high speed running, the high speed clutch 49a is engaged and each of the low speed clutch 48a and the reverse clutch 52a is disengaged. When the input shaft 11b is rotated in this state, the power is transmitted from the input shaft 11b to the output shaft 31a by means of the second power transmission mechanism 43a including the second transmission shaft 47b and the planetary gear mechanism 33a. That is, when the input shaft 11b is rotated in the high speed running, the rotation is transmitted to the ring gear 36a through the second transmission shaft 47b, the coupling bracket 111 and the high speed clutch 49a. Then, the rotation of the ring gear 36a is transmitted to the sun gear 35a through the plurality of the planetary gear sets 37a, 37a thereby to rotate the output shaft 31a to which the sun gear 35a is fixed. The transmission ratio of the entirety of the continuously variable transmission apparatus can be adjusted by changing the transmission ratio of the toroidal type continuously variable transmission 32b in this state thereby to change the revolution speed of the planetary gear sets 37a, 37a.

That is, at the time of the high speed running, the planetary gear sets 37a, 37a revolve in the same direction as the ring gear 36a. Like the aforesaid first example shown in FIG. 1, the lower the revolution speed of these planetary gear sets 37a, 37a is, the faster the rotation speed of the output shaft 31a to which the sun gear 35a is fixed becomes. Thus, at the time of the high speed running, the more the transmission ratio of the toroidal type continuously variable transmission 32b is shifted to the deceleration side, the more the transmission ratio of the entirety of the continuously variable transmission apparatus changes to the speed increasing side. In such a high speed running state, the torque is applied to the toroidal type continuously variable transmission 32b not from the input side disks 2A, 2B but from the output side disks 4, 4 (that is, a minus torque is applied supposing that a torque applied at the time of the low speed running is plus torque). That is, in the state where the high speed clutch 49a is engaged, a torque transmitted to the input shaft 11b is transmitted to the ring gear 36a of the planetary gear mechanism 33a through the second transmission shaft 47b. Thus, a torque is scarcely transmitted to the respective input side disks 2A, 2B from the input shaft 11b side.

A part of a torque transmitted to the ring gear 36a of the planetary gear mechanism 33a through the second power transmission mechanism 43a is transmitted to the output side disks 4, 4 from the respective planetary gear sets 37a, 37a through the carrier 39a and the first power transmission mechanism 40*b*. In this manner, a torque applied to the toroidal type continuously variable transmission 32*b* from the respective output side disks 4, 4 becomes smaller as the transmission ratio of the toroidal type continuously variable transmission 32*b* is changed to the deceleration side in order to change the transmission ratio of the entirety of the continuously variable transmission apparatus to the speed increasing side. As a result, a torque inputted into the transmission 32*b* can be made small at the time of the high speed running thereby to improve the durability of the constituent parts of the transmission 32*b*. Although the magnitude of the power transmitted through the toroidal type continuously variable transmission 32*b* changes even in such a high speed running, the surface pressures at the contact portions between the inner surfaces 2*a*, 4*a* and the peripheral surfaces 9*a* can be set to a suitable value by adjusting the oil pressure introduced into the pressing device 60*a*.

A torque applied to the toroidal type continuously variable transmission 32*b* changes abruptly at the time of switching between the state where the low speed clutch 48*a* is engaged and the state where the high speed clutch 49*a* is engaged. Thus, the oil pressure introduced into the pressing device 60*a* is increased before and after switching between the clutches 48*a*, 49*a* thereby to prevent the variation of the transmission ratio of the toroidal type continuously variable transmission 32*b* despite of the abrupt change of the torque. This matter is described in detail above, and so the explanation thereof is omitted.

Further, at the time of rotating the output shaft 31*a* reversely so as to move an automobile backward, each of the low speed clutch 48*a* and the high speed clutch 49*a* is disengaged and the reverse clutch 52*a* is engaged. As a result, the ring gear 36*a* is fixed, and the respective planetary gear sets 37*a*, 37*a* revolve around the sun gear 35*a* while being meshed with the ring gear 36*a* and the sun gear 35*a*. Then, the sun gear 35*a* and the output shaft 31*a* fixing the sun gear 35*a* thereto rotate in the direction opposite to the rotation direction thereof at the time of the low speed running and the high speed running.

In the case of employing the continuously variable transmission apparatus of the invention as an automatic transformer, a starter clutch such as a torque converter or an electromagnetic clutch etc. between an engine as a driving source and the input shaft 11*b*. In this respect, the low speed clutch 48*a* may be provided with a mechanism as the starter clutch and the separate provision of the starter clutch may be eliminated. In this case, in the stopping state of an automobile, each of the high speed clutch 49*a* and the reverse clutch 52*a* as well as the low speed clutch 48*a* is disengaged. In this state, each of the toroidal type continuously variable transmission 32*b*, the first power transmission mechanism 40*b* and the second power transmission mechanism 43*a* runs idle and so no power is transmitted to the output shaft 31*a*. When the low speed clutch 48*a* is engaged gradually in this state, an automobile in a stopping state can start smoothly.

The explanation has been made as to the case where the invention is applied to the structure incorporated into a so-called power split type continuously variable transmission apparatus in which the toroidal type continuously variable transmission 32*b* and the planetary gear mechanism 33*a* are combined, whereby a power is transmitted only by the toroidal type continuously variable transmission 32*b* at the time of the low speed running, whilst at the time of the high speed running a main power is transmitted by the planetary gear mechanism 33*a* and the transmission ratio is adjusted by the toroidal type continuously variable transmission 32*b*. In this respect, the invention is also applied to an automatic transmission constituted only by the toroidal type continuously variable transmission. Further, the invention is also applicable to the toroidal type continuously variable transmission incorporated into a so-called geared neutral type continuously variable transmission apparatus in which the toroidal type continuously variable transmission and the planetary gear mechanism are combined thereby to realize the operation from backward movement to the stop and further to the forward movement without switching the clutches. Also in the case of the toroidal type continuously variable transmission to be incorporated into the so-called geared neutral type continuously variable transmission apparatus, it is effective to apply the invention for the control at the time of switching the mode between the high speed and the low speed and at the time of operating the engine brake, and further effective to apply the invention for the control at the time of switching between the backward and forward movements through the sopping state.

In this respect, the invention is useful when being applied to a so-called half toroidal type continuously variable transmission in which the center of the swinging operation of each of the power rollers exists outward in the radial direction of the respective disks from the lines which couple the contact points (traction points) between the peripheral surfaces of the respective power rollers and the input and output side disks. In contrast, as disclosed in Japanese Patent Laid-Open No. 63263/1987, in the case of a so-called full toroidal type continuously variable transmission in which the center of the swinging operation of each of the power rollers exists on a straight line coupling a pair of the traction points, it is not necessary to apply the invention. That is, in the case of the full toroidal type continuously variable transmission, the power applied to each of the power rollers from the two traction points existing in each of the power rollers is cancelled within the power roller except for the force corresponding to the aforesaid traction force 2Ft. Thus, the elastic deformation etc. of the respective portions does not result in the variation of the transmission ratio. Further, in the case of the full toroidal type continuously variable transmission, since the transmission method itself differs from that of the half full toroidal type continuously variable transmission, it is almost meaningless to apply the invention in a view point of suppressing the variation of the transmission ratio.

Since the invention is configured an operated as described above, the toroidal type continuously variable transmission and the continuously variable transmission apparatus which does not apply uncomfortable feeling to a driver without performing troublesome control can be realized.

While only certain embodiments have been specifically described herein, it will be apparent that numerous modifications may be made thereto without departing from the spirit and scope of the invention.

What is claimed is:

1. A toroidal continuously variable transmission comprising:

first and second disks each having a concave-shaped inner surface with an arc shape in section, the first and second disks being supported concentrically to be rotatable independently in a state that the inner surfaces thereof are opposed to each other;

a plurality of trunnions each swingably rotating around pivot shafts which are disposed at twisted positions with respect to a center shaft of the first and second disks;

displacement shafts each being supported by an intermediate portion of corresponding one of the trunnions in a state of protruding from an inner surface of the corresponding one of the trunnions;

power rollers each having a spherical convex-shaped periphery and disposed on an inner surface side of corresponding one of the trunnions, each of the power rollers being supported around a periphery of corresponding one of the displacement shafts to be rotatable in a state of being sandwiched between the first and second disks;

a pressing device which presses the first disk toward the second disk, the pressing device generating a first pressing force corresponding to a magnitude of a torque transmitted between the first and second disks and a second pressing force independent from the torque; and a controller controlling the pressing device to generate the second pressing force in accordance with a signal, wherein, when a magnitude of a torque transmitted between the first and second disks varies, the controller controls the pressing device to continuously generate a predetermined pressing force equal to or more than a pressing force necessary for transmitting a larger torque before and after the variation during the variation.

2. A toroidal continuously variable transmission according to claim 1, wherein the pressing device is a hydraulic actuator which generates a pressing force according to a hydraulic pressure in accordance with supply of pressure oil.

3. A continuously variable transmission apparatus comprising:

an input shaft coupled to a driving source and driven and rotated by the driving source;

an output shaft for taking out a power based on the rotation of the input shaft;

a toroidal continuously variable transmission;

a planetary gear mechanism;

a first power transmission path for transmitting a power inputted into the input shaft through the toroidal continuously variable transmission;

a second power transmission path for transmitting the power inputted into the input shaft without passing through the toroidal continuously variable transmission; and a mode switching device for switching a state where the power inputted into the input shaft is transmitted to the planetary gear mechanism through the first power transmission path and the second power transmission path, wherein the toroidal continuously variable transmission includes:

first and second disks each having a concave-shaped inner surface with an arc shape in section, the first and second disks being supported concentrically to be rotatable independently in a state that the inner surfaces thereof are opposed to each other;

a plurality of trunnions each swingably rotating around pivot shafts which are disposed at twisted positions with respect to a center shaft of the first and second disks;

displacement shafts each being supported by an intermediate portion of corresponding one of the trunnions in a state of protruding from an inner surface of the corresponding one of the trunnions;

power rollers each having a spherical convex-shaped periphery and disposed on an inner surface side of corresponding one of the trunnions, each of the power rollers being supported around a periphery of corresponding one of the displacement shafts to be rotatable in a state of being sandwiched between the first and second disks;

a pressing device which presses the first disk toward the second disk, the pressing device generating a first pressing force corresponding to a magnitude of a torque transmitted between the first and second disks and a second pressing force independent from the torque; and a controller controlling the pressing device to generate the second pressing force in accordance with a signal, wherein, when a magnitude of a torque transmitted between the first and second disks varies, the controller controls the pressing device to continuously generate a predetermined pressing force equal to or more than a pressing force necessary for transmitting a larger torque before and after the variation during the variation, wherein the planetary gear mechanism includes:

a sun gear;

a ring gear disposed at periphery of the sun gear;

a planetary gear provided between the sun gear and the ring gear; and a carrier for rotatably supporting the planetary gear, wherein a power transmitted through the first power transmission path and a power transmitted through the second power transmission path is freely transmitted to two of the sun gear, the ring gear and the carrier, and remaining one of the sun gear, the ring gear and the carrier is coupled to the output shaft, wherein the mode switching device switches at least between a first mode for transmitting power only through the first power transmission path and a second mode for transmitting power through both the first power transmission path and the second power transmission path, and wherein the controller of the toroidal continuously variable transmission controls the pressing device, during the switching of the mode switching device between the first mode and the second mode, to continuously generate a predetermined pressing force equal to or more than a pressing force necessary for transmitting a larger torque before and after the switching.

4. A continuously variable transmission apparatus according to claim 3, wherein the first power transmission path is formed by a first power transmission mechanism, the first power transmission mechanism including:

a first transmission shaft in parallel to the input shaft and the output shaft;

a first sprocket fixed to one end portion of the first transmission shaft;

a second sprocket fixed to the second disk being an output side disk;

a chain hung over between the first sprocket and the second sprocket; and first and second gears meshed to each other and fixed to the other end portion of the first transmission shaft and the carrier, respectively.

5. A continuously variable transmission apparatus according to claim 3, wherein the second power transmission path is formed by a second transmission shaft disposed concentrically with the input shaft.

6. A continuously variable transmission apparatus according to claim 3, wherein the mode switching device is formed by a clutch mechanism, the clutch mechanism including:

a high speed clutch; and a low speed clutch provided between an outer peripheral edge portion of the carrier and one end portion of the ring gear in axial direction thereof.

7. A continuously variable transmission apparatus according to claim 3, wherein the toroidal continuously variable transmission is a double cavity having a pair of input side disks and a pair of output side disks, and wherein the first power transmission path is formed by a first power transmission mechanism, the first power transmission mechanism including:

a first transmission shaft in parallel to the input shaft and the output shaft;

a third gear fixed to one end potion of the first transmission shaft;

an output gear provided at an outer peripheral surface of an intermediate potion of an output sleeve engaged with both ends of the pair of output side disks;

a fourth gear supported by an outer peripheral surface of a sleeve rotatably disposed at periphery of an intermediate portion of the output shaft; and a fifth gear fixedly provided at the other end portion of the first transmission shaft and meshed with the fourth gear through an idle gear.

8. A continuously variable transmission apparatus comprising:

an input shaft coupled to a driving source and driven and rotated by the driving source;

an output shaft for taking out a power based on the rotation of the input shaft;

a toroidal continuously variable transmission;

a planetary gear mechanism;

a first power transmission path for transmitting a power inputted into the input shaft through the toroidal continuously variable transmission;

a second power transmission path for transmitting the power inputted into the input shaft without passing through the toroidal continuously variable transmission; and a mode switching device for switching a state where the power inputted into the input shaft is transmitted to the planetary gear mechanism through the first power transmission path and the second power transmission path, wherein the toroidal continuously variable transmission includes:

first and second disks each having a concave-shaped inner surface with an arc shape in section, the first and second disks being supported concentrically to be rotatable independently in a state that the inner surfaces thereof are opposed to each other;

a plurality of trunnions each swingably rotating around pivot shafts which are disposed at twisted positions with respect to a center shaft of the first and second disks;

displacement shafts each being supported by an intermediate portion of corresponding one of the trunnions in a state of protruding from an inner surface of the corresponding one of the trunnions;

power rollers each having a spherical convex-shaped periphery and disposed on an inner surface side of corresponding one of the trunnions, each of the power rollers being supported around a periphery of corresponding one of the displacement shafts to be rotatable in a state of being sandwiched between the first and second disks;

a pressing device which presses the first disk toward the second disk, the pressing device generating a first pressing force corresponding to a magnitude of a torque transmitted between the first and second disks and a second pressing force independent from the torque; and a controller controlling the pressing device to generate the second pressing force in accordance with a signal, wherein, when a magnitude of a torque transmitted between the first and second disks varies, the controller controls the pressing device to continuously generate a predetermined pressing force equal to or more than a pressing force necessary for transmitting a larger torque before and after the variation during the variation, wherein the planetary gear mechanism includes:

a sun gear;

a ring gear disposed at periphery of the sun gear;

a planetary gear provided between the sun gear and the ring gear; and a carrier for rotatably supporting the planetary gear, wherein a power transmitted through the first power transmission path and a power transmitted through the second power transmission path is freely transmitted to two of the sun gear, the ring gear and the carrier, wherein the mode switching device switches between a mode for transmitting power at a low speed and a mode for transmitting power at a high speed, and wherein the controller of the toroidal continuously variable transmission controls the pressing device, during the switching of the mode switching device between the mode for transmitting power at a low speed and the mode for transmitting power at a high speed, to continuously generate a predetermined pressing force equal to or more than a pressing force necessary for transmitting a larger torque before and after the switching.

* * * * *